US010919017B2

(12) United States Patent
Sato et al.

(10) Patent No.: US 10,919,017 B2
(45) Date of Patent: Feb. 16, 2021

(54) AQUEOUS DISPERSION, METHOD FOR MANUFACTURING THE SAME, AND IMAGE FORMING METHOD

(71) Applicant: FUJIFILM CORPORATION, Tokyo (JP)

(72) Inventors: Noriaki Sato, Kanagawa (JP); Ichiro Koyama, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 156 days.

(21) Appl. No.: 16/270,558

(22) Filed: Feb. 7, 2019

(65) Prior Publication Data

US 2019/0168182 A1 Jun. 6, 2019

Related U.S. Application Data

(63) Continuation of application No. PCT/JP2017/023258, filed on Jun. 23, 2017.

(30) Foreign Application Priority Data

Sep. 6, 2016 (JP) ................................ 2016-173951

(51) Int. Cl.

| | |
|---|---|
| ***C08F 2/46*** | (2006.01) |
| ***C08F 2/50*** | (2006.01) |
| ***C08G 61/04*** | (2006.01) |
| ***B01J 13/18*** | (2006.01) |
| ***C08G 18/32*** | (2006.01) |
| ***C08G 18/80*** | (2006.01) |
| ***C08G 18/42*** | (2006.01) |
| ***C09D 11/30*** | (2014.01) |
| ***C08G 18/22*** | (2006.01) |
| ***C08G 18/66*** | (2006.01) |
| ***C08G 18/08*** | (2006.01) |
| ***C08G 18/28*** | (2006.01) |
| ***C08G 18/75*** | (2006.01) |
| ***C08G 18/38*** | (2006.01) |
| ***C08G 18/34*** | (2006.01) |
| ***C08G 18/50*** | (2006.01) |
| ***C09D 11/102*** | (2014.01) |
| ***C08G 18/73*** | (2006.01) |

(Continued)

(52) U.S. Cl.

CPC .............. *B01J 13/18* (2013.01); *B01J 13/14* (2013.01); *B41J 2/01* (2013.01); *C08F 2/44* (2013.01); *C08G 18/0823* (2013.01); *C08G 18/227* (2013.01); *C08G 18/282* (2013.01); *C08G 18/3206* (2013.01); *C08G 18/3212* (2013.01); *C08G 18/3215* (2013.01); *C08G 18/348* (2013.01); *C08G 18/381* (2013.01); *C08G 18/3872* (2013.01); *C08G 18/42* (2013.01); *C08G 18/4277* (2013.01); *C08G 18/44* (2013.01); *C08G 18/5024* (2013.01); *C08G 18/6659* (2013.01); *C08G 18/6692* (2013.01); *C08G 18/6755* (2013.01); *C08G 18/73* (2013.01); *C08G 18/755* (2013.01); *C08G 18/8025* (2013.01); *C08G 18/8029* (2013.01); *C08J 3/03* (2013.01); *C09D 11/101* (2013.01); *C09D 11/102* (2013.01); *C09D 11/30* (2013.01)

(58) Field of Classification Search

CPC ........... C08G 18/3872; C08G 18/3215; C08G 18/282; C08G 18/6692; C08G 18/381; C08G 18/3212; C08G 18/3206; C08G 18/755; C08G 18/5024; C08G 18/227; C08G 18/73; C08G 18/6659; C08G 18/0823; C08G 18/44; C08G 18/348; C08G 18/8029; C08G 18/8025; C08G 18/6755; C08G 18/4277; B01J 13/18; B01J 13/14; C09D 11/102; C09D 11/30; C09D 11/101; B41J 2/01

USPC ........... 522/79, 74, 71, 1, 189, 184, 6; 520/1

See application file for complete search history.

(56) References Cited

U.S. PATENT DOCUMENTS

| | | | |
|---|---|---|---|
| 9,062,228 | B2 | 6/2015 | Roberts et al. |
| 2008/0103265 | A1 | 5/2008 | Schocker et al. |

(Continued)

FOREIGN PATENT DOCUMENTS

| | | | |
|---|---|---|---|
| CN | 1637599 | * | 7/2005 |
| CN | 101056700 | A | 10/2007 |

(Continued)

OTHER PUBLICATIONS

Hoshi et al, CN 1637599 Machine Translation, Jul. 13, 2005 (Year: 2005).*

(Continued)

*Primary Examiner* — Jessica Whiteley

(74) *Attorney, Agent, or Firm* — Solaris Intellectual Property Group, PLLC

(57) ABSTRACT

Provided are an aqueous dispersion, a method for manufacturing the aqueous dispersion, and an image forming method in which the image is formed of the aqueous dispersion, the aqueous dispersion including a microcapsule that has a shell having a three-dimensional cross-linked structure containing a urethane bond and/or urea bond, and has a core, in which the shell and/or core has a polymerizable group; a dispersant in which a urethane bond and/or urea bond and an anionic group are contained, a weight-average molecular weight is 5000 or more, and an anionic group value, which is the number of millimoles of the anionic group contained in 1 g of the dispersant, is from 0.10 to 2.50 mmol/g; and water.

18 Claims, No Drawings

(51) Int. Cl.

| | |
|---|---|
| ***B01J 13/14*** | (2006.01) |
| ***C09D 11/101*** | (2014.01) |
| ***C08G 18/44*** | (2006.01) |
| ***B41J 2/01*** | (2006.01) |
| ***C08F 2/44*** | (2006.01) |
| ***C08G 18/67*** | (2006.01) |
| ***C08J 3/03*** | (2006.01) |

(56) References Cited

U.S. PATENT DOCUMENTS

| | | | |
|---|---|---|---|
| 2009/0099024 | A1 | 4/2009 | Giner et al. |
| 2011/0021675 | A1 | 1/2011 | Shigemori et al. |
| 2011/0287236 | A1 | 11/2011 | Nakano et al. |
| 2013/0237661 | A1 | 9/2013 | Brust et al. |
| 2015/0259567 | A1 | 9/2015 | Tamai et al. |
| 2016/0200926 | A1 | 7/2016 | Shimohara |
| 2017/0174913 | A1 | 6/2017 | Sato et al. |
| 2017/0174916 | A1 | 6/2017 | Sato et al. |

FOREIGN PATENT DOCUMENTS

| | | | | |
|---|---|---|---|---|
| CN | 101191027 | A | | 6/2008 |
| CN | 101460534 | A | | 6/2009 |
| CN | 101983100 | A | | 3/2011 |
| CN | 103998540 | A | | 8/2014 |
| CN | 104910772 | A | | 9/2015 |
| CN | 105593317 | A | | 5/2016 |
| JP | S56-15836 | A | | 2/1981 |
| JP | S64-65131 | A | | 3/1989 |
| JP | H03-280055 | A | | 12/1991 |
| JP | H09-57091 | A | | 3/1997 |
| JP | 2001-130143 | A | | 5/2001 |
| JP | 2003-238835 | A | | 8/2003 |
| JP | 2003-313476 | A | | 11/2003 |
| JP | 2004-75759 | A | | 3/2004 |
| JP | 2006-346553 | A | | 12/2006 |
| JP | 2008266595 | | * | 11/2008 |
| JP | 2014-224174 | A | | 12/2014 |
| JP | 2015-174876 | A | | 10/2015 |
| WO | 2016/052053 | A1 | | 4/2016 |
| WO | 2016052055 | A1 | | 4/2016 |

OTHER PUBLICATIONS

Itotani et al, JP 2008-266595 Machine Translation, Nov. 6, 2008 (Year: 2008).*

Extended European Search Report dated Aug. 21, 2019, issued in corresponding EP Patent Application No. 17848383.0.

International Search Report issued in International Application No. PCT/JP2017/023258 dated Aug. 22, 2017.

Written Opinion of the ISA issued in International Application No. PCT/JP2017/023258 dated Aug. 22, 2017.

English language translation of the following: Office action dated Sep. 3, 2019 from the JPO in a Japanese patent application No. 2018-538036 corresponding to the instant patent application.

Jin-Chao Bai et al., "Study on the Synthesis and Properties of Water-borne Polyurethane Hyperdispersant," Chinese Master's Theses Full-text Database Engineering Science and Technology I, p. 7(1.3.4), B020-272, 201.

English language translation of the following: Office action dated Oct. 9, 2020 from the SIPO in a Chinese patent application No. 201780053994.5 corresponding to the instant patent application. This office action translation is submitted now in order to supplement the understanding of the cited references which are being disclosed in the instant Information Disclosure Statement.

* cited by examiner

AQUEOUS DISPERSION, METHOD FOR MANUFACTURING THE SAME, AND IMAGE FORMING METHOD

CROSS-REFERENCE TO RELATED APPLICATIONS

This application is a continuation application of International Application No. PCT/JP2017/023258, filed Jun. 23, 2017, the disclosure of which is incorporated herein by reference in its entirety. Further, this application claims priority from Japanese Patent Application No. 2016-173951, filed Sep. 6, 2016, the disclosure of which is incorporated herein by reference in its entirety.

BACKGROUND OF THE INVENTION

1. Field of the Invention

The present disclosure relates to an aqueous dispersion, a method for manufacturing the same, and an image forming method.

2. Description of the Related Art

An aqueous dispersion in which a microcapsule having a core and a shell is dispersed in an aqueous medium (medium containing water) has been known in the related art.

As a method for manufacturing a microcapsule in which a core material (that is, a core) is certainly contained in the interior thereof, background fogging after shelf-life storage of a fixing-type heat sensitive recording material is reduced, and thus staining in a background portion of a non-fixing type heat sensitive recording material after image printing can be reduced, for example, a method for manufacturing a microcapsule has been known, in which a specific diazonium salt and a microcapsule wall precursor are added to an aqueous solution of water-soluble polymer so as to be emulsified, and then the microcapsule wall precursor is polymerized, and in which the pH of the aqueous solution of water-soluble polymer is adjusted to be more than 4 and 6 or less (for example, refer to JP2001-130143A). JP2001-130143A discloses a method for dispersing the microcapsule by using phthalated gelatin as a water-soluble polymer contained in the aqueous solution of water-soluble polymer.

In addition, in an aqueous ink which is advantageous from the viewpoints of handleability, odorlessness, safety, and the like, as an ink composition in which jetting stability is particularly high, color tone and color developability, weather fastness, water resistance, and ozone resistance are excellent, and which has no defects in image quality, an ink composition formed by using a coloring microparticle dispersion including a microcapsule in which capsule walls are formed by using a specific difunctional isocyanate compound and a polyfunctional isocyanate compound having three or more isocyanate groups in the same molecule, the microcapsule containing, in the interior thereof, a coloring composition that contains at least one hydrophobic coloring agent, at least one hydrophobic polymer, and at least one high-boiling-point organic solvent, as a core material of the capsule, has been known (for example, refer to JP2004-075759A). JP2004-075759A discloses a method for dispersing the microcapsule by using phthalated gelatin.

In addition, as a microcapsule containing a volatile substance in the interior thereof, in which sustained release properties with respect to the volatile substance to be contained in the interior thereof are excellent and thus the volatile substance can be released over a long period, a microcapsule containing a volatile substance in the interior thereof has been known, in which a core portion is covered with a shell portion, the core portion is formed of a gel-shaped polyurethane resin containing volatile substances (such as agricultural chemicals, aromatics, and plant essential oils), and the shell portion is formed of a polyurea resin (for example, JP1997-057091A (JP-H09-057091A)). In JP1997-057091A (JP-H09-057091A), it is disclosed that an aqueous dispersion having the microcapsules containing volatile substances in the interior thereof, further contains a water-soluble polyurethane resin.

SUMMARY OF THE INVENTION

In recent years, a method for forming a film having excellent hardness through photocuring by using an aqueous dispersion having microcapsules to which photocuring properties are imparted has been examined. With respect to such an aqueous dispersion having the microcapsules to which photocuring properties are imparted, it is required to further improve the dispersion stability of the microcapsules in some cases. Specific examples of such cases include a case in which the aqueous dispersion having the microcapsules is used as an ink jet ink (hereinafter will also be simply referred to as "ink"), a case in which the aqueous dispersion having the microcapsules is used as an application liquid (so-called a "coating liquid") for forming a coated film, and the like.

Under the above circumstances, it is considered that further improving the dispersion stability of the microcapsules is desirable with respect to the aqueous dispersion having microcapsules disclosed in JP2001-130143A and JP2004-075759A.

The aqueous dispersion having the microcapsules disclosed in JP1997-057091A (JP-H09-057091A) is an aqueous dispersion in which volatile substances such as agricultural chemicals, aromatics, and plant essential oils are contained in the interior of microcapsules. Therefore, in JP1997-057091A (JP-H09-057091A), imparting photocuring properties to the aqueous dispersion having the microcapsules is not taken into consideration at all. On the contrary, in a case of imparting photocuring properties to the aqueous dispersion having the microcapsules disclosed in JP1997-057091A (JP-H09-057091A), properties of agricultural chemicals, aromatics, plant essential oils, and the like contained in the interior of the microcapsules deteriorate, and there is concern for damaging the original object of the invention disclosed in JP1997-057091A (JP-H09-057091A).

An object of a first aspect of the present disclosure is to provide an aqueous dispersion which is capable of forming a film having excellent hardness, and in which dispersion stability of microcapsules is excellent.

An object of a second aspect of the present disclosure is to provide a method for manufacturing the aqueous dispersion.

An object of a third aspect of the present disclosure is to provide an image forming method in which the image is formed of the aqueous dispersion.

Specific means for achieving the object includes the following aspects.

<1> An aqueous dispersion comprising:

a microcapsule that includes a shell having a three-dimensional cross-linked structure containing at least one bond selected from a urethane bond or a urea bond, and includes a core, in which at least one of the shell or the core has a polymerizable group;

a dispersant in which at least one bond selected from a urethane bond or a urea bond, and an anionic group are contained, a weight-average molecular weight is 5000 or more, and an anionic group value, which is the number of millimoles of the anionic group contained in 1 g of the dispersant, is from 0.10 mmol/g to 2.50 mmol/g; and water.

<2> The aqueous dispersion according to <1>, in which the dispersant contains Structural Unit (C).

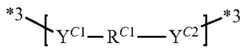
(C)

In Structural Unit (C), $R^{C1}$ represents a divalent organic group, and in a case of assuming a compound $HR^{C1}H$ in which a hydrogen atom is bonded to each of two binding positions of the divalent organic group, $R^{C1}$ represents the divalent organic group which allows C log P of the compound $HR^{C1}H$ to be 1.00 or more, $Y^{C1}$ represents O, S, NH, or $NZ^{C1}$; $Y^{C2}$ represents O, S, NH, or $NZ^{C2}$, $Z^{C1}$ and $Z^{C2}$ each independently represent a hydrocarbon group having 1 to 10 carbon atoms, and two *3's each represent a binding position with a structural unit other than Structural Unit (C).

<3> The aqueous dispersion according to <2>, in which the dispersant further contains Structural Unit (A) and Structural Unit (B).

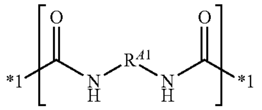
(A)

In Structural Unit (A), $R^{A1}$ represents a divalent hydrocarbon group having 1 to 20 carbon atoms, and two *1's each represent a binding position with a structural unit other than Structural Unit (A).

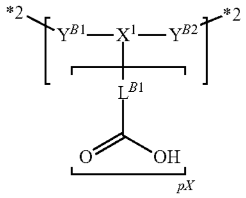
(B)

In Structural Unit (B), $X^1$ represents a (pX+2)-valent organic group, pX represents an integer of 1 or more, $Y^{B1}$ represents O, S, NH, or $NZ^{B1}$, $Y^{B2}$ represents O, S, NH, or $NZ^{B2}$, $Z^{B1}$ and $Z^{B2}$ each independently represent a hydrocarbon group having 1 to 10 carbon atoms, $L^{B1}$ represents a single bond or a divalent linking group, and two *2's each represent a binding position with a structural unit other than Structural Unit (B).

A carboxy group in Structural Unit (B) may be neutralized.

<4> The aqueous dispersion according to <3>, in which the divalent hydrocarbon group represented by $R^{A1}$ in Structural Unit (A) contains a cyclic structure.

<5> The aqueous dispersion according to any one of <2> to <4>, in which C log P of the compound $HR^{C1}H$ is 3.00 or more.

<6> The aqueous dispersion according to any one of <2> to <5>, in which $R^{C1}$ in Structural Unit (C) is a divalent polyalkyleneoxy group in which two hydroxy groups are removed from polyalkylene glycol, a divalent polycarbonate group in which two hydroxy groups are removed from polycarbonate diol, a divalent polyester group in which two hydroxy groups are removed from polyester diol, a divalent organic group in which two hydroxy groups are removed from a diol compound having 2 to 50 carbon atoms other than polyalkylene glycol, polycarbonate diol, and polyester diol, or a divalent organic group in which two amino groups are removed from a diamine compound having 2 to 50 carbon atoms.

<7> The aqueous dispersion according to any one of <2> to <6>, in which the divalent organic group represented by $R^{C1}$ in Structural Unit (C) contains a cyclic structure.

<8> The aqueous dispersion according to any one of <1> to <7>, in which the weight-average molecular weight of the dispersant is from 10000 to 100000.

<9> The aqueous dispersion according to any one of <1> to <8>, in which the anionic group value of the dispersant is from 0.30 mmol/g to 1.50 mmol/g.

<10> The aqueous dispersion according to any one of <1> to <9>, in which the shell contains a cyclic structure.

<11> The aqueous dispersion according to any one of <1> to <10>, in which the polymerizable group is a radically polymerizable group, and the core contains a radically polymerizable compound as a compound having the radically polymerizable group.

<12> The aqueous dispersion according to <11>, in which the core contains a di- or lower functional radically polymerizable compound and a tri- or higher functional radically polymerizable compound as compounds having the radically polymerizable group.

<13> The aqueous dispersion according to any one of <1> to <12>, in which the core contains a photopolymerization initiator.

<14> The aqueous dispersion according to any one of <1> to <10>, in which the polymerizable group is a thermally polymerizable group, and the core contains a thermally polymerizable compound as a compound having the thermally polymerizable group.

<15> The aqueous dispersion according to any one of <1> to <14>, in which a total amount of a total solid content of the microcapsule and the dispersant is 50% by mass or more with respect to a total solid content of the aqueous dispersion.

<16> The aqueous dispersion according to any one of <1> to <15>, which is used as an ink jet ink.

<17> A method for manufacturing the aqueous dispersion according to any one of <1> to <16>, the method comprising mixing an oil-phase component containing an organic solvent, the dispersant, a tri- or higher functional isocyanate compound, and at least one of an isocyanate compound into which a polymerizable group is introduced or a polymerizable compound, with a water-phase component containing water, and emulsifying the obtained mixture so as to form the microcapsule.

<18> An image forming method comprising: applying the aqueous dispersion according to any one of <1> to <16> onto a recording medium; and curing the aqueous dispersion applied onto the recording medium.

According to the first aspect of the present disclosure, the aqueous dispersion which is capable of forming a film having excellent hardness, and in which dispersion stability of microcapsules is excellent is provided.

According to the second aspect of the present disclosure, the method for manufacturing the aqueous dispersion is provided.

According to the third aspect of the present disclosure, the image forming method in which the image is formed of the aqueous dispersion is provided.

DESCRIPTION OF THE PREFERRED EMBODIMENTS

In the present specification, a range of numerical values described using "to" means a range including the numerical values listed before and after "to" as a minimum value and a maximum value.

In the present specification, the symbol "*" in chemical formulas represents a binding position.

In the present specification, in a case where there are a plurality of substances corresponding to each component in a composition, unless otherwise specified, the amount of each component in the composition means the total amount of the plurality of substances present in the composition.

In the numerical value ranges described in a stepwise manner in the present specification, an upper limit value or a lower limit value described in a certain numerical value range may be replaced with an upper limit value or a lower limit value of the numerical value range of other stepwise description, or may be replaced with values indicated in examples.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, and visible rays.

In the present specification, the ultraviolet rays are referred to as "Ultra Violet (UV) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

[Aqueous Dispersion]

An aqueous dispersion of the present disclosure includes:

a microcapsule that includes a shell having a three-dimensional cross-linked structure containing at least one bond selected from a urethane bond or a urea bond, and includes a core, in which at least one of the shell or the core has a polymerizable group;

a dispersant in which at least one bond selected from a urethane bond or a urea bond, and an anionic group are contained, a weight-average molecular weight is 5000 or more, and an anionic group value, which is the number of millimoles of the anionic group contained in 1 g of the dispersant, is from 0.10 mmol/g to 2.50 mmol/g; and water.

The aqueous dispersion of the present disclosure is the aqueous dispersion which is capable of forming a film having excellent hardness, and in which dispersion stability of microcapsules is excellent.

The reasons why such effects are exhibited are presumed as follows. However, the aqueous dispersion of the present disclosure is not limited to the following reasons presumed.

As one reason of the aqueous dispersion of the present disclosure being excellent for the dispersion stability of the microcapsule, the following reasons are considered.

That is, in the aqueous dispersion of the present disclosure, the microcapsule which is a dispersoid has the shell having the three-dimensional cross-linked structure containing at least one bond selected from a urethane bond or a urea bond (hereinafter, will also be referred to as "urethane bond and the like").

Meanwhile, the dispersant in the aqueous dispersion of the present disclosure also contains at least one bond selected from a urethane bond or a urea bond (hereinafter, will also be referred to as "urethane bond and the like").

In the aqueous dispersion of the present disclosure, an interaction (for example, an interaction due to hydrogen bonding) is generated between the urethane bond or the like contained in the shell of the microcapsule, and the urethane bond or the like contained in the dispersant.

According to the aqueous dispersion of the present disclosure, it is considered that the interaction between the shell and the dispersant, is combined with a dispersing action of the anionic group of the dispersant, thereby improving the dispersion stability of the microcapsule.

In addition, in the present disclosure, it is considered that the shell having the three-dimensional cross-linked structure containing the urethane bond or the like also contributes to the dispersion stability of the microcapsule.

That is, the microcapsule in the present disclosure includes the shell having the three-dimensional cross-linked structure containing the urethane bond or the like, and thus has a firm structure. It is considered that a structure of each microcapsule is firm, leading to the suppression of aggregation or linking between microcapsules, and therefore dispersion stability of the microcapsule is improved.

In addition, in the present disclosure, it is considered that the conditions in which the weight-average molecular weight of the dispersant is 5000 or more, and the anionic group value of the dispersant is 2.50 mmol/g or less also contribute to the dispersion stability of the microcapsules. It is considered that the reason is because, with the conditions in which the weight-average molecular weight of the dispersant is 5000 or more, and the anionic group value of the dispersant is 2.50 mmol/g or less, hydrophobicity of the entire dispersant becomes high, and as a result, the interaction between the dispersant and the shell becomes stronger.

In addition, in the present disclosure, it is considered that the condition in which the anionic group value of the dispersant is 0.10 mmol/g or more also contributes to the dispersion stability of the microcapsules. It is considered that the reason is because, with the condition in which the anionic group value of the dispersant is 0.10 mmol/g or more, an amount of the anionic group having the dispersing action is secured to some extent.

In examples described later, the dispersion stability of the microcapsule is evaluated by evaluating jetting properties from an ink jet head and storage stability.

Next, the presumed reason why a film having excellent hardness can be formed by the aqueous dispersion of the present disclosure will be described.

The aqueous dispersion of the present disclosure includes the microcapsule having a polymerizable group, and therefore has a property of being cured by polymerization. The polymerization (curing) is carried out by at least one selected from the group consisting of photoirradiation, heating, and infrared ray irradiation.

Therefore, it is considered that, in a case of forming a film using the aqueous dispersion of the present disclosure and curing the formed film, the film having excellent hardness can be formed.

In addition, it is considered that the condition in which the shell of the microcapsule has the firm three-dimensional cross-linked structure also contributes to the improvement in the film hardness.

In the examples described later, the hardness of the formed film is evaluated by evaluating pencil hardness of an image.

In the aqueous dispersion of the present disclosure, as the polymerizable group (polymerizable group contained in at least the core or the shell) of the microcapsule, a photopolymerizable group or a thermally polymerizable group is preferable.

As the photopolymerizable group, a radically polymerizable group is preferable, a group containing an ethylenic double bond is more preferable, and a group containing at least one of a vinyl group or a 1-methylvinyl group is even more preferable. As the radically polymerizable group, a (meth)acryloyl group is particularly preferable from the viewpoints of a radical polymerization reactivity and hardness of a formed film.

The thermally polymerizable group is preferably an epoxy group, an oxetanyl group, an aziridinyl group, an azetidinyl group, a ketone group, an aldehyde group, or a blocked isocyanate group.

The microcapsule may have only one kind of the polymerizable group or may have two or more kinds thereof.

Whether the "microcapsule has the polymerizable group" can be checked by, for example, Fourier transform infrared spectroscopy (FT-IR).

In the aqueous dispersion of the present disclosure, in the microcapsule, the polymerizable group may be contained in any one of the core or the shell or may be contained in both.

From the viewpoint of the film hardness, it is preferable that at least the core has the polymerizable group, and it is more preferable that the core contains the polymerizable compound.

The term "polymerizable compound" referred herein means a polymerizable compound capable of being contained in the core (internal polymerizable compound), among all compounds having the polymerizable group. The term "isocyanate compound into which the polymerizable group is introduced", which is for introducing the polymerizable group into the shell does not include a concept of the term "polymerizable compound" referred herein.

Each of preferable aspects of the "polymerizable compound" (internal polymerizable compound) and the "isocyanate compound into which the polymerizable group is introduced" will be described later.

Furthermore, according to the aqueous dispersion of the present disclosure, it is possible to form a film having excellent adhesiveness to a substrate.

The reason why the film having excellent adhesiveness to a substrate can be formed is considered to be the same as the presumed reason why the film having excellent hardness can be formed.

In addition, it is considered that the conditions in which the weight-average molecular weight of the dispersant is 5000 or more, and the anionic group value of the dispersant is 2.50 mmol/g or less contribute to higher hydrophobicity of the entire dispersant, and improvement in adhesiveness of the film to a substrate.

In addition, the aqueous dispersion of particles is required to have redispersibility in some cases.

The term "redispersibility" means the properties in which in a case where an aqueous liquid (for example, water, an aqueous solution, an aqueous dispersion, or the like) is supplied to a solidified product formed by the evaporation of water from the aqueous dispersion, the particles (in this case, microcapsules) in the solidified product are dispersed again in the aqueous liquid. Examples of the solidified product include a solidified product of the aqueous dispersion formed by an application head or an ink jet head.

Because the aqueous dispersion of the present disclosure contains the microcapsule, the aqueous dispersion also has excellent redispersibility.

It is considered that the reason for having excellent redispersibility is the same as the reason why the dispersion stability of the microcapsule is excellent.

Furthermore, in the aqueous dispersion of the present disclosure, the shell of the microcapsule does not necessarily have the hydrophilic group. In the aqueous dispersion of the present disclosure, even though the shell of the microcapsule does not have the hydrophilic group, the dispersant has the anionic group, thereby suitably securing the dispersion stability of the microcapsule.

That is, it is not necessary to incorporate the hydrophilic group into the shell, and a high degree of freedom of forming the shell (ease of forming the shell) is one of the advantages of the aqueous dispersion of the present disclosure.

In addition, in the case where the shell of the microcapsule has the hydrophilic group, the action of the hydrophilic group of the shell is combined with the action of the anionic group of the dispersant, thereby further improving the dispersion stability of the microcapsule.

The condition that the dispersion stability of the microcapsule can be further improved in the case where the shell of the microcapsule has the hydrophilic group, is one of the advantages of the aqueous dispersion of the present disclosure.

A preferable aspect of the dispersant contained in the aqueous dispersion of the present disclosure will be described later.

In addition, in the aqueous dispersion of the present disclosure, a ratio of a content mass of the dispersant to a content mass of a total solid content of the microcapsule (hereinafter, will be referred to as mass ratio [dispersant/MC solid content]) is preferably from 0.005 to 4.000, more preferably from 0.100 to 4.000, even more preferably from 0.200 to 2.500, and particularly preferably from 0.200 to 2.000.

With the mass ratio [dispersant/MC solid content] being 0.005 or more, the dispersion stability of the microcapsule is further improved.

With the mass ratio [dispersant/MC solid content] being 4.000 or less, the hardness of a film to be formed is further improved. It is considered that the reason is because in the aqueous dispersion, an amount of the microcapsule is secured to some extent, and therefore an amount of curable components (polymerizable group and the like) is also secured to some extent.

A mass ratio [dispersant/MC solid content] in the aqueous dispersion liquid can be checked by the following method.

First, the microcapsules and the dispersant are removed from the aqueous dispersion liquid by centrifugation. Next, the removed microcapsules and the dispersant are washed with a solvent so as to be separated into the dispersant and the core as a component to be dissolved in the solvent, and the shell as a residual component (that is, a component insoluble in the solvent). Next, identification and quantification of each component are carried out by analysis means such as high-performance liquid chromatography (HPLC), mass spectrometry (MS), nuclear magnetic resonance spectroscopy (NMR), and the like. Based on the obtained results, a mass ratio of the dispersant with respect to a total amount of the core and the shell (that is, MC solid content), that is, the mass ratio [dispersant/MC solid content] is determined.

From the viewpoint of more effectively obtaining the effects of the aqueous dispersion of the present disclosure, the total amount of the total solid content of the microcapsule and the dispersant is preferably 50% by mass or more, more preferably 60% by mass or more, even more preferably 70% by mass or more, still more preferably 80% by mass or more, and yet more preferably 85% by mass or more, with respect to the total solid content of the aqueous dispersion.

The total solid content of the microcapsule and the total amount of the dispersant in the aqueous dispersion of the present disclosure are preferably 1% by mass to 50% by mass, more preferably 3% by mass to 40% by mass, and even more preferably 5% by mass to 30% by mass, with respect to a total amount of the aqueous dispersion.

With the total amount being 1% by mass or more, the hardness of a film to be formed is further improved. With the total amount being 50% by mass or less, the dispersion stability of the microcapsule becomes excellent.

In the aqueous dispersion of the present disclosure, a volume average dispersing particle diameter of the microcapsule is preferably 0.01 μm to 10.0 μm, more preferably 0.01 μm to 5 μm, and even more preferably 0.05 μm to 1 μm, still more preferably 0.05 μm to 0.5 μm, yet more preferably 0.05 μm to 0.3 μm, and particularly preferably 0.1 μm to 0.3 μm, from the viewpoint of the dispersion stability of the microcapsule.

In the present specification, the term "volume average dispersing particle diameter of the microcapsule" indicates a value measured by a light scattering method. The measurement of a volume average dispersing particle diameter of the microcapsule by the light scattering method is carried out by using, for example, LA-960 (manufactured by HORIBA, Ltd.).

In addition, the term "volume average dispersing particle diameter of the microcapsule" means a volume average particle diameter of the microcapsules in a state of having been dispersed by the dispersant.

The aqueous dispersion of the present disclosure can be suitably used as a liquid for forming a film (for example, image) on a substrate (for example, recording medium).

Examples of such liquid include an ink jet ink for forming an image on a substrate as a recording medium, an application liquid (so-called a coating liquid) for forming a coated film on a substrate, and the like.

The aqueous dispersion of the present disclosure is particularly preferably used as an ink jet ink. Therefore, an image in which the adhesiveness to a recording medium and the hardness are excellent can be formed. Furthermore, in this case, the aqueous dispersion has excellent jetting properties from an ink jet head and storage stability.

An ink jet ink which is one of usage of the aqueous dispersion of the present disclosure may be an ink jet ink containing a coloring material or may be an ink jet ink not containing a coloring material (also referred to as "clear ink" and the like).

The same applies to the application liquid which is another usage of the aqueous dispersion of the present disclosure.

In a case where the aqueous dispersion of the present disclosure is used as an ink jet ink containing the coloring material, gloss of an image to be formed can be improved.

It is presumed that the reason is because the above-described dispersant which interacts with the microcapsule, becomes to interact with the coloring material in the case of the aqueous dispersion applied onto a recording medium.

In the present disclosure, a substrate for forming a film is not particularly limited, and a known substrate can be used.

Examples of the substrate include paper, paper on which plastic (for example, polyethylene, polypropylene, polystyrene, and the like) is laminated, a metal plate (for example, a metal plate such as aluminum, zinc, and copper), a plastic film (for example, films of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinyl acetal, acrylic resin, and the like), paper on which the aforementioned metal is laminated or vapor-deposited, a plastic film on which the aforementioned metal is laminated or vapor-deposited, and the like.

The aqueous dispersion of the present disclosure is particularly suitable for uses in which a film is formed on a nonabsorbent substrate, because the aqueous dispersion makes it possible to form a film exhibiting excellent adhesiveness with respect to a substrate.

As the nonabsorbent substrate, plastic substrates such as PVC substrate, PS substrate, PC substrate, PET substrate, glycol-modified PET substrate, PE substrate, PP substrate, and acrylic resin substrate, or a paper substrate laminated with plastic is preferable.

The surface of the substrate may be subjected to a corona treatment in advance.

According to the ink of the present disclosure, an image having excellent adhesiveness not only to a usual plastic substrate such as a PET substrate, but also to a substrate of which adhesiveness to images is difficult to ensure in image formation by an aqueous ink, can be formed.

Examples of the substrate of which adhesiveness to images is difficult to ensure in image formation by an aqueous ink include hydrophobic substrate not having a polar group.

Examples of the hydrophobic substrate not having a polar group include a PS substrate, a corona-treated PP substrate (hereinafter referred to as "corona PP"), a PE substrate, a paper substrate laminated with PE, and the like.

Hereinafter, each component of the aqueous dispersion of the present disclosure will be described.

<Dispersant>

The aqueous dispersion of the present disclosure contains the dispersant in which at least one bond selected from a urethane bond or a urea bond and an anionic group are contained, the weight-average molecular weight is 5000 or more, and the anionic group value is from 0.10 mmol/g to 2.50 mmol/g. The aqueous dispersion of the present disclosure may contain one kind of the dispersant or may contain two or more kinds thereof.

In the aqueous dispersion of the present disclosure, the dispersant has a function of dispersing the microcapsule in an aqueous medium (medium containing water).

A preferable aspect of the aqueous dispersion of the present disclosure is an aspect which is a state in which the dispersant is adsorbed on the shell of the microcapsule through the interaction between the dispersant and the shell of the microcapsule (for example, an interaction due to hydrogen bonding). The interaction between the dispersant and the shell is not a covalent bond.

The interaction between the dispersant and the shell being not a covalent bond, can be confirmed by the following analysis.

First, the dispersant and the microcapsules are removed from the aqueous dispersion liquid by centrifugation. Next, the removed dispersant and microcapsules are washed with a solvent so as to be separated into the dispersant and the core as a component to be dissolved in the solvent, and the shell as a residual component (that is, a component insoluble in the solvent). Each of the separated components is subjected to Fourier transform infrared spectroscopy (FT-IR), and therefore the interaction between the dispersant and the shell being not a covalent bond can be confirmed.

The weight-average molecular weight (Mw) of the dispersant is 5000 or more, but from the viewpoint of improving the dispersion stability, the weight-average molecular weight is preferably from 5000 to 200000, more preferably from 10000 to 100000, even more preferably from 15000 to 80000, and particularly preferably from 20000 to 60000.

In the present specification, a weight-average molecular weight (Mw) means a value is measured by gel permeation chromatography (GPC).

In the measurement by gel permeation chromatography (GPC), HLC (registered trademark)-8020 GPC (manufactured by Tosoh Corporation) may be used as a measurement device, three columns of TSKgel (registered trademark) Super Multipore HZ-H (4.6 mm ID×15 cm, manufactured by Tosoh Corporation) may be used as columns, and tetrahydrofuran (THF) is used as an eluent. Furthermore, GPC is performed using an RI detector under the measurement conditions of a sample concentration of 0.45% by mass, a flow rate of 0.35 ml/min, a sample injection amount of 10 μl, and a measurement temperature of 40° C.

A calibration curve is prepared from 8 samples of "Standard Sample TSK standard, polystyrene" manufactured by Tosoh Corporation: "F-40," "F-20," "F-4," "F-1," "A-5000," "A-2500," "A-1000," and "n-propylbenzene."

The dispersant contains an anionic group.

Accordingly, the dispersion stability of the microcapsule can be improved.

The dispersant preferably contains Structural Unit (B) to be described later, which is a structural unit having the anionic group.

In addition, an anionic group value of the dispersant is from 0.10 mmol/g to 2.50 mmol/g. Accordingly, the dispersion stability of the microcapsule is improved.

In details, with the condition in which the anionic group value of the dispersant is 0.10 mmol/g or more, an amount of the anionic group having the dispersing action is secured to some extent, and as a result, the dispersion stability of the microcapsule is improved.

In addition, on the other hand, with the condition in which the anionic group value of the dispersant is 2.50 mmol/g or less, hydrophobicity of the dispersant itself becomes high, and the interaction between the dispersant and the microcapsule becomes stronger, and as a result, the dispersion stability of the microcapsule is improved.

Furthermore, the condition in which the anionic group value of the dispersant is 2.50 mmol/g or less (that is, high hydrophobicity of the dispersant itself) also contributes to improvement in the adhesiveness of the film to a substrate.

The anionic group value of the dispersant is preferably from 0.30 mmol/g to 2.00 mmol/g, and more preferably from 0.30 mmol/g to 1.50 mmol/g.

In the present disclosure, the anionic group value is the number of millimoles of the anionic group contained in 1 g of the dispersant. The anionic group value in the present disclosure is a value obtained by neutralization titration.

The anionic group in the dispersant may be an unneutralized anionic group or may be a neutralized anionic group.

Examples of the unneutralized anionic group include a carboxy group, a sulfo group, a sulfate group, a phosphonic acid group, a phosphoric acid group, and the like.

Examples of the neutralized anionic group include a salt of a carboxy group, a salt of a sulfo group, a salt of a sulfate group, a salt of a phosphonic acid group, a salt of a phosphoric acid group, and the like.

In the present specification, the term "neutralized carboxy group" refers to a carboxy group as the anionic group being in the form of "salt" (for example, "—COONa"). The same applied to a sulfo group, a sulfate group, a phosphonic acid group, and a phosphoric acid group as the anionic group.

The neutralization can be carried out by using alkali metal hydroxides (for example, sodium hydroxides, potassium hydroxides, and the like), and organic amines (for example, triethylamine and the like).

As the anionic group capable of being contained in the dispersant, at least one selected from the group consisting of a carboxy group, a salt of a carboxy group, a sulfo group, a salt of a sulfo group, a sulfate group, a salt of a sulfate group, a phosphonic acid group, a salt of a phosphonic acid group, a phosphoric acid group, and a salt of a phosphoric acid group is preferable, and at least one selected from the group consisting of a carboxy group and a salt of a carboxy group is more preferable, from the viewpoint of the dispersion stability.

As the "salt" in the salt of a carboxy group, the salt of a sulfo group, the salt of a sulfate group, the salt of a phosphonic acid group, and the salt of a phosphoric acid group, which are described above, an alkali metal salt or an organic amine salt is preferable, and an alkali metal salt is more preferable.

As an alkali metal in the alkali metal salt, K or Na is preferable.

A degree of neutralization of the dispersant is preferably from 50% to 100% and more preferably from 70% to 90%.

The degree of neutralization referred herein refers to a ratio of "the number of neutralized anionic group" (that is, ratio [the number of neutralized anionic group/(the number of unneutralized anionic group+the number of neutralized anionic group)]) with respect to "a total of the number of unneutralized anionic group and the number of neutralized anionic group" in the entire dispersant contained in the aqueous dispersion liquid.

The degree of neutralization (%) of the dispersant is measured by neutralization titration.

In addition, the degree of neutralization of the anionic group of the all dispersants and microcapsules is preferably 50% to 100% and more preferably 70% to 95%. The degree of neutralization referred herein refers to a ratio of "the number of neutralized anionic group" (that is, ratio [the number of neutralized anionic group/(the number of unneutralized anionic group+the number of neutralized anionic group)]) with respect to "a total of the number of unneutralized anionic group and the number of neutralized anionic group" in the all dispersants and microcapsules contained in the aqueous dispersion liquid.

The degree of neutralization (%) of the all dispersants and microcapsules is also measured by neutralization titration.

The degree of neutralization (%) of the all dispersants and microcapsules in the aqueous dispersion of the present disclosure is calculated as below.

First, an aqueous dispersion containing the dispersants and the microcapsules which is a measurement target is prepared.

50 g of the prepared aqueous dispersion is subjected to centrifugation under the conditions of 80,000 rounds per minute (rpm; the same shall apply hereinafter) and 40 minutes. The supernatant generated by the centrifugation is removed, and the precipitate (dispersants and microcapsules) is collected.

Approximately 0.5 g of the dispersants and the microcapsules collected in a container 1 is weighed, and a weighed value W1 (g) is recorded. Subsequently, a mix solution of 54 mL of tetrahydrofuran (THF) and 6 mL of distilled water is added thereto, and the weighed dispersants and microcapsules are diluted so as to obtain a sample 1 for measurement of degree of neutralization.

Titration is performed on the obtained sample 1 for measurement of degree of neutralization by using 0.1 N (=0.1 mol/L) aqueous solution of sodium hydroxide as a titrant, and a titrant volume required up to the equivalent point is recorded as F1 (mL). In a case where a plurality of equivalent points were obtained in the titration, a maximum value among a plurality of titrant volumes required up to a plurality of equivalent points was taken as F1 (mL). The product of F1 (mL) and the normality of the aqueous solution of sodium hydroxide (0.1 mol/L) corresponds to the millimolar number of unneutralized anionic groups (for example, —COOH) among anionic groups contained in the dispersants and the microcapsules.

In addition, approximately 0.5 g of the dispersants and the microcapsules collected in a container 2 is weighed, and a weighed value W2 (g) is recorded. Subsequently, 60 mL of acetate is added thereto, and the weighed dispersants and microcapsules are diluted so as to obtain a sample 2 for measurement of degree of neutralization.

Titration is performed on the obtained sample 2 for measurement of degree of neutralization by using 0.1 N (=0.1 mol/L) perchloric acid-acetic acid solution as a titrant, and a titrant volume required up to the equivalent point is recorded as F2 (mL). In a case where a plurality of equivalent points were obtained in the titration, a maximum value among a plurality of titrant volumes required up to a plurality of equivalent points was taken as F2 (mL). The product of F2 (mL) and the normality of a perchloric acid-acetic acid solution (0.1 mol/L) corresponds to the millimolar number of neutralized anionic groups (for example, —COONa) among anionic groups contained in the dispersants and the microcapsules.

Based on the measurement values of "F1 (mL)" and "F2 (mL)", the degree of neutralization (%) of the anionic groups is calculated according to the following equations.

$F1$ (mL)×normality of aqueous solution of sodium hydroxide (0.1 mol/L)/$W1$ (g)+$F2$ (mL)×normality of perchloric acid-acetic acid solution (0.1 mol/L)/$W2$ (g)=a total of the millimolar number of anionic groups contained in a total of 1 g of the dispersants and the microcapsules (a total of the millimolar number of neutralized anionic groups and unneutralized anionic groups) (mmol/g) (1)

$F2$ (mL)×normality of perchloric acid-acetic acid solution (0.1 mol/L)/$W2$ (g)=the millimolar number of neutralized anionic groups among anionic groups contained in a total of 1 g of the dispersants and the microcapsules (mmol/g) (2)

Degree of neutralization (%)=(2)/(1)×100

(Structural Unit (C))

The dispersant preferably contains Structural Unit (C). Accordingly, hydrophobicity of the dispersant becomes high, and as a result, the dispersion stability of the microcapsule, and the adhesiveness between the film and the substrate are further improved.

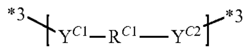

(C)

In Structural Unit (C), $R^{C1}$ represents a divalent organic group, and in a case of assuming a compound $HR^{C1}H$ in which a hydrogen atom is bonded to each of two binding positions of the divalent organic group, $R^{C1}$ represents the divalent organic group which allows C log P of the compound $HR^{C1}H$ to be 0.50 or more (preferably 1.00 or more), $Y^{C1}$ represents O, S, NH, or $NZ^{C1}$, $Y^{C2}$ represents O, S, NH, or $NZ^{C2}$, $Z^{C1}$ and $Z^{C2}$ each independently represent a hydrocarbon group having 1 to 10 carbon atoms, and two *3's each independently represent a binding position with a structural unit other than Structural Unit (C).

The sentence "two *3's each independently represent a binding position with a structural unit other than Structural Unit (C)" referred to herein means that Structural Units (C) do not directly bond to each other in the dispersant.

There may be only one or two or more kinds of structural units other than Structural Unit (C), which is bonded to the site of *3 in Structural Unit (C).

The structural units other than Structural Unit (C) are not particularly limited, and examples thereof include Structural Unit (A) to be described later. In addition, in a case where the dispersant contains a structural unit derived from an isocyanate compound other than Structural Unit (A), examples of the structural units other than Structural Unit (C) include structural units derived from an isocyanate compound other than Structural Unit (A).

$R^{C1}$ represents the divalent organic group, and in the case of assuming the compound $HR^{C1}H$ in which a hydrogen atom is bonded to each of two binding positions of the divalent organic group, $R^{C1}$ represents the divalent organic group which allows C log P of the compound $HR^{C1}H$ to be 0.50 or more (preferably 1.00 or more).

In other words, $R^{C1}$ is a divalent organic group in which two hydrogen atoms are removed from the compound $HR^{C1}H$.

Hereinafter, C log P of the compound $HR^{C1}H$ will be referred to as "C log P (RC1)."

Herein, the term "C log P" is a parameter representing the hydrophobicity of a compound. The parameter indicates that as a value of C log P becomes greater, the hydrophobicity of a compound becomes high.

C log P is a value obtained by calculating a common logarithm log P of a partition coefficient P to 1-octanol and water. For a method and software used to calculate the C log P value, known methods and software can be used, respectively.

C log P (for example, C log P of the compound $HR^{C1}H$) in the present specification means a value obtained by C log P program incorporated into a system, "PCModels" of Daylight Chemical Information Systems, Inc.

C log P ($R^{C1}$) (that is, C log P of the compound $HR^{C1}H$) is preferably 1.00 or more, more preferably 2.00 or more, and even more preferably 3.00 or more, from the viewpoints of further improving the dispersion stability of the microcapsule and the adhesiveness between the film and the substrate.

An upper limit of C log P ($R^{C1}$) is not particularly limited, and the upper limit is, for example, 25.00.

As long as $R^{C1}$ is the divalent organic group which allows C log P of the compound $HR^{C1}H$ to be 0.50 or more (preferably 1.00 or more), $R^{C1}$ is not particularly limited.

From the viewpoint of further improving the dispersion stability of the microcapsule, as $R^{C1}$, a divalent organic group in which two hydroxy groups are removed from a diol compound (that is, a compound having two hydroxy groups), or a divalent organic group in which two amino groups are removed from a diamine compound (that is, a compound having two amino groups) is preferable.

In the case where $R^{C1}$ is the divalent organic group in which two hydroxy groups are removed from a diol compound, both $Y^{C1}$ and $Y^{C2}$ in Structural Unit (C) are preferably O.

In the case where $R^{C1}$ is the divalent organic group in which two amino groups are removed from a diamine compound, it is preferable that $Y^{C1}$ in Structural Unit (C) is NH or $NZ^{C1}$, and $Y^{C2}$ in Structural Unit (C) is NH or $NZ^{C2}$.

A molecular weight of the above-described diol compound or diamine compound which can form $R^{C1}$ is appropriately adjusted according to the weight-average molecular weight (Mw) of the dispersant.

The molecular weight of the diol compound or diamine compound which can form $R^{C1}$ is, for example, 60 or more. The molecular weight 60 is a molecular weight of ethylene diamine.

An upper limit of the molecular weight is appropriately adjusted according to the weight-average molecular weight (Mw) of the dispersant. Examples of an upper limit of a number average molecular weight (Mn) of the diol compound or diamine compound which can form $R^{C1}$ include 30000, and 20000 is preferable and 10000 is more preferable.

The number average molecular weight (Mn) refers to a value measured by GPC with the above-described conditions.

The diol compound for forming $R^{C1}$ is preferably polyalkylene glycol (preferably polyethylene glycol or polytetramethylene glycol), polymer diol (that is, a polymer having two hydroxy groups), or a diol compound having 2 to 50 carbon atoms (hereinafter simply referred to as "diol compound having 2 to 50 carbon atoms") other than polyalkylene glycol and polymer diol.

The diamine compound for forming $R^{C1}$ is preferably polyoxyalkylene diamine (preferably polyoxypropylene diamine), polymer diamine (that is, a polymer having two amino groups), or a diamine compound having 2 to 50 carbon atoms (hereinafter simply referred to as "diamine compound having 2 to 50 carbon atoms") other than polyoxyalkylene diamine and polymer diamine.

Examples of the polymer diol include polyester diol, polycarbonate diol, polycaprolactone diol, polybutadiene diol, polyisoprene diol, polyolefin diol, and the like, and polyester diol or polycarbonate diol is preferable.

As the polymer diol, commercially available products shown in Table 1 may be used.

TABLE 1

| Polymer diol | | | |
|---|---|---|---|
| Type | Product name | Manufacturer name | Mn |
| Polyester (PES) diol | DYNACOLL (registered trademark) 7110 | Evonik Industries | 2000 |
| | DYNACOLL (registered trademark) 7111 | Evonik Industries | 3500 |
| | DYNACOLL (registered trademark) 7360 | Evonik Industries | 3500 |
| | DYNACOLL (registered trademark) 7361 | Evonik Industries | 8500 |
| | Kuraray (registered trademark) PloyolP-510 | KURARAY CO., LTD. | 500 |
| | Kuraray (registered trademark) PloyolP-1010 | KURARAY CO., LTD. | 1000 |
| | Kuraray (registered trademark) PloyolP-3010 | KURARAY CO., LTD. | 3000 |
| | Kuraray (registered trademark) PloyolP-6010 | KURARAY CO., LTD. | 6000 |
| | Kuraray (registered trademark) PloyolP-2020 | KURARAY CO., LTD. | 2000 |
| | FSK700 | Kawasaki Kasei Chemicals Ltd. | 700 |
| | FSK2000 | Kawasaki Kasei Chemicals Ltd. | 2000 |
| | UE3220 | UNITIKA LTD. | 25000 |
| | UE3500 | UNITIKA LTD. | 30000 |
| | UE3200 | UNITIKA LTD. | 16000 |
| | UE3201 | UNITIKA LTD. | 20000 |
| | UE3210 | UNITIKA LTD. | 20000 |
| | TL 2462 | Hitachi Chemical Co., Ltd. | 2000 |
| | VYLON (registered trademark) 200 | Toyobo Co., Ltd. | 17000 |
| | VYLON (registered trademark) 240 | Toyobo Co., Ltd. | 15000 |
| | VYLON (registered trademark) 300 | Toyobo Co., Ltd. | 23000 |
| | VYLON (registered trademark) 500 | Toyobo Co., Ltd. | 23000 |
| | VYLON (registered trademark) 802 | Toyobo Co., Ltd. | 3000 |
| | VYLON (registered trademark) GK360 | Toyobo Co., Ltd. | 16000 |
| Polycarbonate (PC) diol | DURANOL (registered trademark) T6002 | Asahi Kasei Chemicals Corporation | 2000 |
| | DURANOL (registered trademark) T6001 | Asahi Kasei Chemicals Corporation | 1000 |
| | DURANOL (registered trademark) T5650E | Asahi Kasei Chemicals Corporation | 500 |
| | DURANOL (registered trademark) T5652 | Asahi Kasei Chemicals Corporation | 2000 |
| | Placcel (registered trademark) CD205PL | Daicel Corporation | 500 |
| | Placcel (registered trademark) CD210 | Daicel Corporation | 1000 |
| | Placcel (registered trademark) CD220 | Daicel Corporation | 2000 |
| Polycaprolactone (PCL) diol | Placcel (registered trademark) 205 | Daicel Corporation | 530 |
| | Placcel (registered trademark) 212 | Daicel Corporation | 1250 |
| | Placcel (registered trademark) 230 | Daicel Corporation | 3000 |
| Polybutadiene (PBD) diol | NISSO-PB (registered trademark) G-1000 | Nippon Soda Co., Ltd. | 1400 |
| | NISSO-PB (registered trademark) G-3000 | Nippon Soda Co., Ltd. | 3000 |
| | Poly bd R-45HT | Idemitsu Kosan Co., Ltd. | 2800 |
| Polyisoprene (PIP) diol | POLY IP | Idemitsu Kosan Co., Ltd. | 2500 |

TABLE 1-continued

| Polymer diol | | | |
|---|---|---|---|
| Type | Product name | Manufacturer name | Mn |
| Polyolefin | NISSO-PB (registered trademark) BI-2000 | Nippon Soda Co., Ltd. | 2100 |
| (PO) diol | EPOL (registered trademark) | Idemitsu Kosan Co., Ltd. | 2500 |

From the viewpoint of further improving the dispersion stability of the microcapsule and the adhesiveness between the film and the substrate, $R^{C1}$ is even more preferably a divalent polyalkyleneoxy group in which two hydroxy groups are removed from polyalkylene glycol; a divalent polycarbonate group in which two hydroxy groups are removed from polycarbonate diol; a divalent polyester group in which two hydroxy groups are removed from polyester diol; a divalent organic group in which two hydroxy groups are removed from a diol compound having 2 to 50 carbon atoms other than polyalkylene glycol, polycarbonate diol, and polyester diol; or the divalent organic group in which two amino groups are removed from the diamine compound having 2 to 50 carbon atoms.

In the case where $R^{C1}$ is the divalent polyalkyleneoxy group, both $Y^{C1}$ and $Y^{C2}$ in Structural Unit (C) are preferably O.

In the case where $R^{C1}$ is the divalent polycarbonate group, both $Y^{C1}$ and $Y^{C2}$ in Structural Unit (C) are preferably O.

In the case where $R^{C1}$ is the divalent polyester group, both $Y^{C1}$ and $Y^{C2}$ in Structural Unit (C) are preferably O.

In the case where $R^{C1}$ is the divalent organic group in which two hydroxy groups are removed from the diol compound having 2 to 50 carbon atoms other than polyalkylene glycol, polycarbonate diol, and polyester diol, both $Y^{C1}$ and $Y^{C2}$ in Structural Unit (C) are preferably O.

In the case where $R^{C1}$ is the divalent organic group in which two amino groups are removed from the diamine compound having 2 to 50 carbon atoms, it is preferable that $Y^{C1}$ in Structural Unit (C) is NH or $NZ^{C1}$, and $Y^{C2}$ in Structural Unit (C) is NH or $NZ^{C2}$.

The number of repetitions of the divalent polyalkyleneoxy group represented by $R^{C1}$ is preferably 2 to 50, more preferably 4 to 50, and particularly preferably 6 to 40.

The divalent polyalkyleneoxy group represented by $R^{C1}$ is particularly preferably a divalent polypropyleneoxy group or a divalent polytetramethyleneoxy group.

The number of repetitions of the divalent polycarbonate group represented by $R^{C1}$ is preferably 2 to 50, more preferably 4 to 30, and particularly preferably 6 to 20.

The number of repetitions of the divalent polyester group represented by $R^{C1}$ is preferably 2 to 50, more preferably 4 to 30, and particularly preferably 6 to 20.

In the divalent organic group in which two hydroxy groups are removed from the diol compound having 2 to 50 carbon atoms other than polyalkylene glycol, polycarbonate diol, and polyester diol, which are represented by $R^{C1}$ (hereinafter simply referred to as diol compound having 2 to 50 carbon atoms"), the number of carbon atoms of the diol compound having 2 to 50 carbon atoms is preferably from 5 to 50, and more preferably from 6 to 50.

The number of carbon atoms of the divalent organic group in which two amino groups are removed from the diamine compound having 2 to 50 carbon atoms, which are represented by $R^{C1}$, is preferably from 5 to 50, and more preferably from 6 to 50.

Specific examples of the diol compounds having 2 to 50 carbon atoms for forming $R^{C1}$ are exemplified below, and the compound $HR^{C1}H$ corresponding to each diol compound is shown under each diol compound (that is, each specific example).

For each diol compound and each compound $HR^{C1}H$, a molecular weight, a C log P, and the like are described together.

The diol compound having 2 to 50 carbon atoms for forming $R^{C1}$ is, in other words, a diol compound having 2 to 50 carbon atoms having a structure in which a hydroxy group is bonded to the two binding positions of $R^{C1}$.

The compound $HR^{C1}H$ corresponding to the diol compound is a compound in which two hydroxy groups are removed from the diol compound to form $R^{C1}$, and a hydrogen atom is bonded to each of the two binding positions of $R^{C1}$.

For example, in the explanation of the first example below, the compound $HR^{C1}H$ corresponding to ethylene glycol (structural formula of $HO—CH_2CH_2—OH$) as the diol compound is ethane (structural formula of $CH_3—CH_3$).

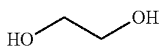

Chemical Formula: $C_2H_6O_2$
Molecular Weight: 62.07
CLogP: -1.3692

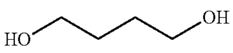

Chemical Formula: $C_4H_{10}O_2$
Molecular Weight: 90.12
CLogP: -1.164

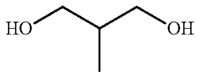

Chemical Formula: $C_4H_{10}O_2$
Molecular Weight: 90.12
CLogP: -0.638

Chemical Formula: $C_2H_6$
Molecular Weight: 30.07
CLogP: 1.752

Chemical Formula: $C_4H_{10}$
Molecular Weight: 58.12
CLogP: 2.81

Chemical Formula: $C_4H_{10}$
Molecular Weight: 58.12
CLogP: 2.68

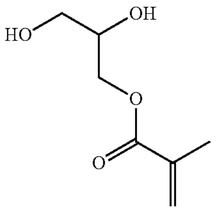

Chemical Formula: $C_7H_{12}O_4$
Molecular Weight: 160.17
CLogP: -0.522

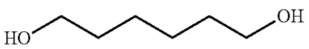

Chemical Formula: $C_8H_{14}O_2$
Molecular Weight: 118.17
CLogP: -0.106

-continued

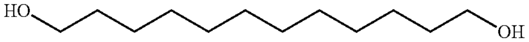

Chemical Formula: $C_{12}H_{26}O_2$
Molecular Weight: 202.33
CLogP: 3.068

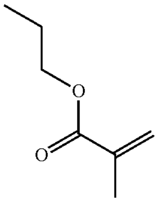

Chemical Formula: $C_7H_{12}O_2$
Molecular Weight: 128.17
CLogP: 2.164

Chemical Formula: $C_6H_{14}$
Molecular Weight: 86.18
CLogP: 3.868

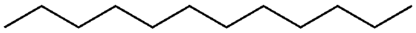

Chemical Formula: $C_{12}H_{26}$
Molecular Weight: 170.33
CLogP: 7.042

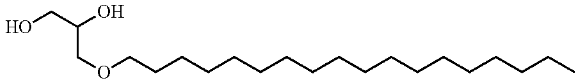

Chemical Formula: $C_{21}H_{44}O_3$
Molecular Weight: 344.57
CLogP: 7.4214

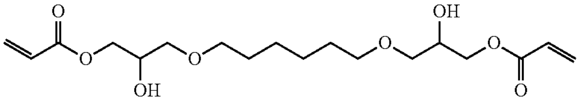

Chemical Formula: $C_{18}H_{30}O_8$
Molecular Weight: 374.43
CLogP: 1.0056

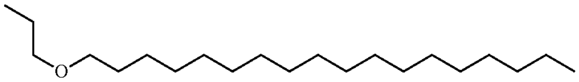

Chemical Formula: $C_{21}H_{44}O$
Molecular Weight: 312.57
CLogP: 9.863

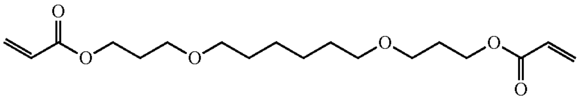

Chemical Formula: $C_{18}H_{30}O_6$
Molecular Weight: 342.43
CLogP: 3.39

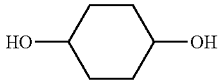

Chemical Formula: $C_6H_{12}O_2$
Molecular Weight: 116.16
CLogP: -0.82

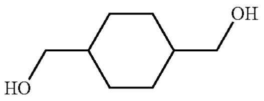

Chemical Formula: $C_8H_{16}O_2$
Molecular Weight: 144.21
CLogP: 0.418

-continued

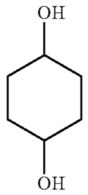

Chemical Formula: $C_6H_{12}O_2$
Molecular Weight: 116.16
CLogP: -0.82

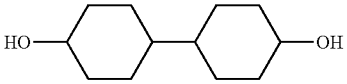

Chemical Formula: $C_{12}H_{22}O_2$
Molecular Weight: 198.30
CLogP: 1.73

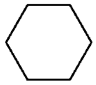

Chemical Formula: $C_6H_{12}$
Molecular Weight: 84.16
CLogP: 3.354

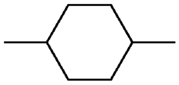

Chemical Formula: $C_8H_{16}$
Molecular Weight: 112.21
CLogP: 4.392

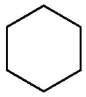

Chemical Formula: $C_6H_{12}$
Molecular Weight: 84.16
CLogP: 3.354

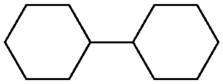

Chemical Formula: $C_{12}H_{22}$
Molecular Weight: 166.30
CLogP: 5.904

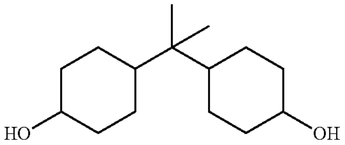

Chemical Formula: $C_{15}H_{28}O_2$
Molecular Weight: 240.38
CLogP: 3.147

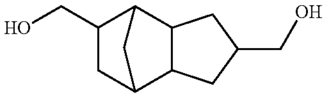

Chemical Formula: $C_{12}H_{20}O_2$
Molecular Weight: 196.29
CLogP: 1.566

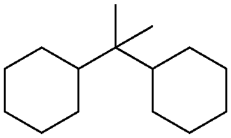

Chemical Formula: $C_{15}H_{28}$
Molecular Weight: 208.38
CLogP: 7.321

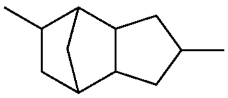

Chemical Formula: $C_{12}H_{20}$
Molecular Weight: 164.29
CLogP: 5.54

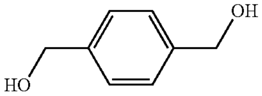

Chemical Formula: $C_8H_{10}O_2$
Molecular Weight: 138.16
CLogP: 0.066

-continued

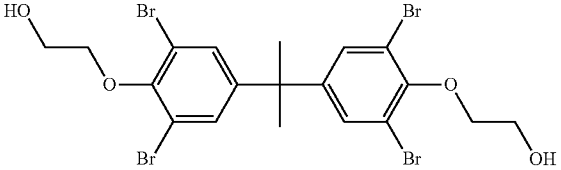

Chemical Formula: $C_{19}H_{20}Br_4O_4$
Molecular Weight: 631.98
CLogP: 6.009

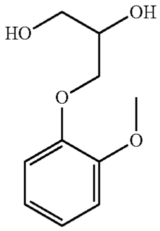

Chemical Formula: $C_{10}H_{14}O_4$
Molecular Weight: 198.22
CLogP: 0.1018

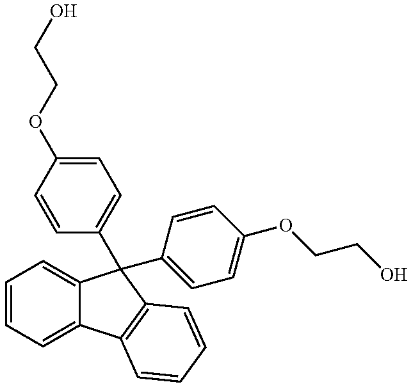

Chemical Formula: $C_{29}H_{26}O_4$
Molecular Weight: 438.51
CLogP: 5.283

Chemical Formula: $C_8H_{10}$
Molecular Weight: 106.16
CLogP: 3.14

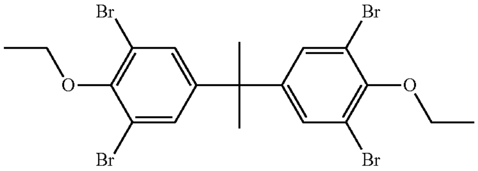

Chemical Formula: $C_{19}H_{20}Br_4O_2$
Molecular Weight: 599.98
CLogP: 8.813

-continued

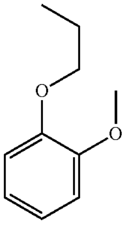

Chemical Formula: $C_{10}H_{14}O_2$
Molecular Weight: 166.22
CLogP: 2.858

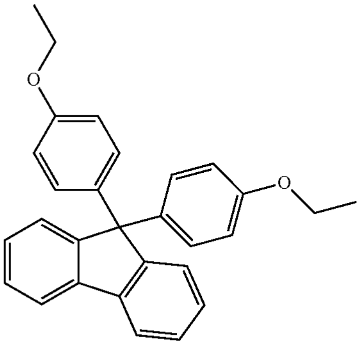

Chemical Formula: $C_{29}H_{26}O_2$
Molecular Weight: 406.52
CLogP: 8.087

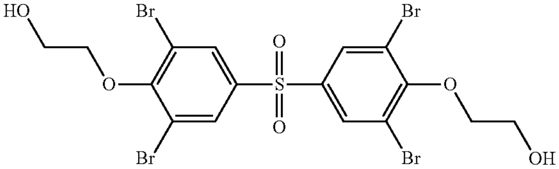

Chemical Formula: $C_{16}H_{14}Br_4O_6S$
Molecular Weight: 653.96
CLogP: 3.70013

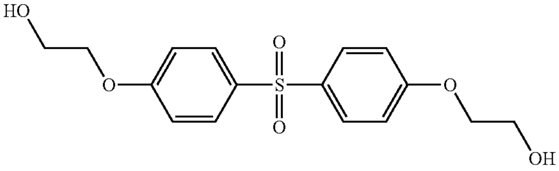

Chemical Formula: $C_{16}H_{18}O_6S$
Molecular Weight: 338.38
CLogP: 1.08027

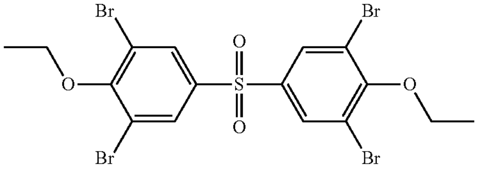

Chemical Formula: $C_{16}H_{14}Br_4O_4S$
Molecular Weight: 621.96
CLogP: 6.50413

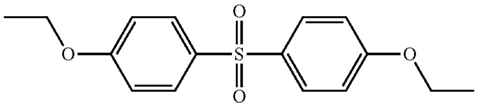

Chemical Formula: $C_{16}H_{18}O_4S$
Molecular Weight: 306.38
CLogP: 3.88427

-continued

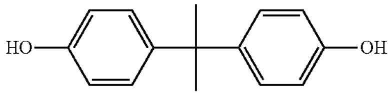

Chemical Formula: $C_{15}H_{16}O_2$
Molecular Weight: 228.29
CLogP: 3.673

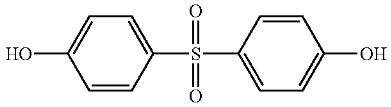

Chemical Formula: $C_{12}H_{10}O_4S$
Molecular Weight: 250.27
CLogP: 2.0606

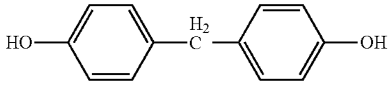

Chemical Formula: $C_{13}H_{12}O_2$
Molecular Weight: 200.23
CLogP: 2.875

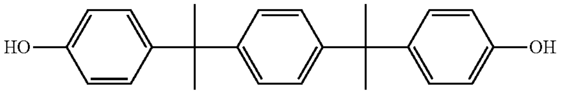

Chemical Formula: $C_{24}H_{26}O_2$
Molecular Weight: 346.46
CLogP: 6.538

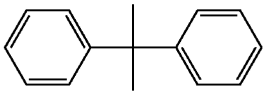

Chemical Formula: $C_{15}H_{16}$
Molecular Weight: 196.29
CLogP: 5.007

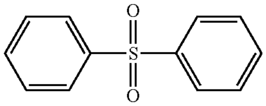

Chemical Formula: $C_{12}H_{10}O_2S$
Molecular Weight: 218.27
CLogP: 2.43

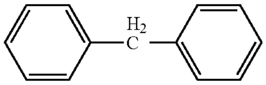

Chemical Formula: $C_{13}H_{12}$
Molecular Weight: 168.23
CLogP: 4.209

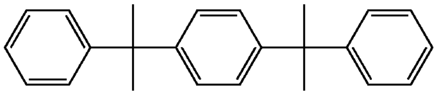

Chemical Formula: $C_{24}H_{26}$
Molecular Weight: 314.46
CLogP: 7.872

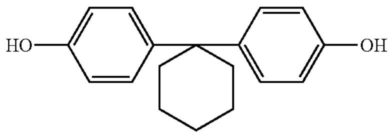

Chemical Formula: $C_{18}H_{20}O_2$
Molecular Weight: 268.35
CLogP: 4.986

-continued

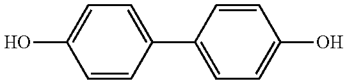

Chemical Formula: $C_{12}H_{10}O_2$
Molecular Weight: 186.21
CLogP: 2.696

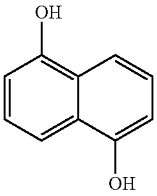

Chemical Formula: $C_{10}H_8O_2$
Molecular Weight: 160.17
CLogP: 1.982

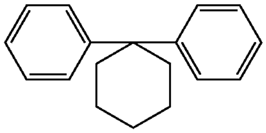

Chemical Formula: $C_{18}H_{20}$
Molecular Weight: 236.35
CLogP: 6.32

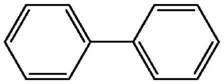

Chemical Formula: $C_{12}H_{10}$
Molecular Weight: 154.21
CLogP: 4.03

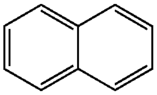

Chemical Formula: $C_{10}H_8$
Molecular Weight: 128.17
CLogP: 3.316

Specific examples of the diamine compounds having 2 to 50 carbon atoms for forming $R^{C1}$ are exemplified below, and the compound $HR^{C1}H$ corresponding to each diamine compound is shown under each diamine compound (that is, each specific example).

For compound, a molecular weight, a C log P, and the like are described together.

The diamine compound having 2 to 50 carbon atoms for forming $R^{C1}$ is, in other words, a diamine compound having 2 to 50 carbon atoms having a structure in which a hydroxy group is bonded to the two binding positions of $R^{C1}$.

The compound $HR^{C1}H$ corresponding to the diamine compound is a compound in which two amino groups are removed from the diamine compound to form $R^{C1}$ (divalent organic group), and a hydrogen atom is bonded to each of the two binding positions of $R^{C1}$.

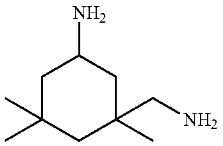

Chemical Formula: $C_{10}H_{22}N_2$
Molecular Weight: 170.30
CLogP: 1.556

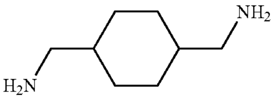

Chemical Formula: $C_8H_{18}N_2$
Molecular Weight: 142.24
CLogP: 0.618

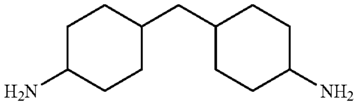

Chemical Formula: $C_{13}H_{26}N_2$
Molecular Weight: 210.36
CLogP: 2.549

-continued

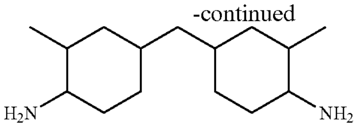

Chemical Formula: $C_{15}H_{30}N_2$
Molecular Weight: 238.41
CLogP: 3.587

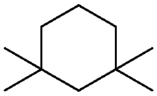

Chemical Formula: $C_{10}H_{20}$
Molecular Weight: 140.27
CLogP: 5.43

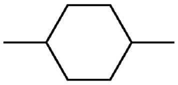

Chemical Formula: $C_8H_{16}$
Molecular Weight: 112.21
CLogP: 4.392

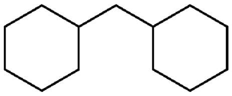

Chemical Formula: $C_{13}H_{24}$
Molecular Weight: 180.33
CLogP: 6.523

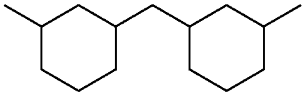

Chemical Formula: $C_{15}H_{28}$
Molecular Weight: 208.38
CLogP: 7.561

Hereinafter, each specific example of polypropylene glycol (PPG), polytetramethylene glycol (PTMG), polycarbonate diol C6 (that is, polycarbonate diol having an alkylene group having 6 carbon atoms), and polyester diol C6 (that is, polycarbonate diol having an alkylene group having 6 carbon atoms), which are form $R^{C1}$, are shown.

In each specific example, C log P ($R^{C1}$) (that is, C log P of the compound $HR^{C1}H$ corresponding to each specific example) is also described together.

The compound $HR^{C1}H$ is a compound having a structure in which two hydroxy groups are removed from each specific example to form $R^{C1}$, and a hydrogen atom is bonded to two binding positions of $R^{C1}$.

Polypropylene glycol (PPG)

| Structure | The number of repetitions (n) | Molecular weight | ClogP (RC1) |
|---|---|---|---|
| 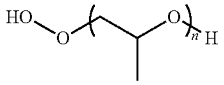 | 2 | 134 | 1.71 |
| | 3 | 192 | 1.88 |
| | 4 | 250 | 2.05 |
| | 5 | 308 | 2.23 |
| | 6 | 366 | 2.40 |
| | 12 | 715 | 3.44 |
| | 34 | 1993 | 7.26 |

Polytetramethylene glycol (PTMG)

| Structure | The number of repetitions (n) | Molecular weight | ClogP (RC1) |
|---|---|---|---|
| 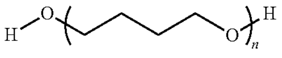 | 2 | 162 | 2.99 |
| | 3 | 234 | 3.16 |
| | 6 | 451 | 3.69 |
| | 28 | 2037 | 7.56 |

Polycarbonate diol C6

| Structure | The number of repetitions (n) | Molecular weight | ClogP (RC1) |
|---|---|---|---|
| 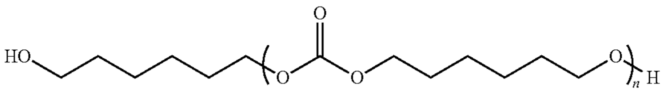 | 2 | 407 | 6.92 |
| | 4 | 695 | 9.96 |
| | 6 | 983 | 13.01 |
| | 13 | 1992 | 23.68 |

Polyester diol C6

| Structure | The number of repetitions (n) | Molecular weight | ClogP (RC1) |
|---|---|---|---|
| 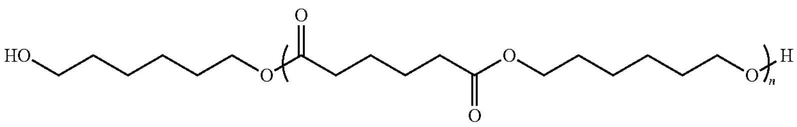 | 2 | 575 | 8.17 |
| | 3 | 803 | 10.32 |
| | 8 | 1944 | 21.07 |

From the viewpoint of further improving the dispersion stability of the microcapsules and the adhesiveness between the film and the substrate, the divalent organic group represented by $R^{C1}$ preferably has a cyclic structure (more preferably an alicyclic structure or an aromatic cyclic structure). In this case, the number of carbon atoms of the divalent organic group is preferably from 6 to 50, more preferably from 6 to 30, and particularly preferably from 6 to 20.

A more preferable aspect from the viewpoint of further improving the dispersion stability of the microcapsule is an aspect in which the divalent organic group represented by $R^{C1}$ contains a cyclic structure, and the shell of the microcapsule contains a cyclic structure.

An even more preferable aspect from the viewpoint of further improving the dispersion stability of the microcapsule is an aspect in which the divalent organic group represented by $R^{C1}$ contains an alicyclic structure, and the shell of the microcapsule contains an alicyclic structure; or an aspect in which the divalent organic group represented by $R^{C1}$ contains an aromatic cyclic structure, and the shell of the microcapsule contains an aromatic cyclic structure.

In addition, the divalent organic group represented by $R^{C1}$ preferably contains an alicyclic structure from the viewpoint of further improving the adhesiveness between the film and the substrate. In this case, the number of carbon atoms of the divalent organic group is preferably from 6 to 50, more preferably from 6 to 30, and particularly preferably from 6 to 20.

$Y^{C1}$ represents O, S, NH, or $NZ^{C1}$.

$Y^{C1}$ is preferably O, NH, or $NZ^{C1}$, more preferably O or NH, is particularly preferably O.

$Z^{C1}$ represents a hydrocarbon group having 1 to 10 carbon atoms.

As the hydrocarbon group represented by $Z^{C1}$, an alkyl group, an alkenyl group, an alkynyl group, or an aryl group is preferable, and an alkyl group is particularly preferable.

The number of carbon atoms of $Z^{C1}$ is preferably from 1 to 6, more preferably from 1 to 3, even more preferably 1 or 2, and particularly preferably 1.

$Y^{C2}$ represents O, S, NH, or $NZ^{C2}$.

$Y^{C2}$ is preferably O, NH, or $NZ^{C2}$, more preferably O or NH, is particularly preferably O.

$Z^{C2}$ represents a hydrocarbon group having 1 to 10 carbon atoms.

A preferable aspect of $Z^{C2}$ is the same as the preferable aspect of $Z^{C1}$.

A content of Structural Unit (C) in the dispersant is preferably 8% by mass or more, more preferably 10% by mass or more, and even more preferably 15% by mass or more, and particularly preferably 20% by mass or more with respect to a total amount of the dispersant.

In a case where the content of Structural Unit (C) is 8% by mass or more with respect to the total amount of the dispersant, the interaction between the dispersant and the shell of the microcapsule is further enhanced, thereby further improving the dispersion stability of the microcapsule.

The content of Structural Unit (C) in the dispersant is preferably 80% by mass or less, more preferably 70% by mass or less, and even more preferably 65% by mass or less with respect to the total amount of the dispersant.

In a case where the content of Structural Unit (C) is 80% by mass or less with respect to the total amount of the dispersant, an amount of the anionic group in the dispersant is easily ensured, thereby further improving the dispersion stability of the microcapsule.

As a compound for forming Structural Unit (C) (hereinafter referred to as "compound for forming the unit (C)"), a compound in which a hydrogen atom is bonded to each of the two *3's of Structural Unit (C) described above (preferably the above-described diol compound or diamine compound) is preferable.

In addition, in a case where Structural Unit (C) is positioned at the end of the dispersant, a hydrogen bonding is bonded to at any one position of the two "*3's" in Structural Unit (C) positioned at the end of the dispersant.

(Structural Unit (A) and Structural Unit (B))

In a case where the dispersant contains Structural Unit (C), it is more preferable that the dispersant further contains Structural unit (A) and Structural unit (B) described below.

Similar to Structural Unit (C), Structural Unit (A) has a function of enhancing the hydrophobicity of the entire dispersant. In a case where the dispersant contains Structural Unit (A) and Structural Unit (C), the hydrophobicity of the entire dispersant is enhanced by Structural Unit (A) and Structural Unit (C), and as a result, the interaction between the dispersant and the shell of the microcapsule is enhanced.

On the other hand, Structural Unit (B) is a structural unit having an anionic group having a dispersing action (specifically, a carboxy group or a salt thereof), and by using the dispersant containing this Structural Unit (B), the microcapsules are dispersed in an aqueous medium.

Therefore, in the case where the dispersant contains all of Structural Units (A) to (C), the dispersion stability of the microcapsules is particularly excellent. Furthermore, in this case, since the hydrophobicity of the entire dispersant is enhanced, the adhesiveness between the film and the substrate is further improved.

—Structural Unit (A)—

Structural Unit (A) is as below.

(A)

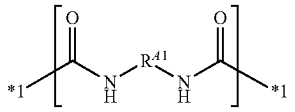

In Structural Unit (A), $R^{A1}$ represents a divalent hydrocarbon group having 1 to 20 carbon atoms, and two *1's each independently represent a binding position with a structural unit other than Structural Unit (A).

The sentence "two *1's each independently represent a binding position with a structural unit other than Structural Unit (A)" referred to herein means that Structural Units (A) do not directly bond to each other in the dispersant.

There may be only one or two or more kinds of structural units other than Structural Unit (A), which is bonded to the site of *1 in Structural Unit (A).

The structural units other than Structural Unit (A) are not particularly limited, and examples thereof include Structural Unit (B) and Structural Unit (C). In the case where the dispersant contains a structural unit derived from the diol compound, a structural unit derived from the diamine compound, or a structural unit derived from the dithiol compound other than Structural Unit (B) and Structural Unit (C), these structural units are examples of structural units other than Structural Unit (A) described above.

The divalent hydrocarbon group having 1 to 20 carbon atoms represented by $R^{A1}$ may contain a cyclic structure and may have a substituent.

The number of carbon atoms (that is, 1 to 20) in the divalent hydrocarbon group having 1 to 20 carbon atoms represented by $R^{A1}$ means the number of carbon atoms of the entire group including the substituent, in a case of having a substituent.

Examples of the substituent include an alkoxy group, an alkoxycarbonyl group, an acyl group, an acyloxy group, and the like.

Examples of the divalent hydrocarbon group represented by $R^{A1}$ include an alkylene group, an arylene group, an alkylene arylene group, an arylene alkylene arylene group, an alkylene arylene alkylene group, and the like, which may contain an alicyclic structure.

From the viewpoint of further improving the dispersion stability of the microcapsules and the adhesiveness between the film and the substrate, the divalent hydrocarbon group represented by $R^{A1}$ preferably contains a cyclic structure, and more preferably contains an alicyclic structure or an aromatic cyclic structure. The number of carbon atoms of the divalent hydrocarbon group in this case is preferably from 6 to 20.

A preferable aspect from the viewpoint of further improving the dispersion stability of the microcapsule is an aspect in which the divalent hydrocarbon group represented by $R^{A1}$ contains a cyclic structure, and the shell of the microcapsule contains a cyclic structure.

An even more preferable aspect from the viewpoint of further improving the dispersion stability of the microcapsule is an aspect in which the divalent hydrocarbon group represented by $R^{A1}$ contains an alicyclic structure, and the shell of the microcapsule contains an alicyclic structure; or an aspect in which the divalent hydrocarbon group represented by $R^{A1}$ contains an aromatic cyclic structure, and the shell of the microcapsule contains an aromatic cyclic structure.

In addition, from the viewpoint of further improving the adhesiveness between the film and the substrate, the divalent hydrocarbon group represented by $R^{A1}$ particularly preferably contains an alicyclic structure. The number of carbon atoms of the divalent hydrocarbon group in this case is preferably from 6 to 20.

The divalent hydrocarbon group represented by $R^{A1}$ is preferably a group represented by any one of (R-1) to (R-20) (hereinafter referred to as group (R-1) to group (R-20)). In (R-1) to (R-20), * represents a binding position.

(R-1)

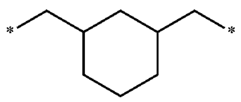

(R-2)

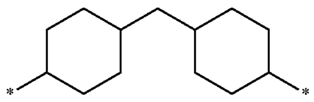

(R-3)

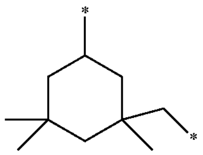

(R-4)

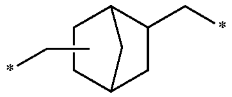

-continued (R-5)

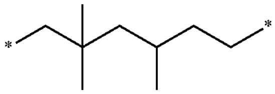

(R-6)

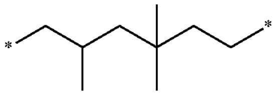

(R-7)

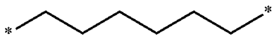

(R-8)

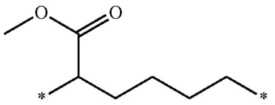

(R-9)

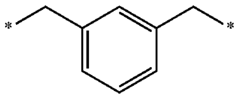

(R-10)

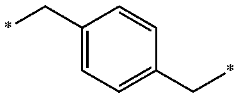

(R-11)

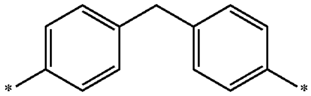

(R-12)

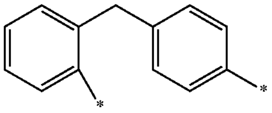

(R-13)

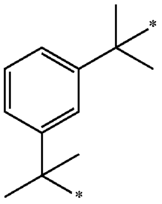

(R-14)

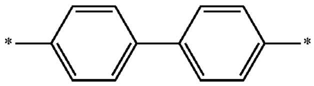

(R-15)

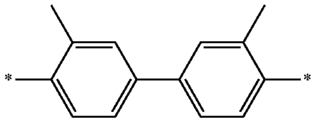

(R-16)

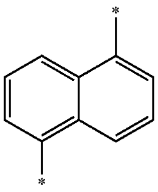

-continued (R-17)

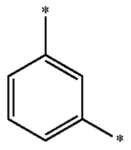

(R-18)

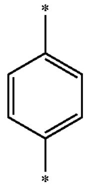

(R-19)

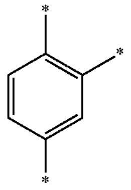

(R-20)

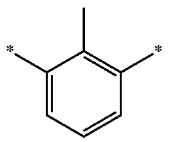

From the viewpoint of further improving the dispersion stability of the microcapsules, $R^{A1}$ is preferably the group (R-1) to group (R-4) and group (R-9) to group (R-20), which contain an alicyclic structure or an aromatic cyclic structure.

In addition, from the viewpoint of further improving the adhesiveness between the film and the substrate, $R^{A1}$ is particularly preferably the group (R-1) to group (R-4).

Structural Unit (A) is preferably formed by using a difunctional isocyanate compound (that is, a compound having two isocyanate groups).

As the difunctional isocyanate compound, a compound for forming the group (R-1) to group (R-20) (that is, a compound having a structure in which an NCO group (that is, an isocyanate group) is bonded to each of two binding positions (*) in each of the group (R-1) to group (R-20)) is preferable.

Specific examples of the difunctional isocyanate compound are the same as specific examples of a difunctional isocyanate compound for forming an adduct-type tri- or higher functional isocyanate compound described later.

The content of Structural Unit (A) in the dispersant is preferably 10% by mass or more, more preferably 20% by mass or more, and particularly preferably 25% by mass or more with respect to the total amount of the dispersant.

In a case where the content of Structural Unit (A) is 10% by mass or more with respect to the total amount of the dispersant, the hydrophobicity of the entire dispersant is enhanced, and the interaction between the dispersant and the shell of the microcapsule is further enhanced, and as a result, the dispersion stability of the microcapsule is further improved.

The content of Structural Unit (A) in the dispersant is preferably 80% by mass or less, and more preferably 70% by mass or less with respect to the total amount of the dispersant.

In a case where the content of Structural Unit (A) is 80% by mass or less with respect to the total amount of the dispersant, an amount of the anionic group in the dispersant is easily ensured, thereby further improving the dispersion stability of the microcapsule.

As a compound for forming Structural Unit (A) (hereinafter referred to as "compound for forming the unit (A)"), the above-described difunctional isocyanate compound is preferable.

—Structural Unit (B)—

Structural Unit (B) is as below.

Structural Unit (B) is a compound having a carboxy group or a salt of a carboxy group as an anionic group.

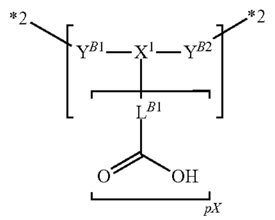

(B)

In Structural Unit (B), $X^1$ represents a (pX+2)-valent organic group, pX represents an integer of 1 or more, $Y^{B1}$ represents O, S, NH, or $NZ^{B1}$, $Y^{B2}$ represents O, S, NH, or $NZ^{B2}$, $Z^{B1}$ and $Z^{B2}$ each independently represent a hydrocarbon group having 1 to 10 carbon atoms, $L^{B1}$ represents a single bond or a divalent linking group, and two *2's each independently represent a binding position with a structural unit other than Structural Unit (B).

A carboxy group in Structural Unit (B) may be neutralized.

The sentence "two *2's each independently represent a binding position with a structural unit other than Structural Unit (B)" referred to herein means that Structural Units (B) do not directly bond to each other in the dispersant.

There may be only one or two or more kinds of structural units other than Structural Unit (B), which is bonded to the site of *2 in Structural Unit (B).

The structural units other than Structural Unit (B) are not particularly limited, and examples thereof include Structural Unit (A). In addition, in a case where the dispersant contains a structural unit derived from an isocyanate compound other than Structural Unit (A), examples of the structural units other than Structural Unit (C) include structural units derived from an isocyanate compound other than Structural Unit (A).

The description, "a carboxy group in Structural Unit (B) may be neutralized" means that the carboxy group may form a salt of a carboxy group (for example, —C(═O)ONa) in at least a part of Structural Unit (B) that is capable of being contained in the dispersant.

A preferable degree of neutralization of the dispersant is as described above.

In Structural Unit (B), pX represents an integer of 1 or more.

As pX, an integer of 1 to 6 is preferable, an integer of 1 to 3 is more preferable, an integer of 1 or 2 is even more preferable, and an integer of 1 is particularly preferable.

In Structural Unit (B), as specific examples of $X^1$, a group represented by (BX-1) to (BX-7) (hereinafter, will also be referred to as groups (BX-1) to (BX-7)) is preferable.

Among these, the group (BX-1) to group (BX-3) is more preferable, the group (BX-1) or group (BX-2) is even more preferable, and the group (BX-1) is particularly preferable.

(BX-1)

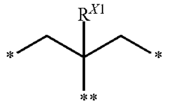

(BX-2)

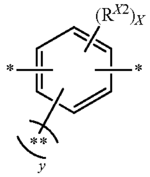

(BX-3)

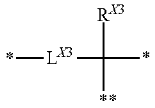

(BX-4)

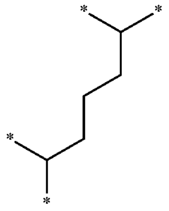

(BX-5)

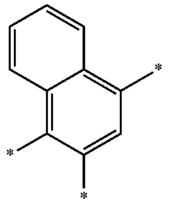

(BX-6)

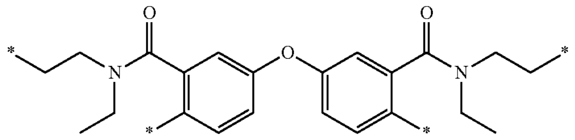

(BX-7)

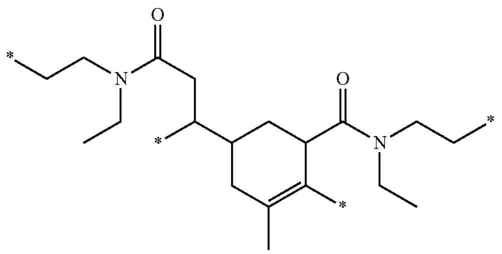

In the groups (BX-1) to (BX-7), both * and ** indicate a binding position.

In the group (BX-1) to the group (BX-3), ** indicates a binding position with $L^{B1}$ (provided that carbonyl carbon in a case where $L^{B1}$ is a single bond), and * indicate a binding position with $Y^{B1}$ or $Y^{B2}$.

In the group (BX-4) to the group (BX-7), any of * may be a binding position with $L^{B1}$ (provided that carbonyl carbon in the case where $L^{B1}$ is a single bond).

$R^{X1}$ in the group (BX-1) and $R^{X3}$ in the group (BX-3) each independently represent a hydrogen atom or an alkyl group having 1 to 10 carbon atoms (more preferably 1 to 6 carbon atoms).

$R^{X2}$ in the group (BX-2) represents an alkyl group having 1 to 10 carbon atoms (more preferably 1 to 6 carbon atoms).

x in the group (BX-2) represents an integer of 0 to 3, y represents an integer of 1 to 4, and a total of x and y is an integer of 2 to 4.

$L^{X3}$ in the group (BX-3) represents a divalent hydrocarbon group having 1 to 20 carbon atoms.

A preferable range of the divalent hydrocarbon group having 1 to 20 carbon atoms represented by $L^{X3}$ is the same as the preferable range of the divalent hydrocarbon group having 1 to 20 carbon atoms represented by $R^{A1}$ in Structural Unit (A).

In Structural Unit (B), $L^{B1}$ represents a single bond or a divalent linking group, but a single bond is preferable.

A preferable range of the divalent linking group represented by $L^{B1}$ is the same as the preferable range of the divalent hydrocarbon group having 1 to 20 carbon atoms represented by $R^{A1}$ in Structural Unit (A).

$Y^{B1}$ represents O, S, NH, or $NZ^{B1}$.

$Y^{B1}$ is preferably O, NH, or $NZ^{B1}$, more preferably O or NH, is particularly preferably O.

$Z^{B1}$ represents a hydrocarbon group having 1 to 10 carbon atoms.

A preferable aspect of $Z^{B1}$ is the same as the preferable aspect of $Z^{C1}$ in Structural Unit (C).

$Y^{B2}$ represents O, S, NH, or $NZ^{B2}$.

$Y^{B2}$ is preferably O, NH, or $NZ^{B2}$, more preferably O or NH, is particularly preferably O.

$Z^{B2}$ represents a hydrocarbon group having 1 to 10 carbon atoms.

A preferable aspect of $Z^{B2}$ is the same as the preferable aspect of $Z^{C1}$ in Structural Unit (C).

As Structural Unit (B), Structural Unit (B1) described below is particularly preferable.

(B1)

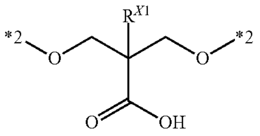

In Structural Unit (B1), $R^{X1}$ and *2 are synonymous with $R^{X1}$ and *2 in Structural Unit (B1), respectively.

The content of Structural Unit (B) in the dispersant is adjusted so that the anionic group value of the dispersant is within a range of 0.10 mmol/g to 2.50 mmol/g.

A content of Structural Unit (B) in the dispersant is preferably 3% by mass or more, more preferably 4% by mass or more, and even more preferably 5% by mass or more, and particularly preferably 8% by mass or more with respect to a total amount of the dispersant.

In the case where the content of Structural Unit (B) is 3% by mass or more with respect to the total amount of the dispersant, the anionic group value of the dispersant is easily adjusted to 0.10 mmol/g or more, and an amount of the anionic group in the dispersant becomes easy to be secured, and therefore the dispersion stability of the microcapsule becomes easy to be improved.

The content of Structural Unit (B) in the dispersant is preferably 35% by mass or less, more preferably 30% by mass or less, and particularly preferably 20% by mass or less with respect to the total amount of the dispersant.

In the case where the content of Structural Unit (B) is 35% by mass or less with respect to the total amount of the dispersant, the hydrophobicity of the entire dispersant is easily maintained, and it becomes easy to further improve the interaction between the dispersant and the shell of the microcapsule, and therefore, the dispersion stability of the microcapsules is easily improved.

As a compound for forming Structural Unit (B) (hereinafter referred to as "compound for forming the unit (B)"), a compound in which a hydrogen atom is bonded to each of the two *2's of Structural Unit (B) described above (preferably, a diol compound having at least one of a carboxy group or a salt thereof, or a diamine compound having at least one of a carboxy group or a salt thereof) is preferable.

<Microcapsule>

The aqueous dispersion of the present disclosure includes the microcapsule that has the shell having the three-dimensional cross-linked structure containing at least one bond selected from a urethane bond or a urea bond, and includes the core, in which at least one of the shell or the core has the polymerizable group.

The microcapsule in the present disclosure is formed of the outermost shell having the three-dimensional cross-linked structure containing at least one of a urethane bond or a urea bond, and the core which is a region occupying the shell.

Whether a microcapsule is the microcapsule can be checked by coating a support with the aqueous dispersion having the microcapsule and drying so as to obtain a sample for morphological observation, and then cutting the sample so as to observe the cut surface using an electron microscope and the like.

The microcapsule contained in the aqueous dispersion of the present disclosure may be used alone, or two or more kinds thereof may be used.

The microcapsule is a dispersoid in the aqueous dispersion of the present disclosure.

As described above, the aqueous dispersion of the present disclosure contains the microcapsule, thereby improving the hardness of a film to be formed.

Furthermore, as described above, the aqueous dispersion of the present disclosure contains the microcapsule and the above-described dispersant, thereby maintaining excellent dispersion stability, which is also excellent for the adhesiveness of the film to the substrate.

<Shell of Microcapsule>

In the microcapsule, the shell has the three-dimensional cross-linked structure containing at least one bond selected from a urethane bond or a urea bond.

In the present specification, "three-dimensional cross-linked structure" refers to a three-dimensional network structure formed by cross-linking.

As described above, the three-dimensional cross-linked structure of the shell contributes to improvement of dispersion stability and redispersibility.

Whether the shell of the microcapsule has the three-dimensional cross-linked structure is checked as below. The operation described below is performed under the condition of a liquid temperature of 25° C.

In addition, in a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment is removed.

A sample is collected from the aqueous dispersion. Tetrahydrofuran (THF) having a mass 100 times the mass of the total solid content in the sample is added to and mixed with the collected sample, thereby preparing a diluted solution. The obtained diluted solution is subjected to centrifugation under the condition of 80,000 rpm and 40 minutes. After the centrifugation, whether there are residues is checked by visual observation. In a case where there are residues, a redispersion liquid is prepared by redispersing the residues in water. For the obtained redispersion liquid, by using a wet-type particle size distribution measurement apparatus (LA-960, manufactured by HORIBA, Ltd.), the particle size distribution is measured by a light scattering method.

In a case where the particle size distribution can be checked by the operation described above, it is determined that the shell of the microcapsule has the three-dimensional cross-linked structure.

In addition, the three-dimensional cross-linked structure contains at least one kind of bond selected from a urethane bond or a urea bond. It is preferable that the three-dimensional cross-linked structure contains both urethane bond and urea bond.

A total amount (mmol/g) of the urethane bond and the urea bond contained in 1 g of the shell having the three-dimensional cross-linked structure is preferably 1 mmol/g to 10 mmol/g, more preferably 1.5 mmol/g to 9 mmol/g, and particularly preferably 2 mmol/g to 8 mmol/g.

The shell of the microcapsule preferably contains a cyclic structure from the viewpoint of further improving the dispersion stability of the microcapsules and the adhesiveness of the film to the substrate.

Examples of the cyclic structure include an alicyclic structure, and an aromatic cyclic structure.

Examples of the alicyclic structure include a cyclohexane cyclic structure, a bicyclohexane cyclic structure, a bicyclodecane cyclic structure, an isobornene cyclic structure, a dicyclopentane cyclic structure, an adamantane cyclic structure, a tricyclodecane cyclic structure, and the like.

Examples of the aromatic cyclic structure include a benzene cyclic structure, a naphthalene cyclic structure, a biphenyl cyclic structure, and the like.

The shell of the microcapsule particularly preferably contains the alicyclic structure from the viewpoint of further improving the adhesiveness of the film to the substrate.

(Structure (1))

The three-dimensional cross-linked structure of the shell preferably contains Structure (1).

The three-dimensional cross-linked structure may include a plurality of Structures (1), and the plurality of Structures (1) may be the same as or different from each other.

Structure (1)

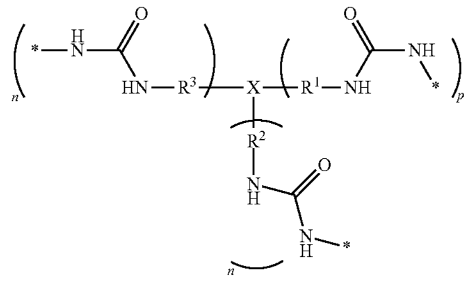

In Structure (1), X represents a (p+m+n)-valent organic group formed by linking at least two groups selected from the group consisting of a hydrocarbon group which may contain a cyclic structure, —NH—, >N—, —C(=O)—, —O—, and —S—.

In Structure (1), $R^1$, $R^2$, and $R^3$ each independently represent a hydrocarbon group having 5 to 15 carbon atoms which may contain a cyclic structure.

In Structure (1), * represents a binding position, each of p, m, and n is equal to or greater than 0, and p+m+n equals 3 or greater.

The total molecular weight of X, $R^1$, $R^2$, and $R^3$ is preferably less than 2,000, more preferably less than 1,500, and even more preferably less than 1,000. In a case where the total molecular weight of X, $R^1$, $R^2$, and $R^3$ is less than 2,000, the internal content rate of the compound contained in the interior of the core can be increased.

The hydrocarbon group in the organic group represented by X is preferably a linear or branched hydrocarbon group having 1 to 15 carbon atoms, and more preferably a linear or branched hydrocarbon group having 1 to 10 carbon atoms.

Examples of the cyclic structure that the hydrocarbon group in the organic group represented by X and the hydrocarbon group represented by $R^1$, $R^2$, and $R^3$ may have an alicyclic structure and an aromatic cyclic structure.

Examples of the alicyclic structure include a cyclohexane cyclic structure, a bicyclohexane cyclic structure, a bicyclodecane cyclic structure, an isobornene cyclic structure, a dicyclopentane cyclic structure, an adamantane cyclic structure, a tricyclodecane cyclic structure, and the like.

Examples of the aromatic cyclic structure include a benzene cyclic structure, a naphthalene cyclic structure, a biphenyl cyclic structure, and the like.

From the viewpoint of further improving the dispersion stability of the microcapsules, at least one of the hydrocarbon group in the organic group represented by X or the hydrocarbon group represented by $R^1$, $R^2$, and $R^3$ preferably contains a cyclic structure, and more preferably contains an alicyclic structure or an aromatic cyclic structure.

From the viewpoint of further improving the adhesiveness of the film to the substrate, at least one of the hydrocarbon group in the organic group represented by X or the hydrocarbon group represented by $R^1$, $R^2$, and $R^3$ particularly preferably contains an alicyclic structure.

In Structure (1), p is equal to or more than 0, p is preferably 1 to 10, more preferably 1 to 8, even more preferably 1 to 6, and particularly preferably 1 to 3.

In Structure (1), m is equal to or greater than 0, m is preferably 1 to 10, more preferably 1 to 8, even more preferably 1 to 6, and particularly preferably 1 to 3.

In Structure (1), n is equal to or greater than 0, n is preferably 1 to 10, more preferably 1 to 8, even more preferably 1 to 6, and particularly preferably 1 to 3.

In Structure (1), p+m+n is preferably an integer of 3 to 10, more preferably an integer of 3 to 8, and even more preferably an integer of 3 to 6.

The (p+m+n)-valent organic group represented by X is preferably a group represented by any one of (X-1) to (X-12).

(X-1)

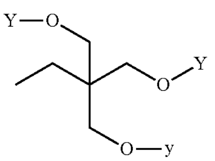

-continued (X-2)

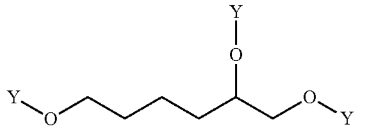

(X-3)

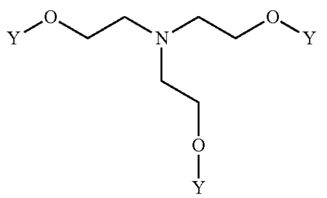

(X-4)

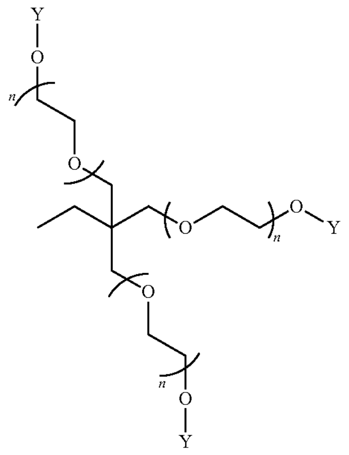

(X-5)

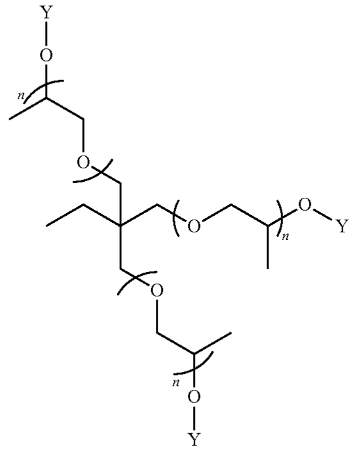

(X-6)

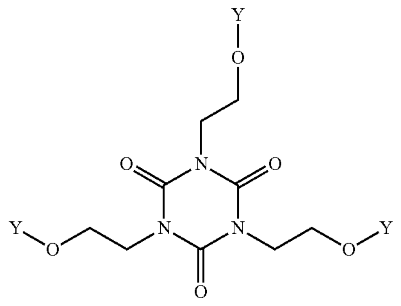

-continued (X-7)

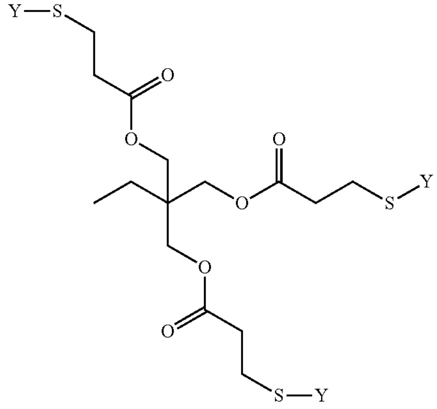

(X-8)

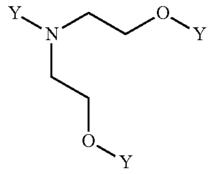

(X-9)

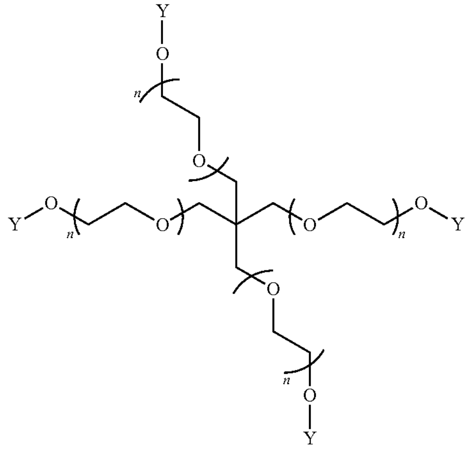

(X-10)

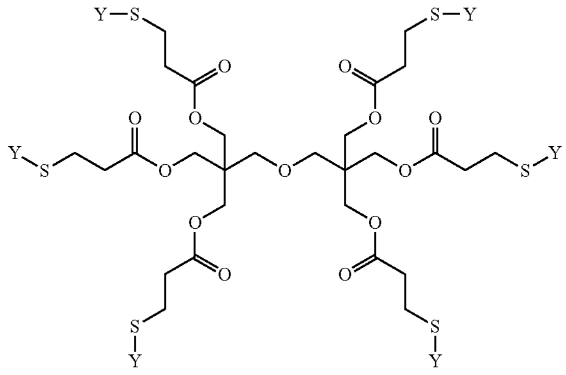

(X-11)

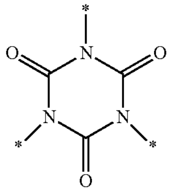

-continued (X-12)

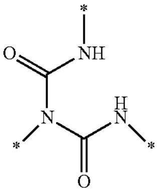

In Formulas (X-1) to (X-12), n represents an integer of 1 to 200, preferably represents an integer of 1 to 50, more preferably represents an integer of 1 to 15, and particularly preferably represents an integer of 1 to 8.

In Formula (X-11) to Formula (X-12), * represents a binding position.

In Formulas (X-1) to (X-10), Y represents (Y-1).

(Y-1)

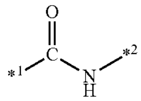

In (Y-1), $*^1$ represents a binding position in which (Y-1) is bonded to S or O in (X-1) to (X-10), and $*^2$ represents a binding position in which (Y-1) is bonded to $R^1$, $R^2$, or $R^3$ in Structure (1).

In Structure (1), $R^1$, $R^2$, and $R^3$ each independently represent a hydrocarbon group having 5 to 15 carbon atoms which may contain a cyclic structure.

The hydrocarbon group represented by $R^1$, $R^2$, and $R^3$ may have a substituent, and examples of the substituent include a hydrophilic group capable of being contained in the shell, which is described below.

It is preferable that $R^1$, $R^2$, and $R^3$ each independently represent any one of the group (R-1) to the group (R-20) in Structural Unit (A) (specifically $R^{1A}$) which can be contained in the above-described dispersant.

The content rate of Structure (1) in the shell with respect to the total mass of the shell is preferably 8% by mass to 100% by mass, more preferably 25% by mass to 100% by mass, and even more preferably 50% by mass to 100% by mass.

It is preferable that the shell includes, as Structure (1), at least one structure among Structure (2), Structure (3), and Structure (4) shown below.

Structure (2)

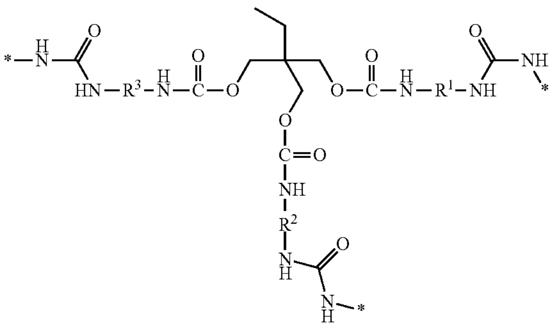

In Structure (2), $R^1$, $R^2$, and $R^3$ each independently represent a hydrocarbon group having 5 to 15 carbon atoms which may contain a cyclic structure.

Each of the hydrocarbon groups represented by $R^1$, $R^2$, and $R^3$ in Structure (2) has the same definition as each of the hydrocarbon groups represented by $R^1$, $R^2$, and $R^3$ in Structure (1), and the preferable range thereof is also the same.

In Structure (2), * represents a binding position.

Structure (3)

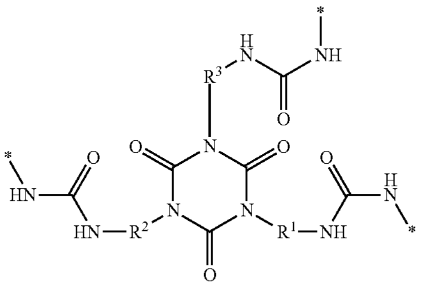

In Structure (3), $R^1$, $R^2$, and $R^3$ each independently represent a hydrocarbon group having 5 to 15 carbon atoms which may contain a cyclic structure.

Each of the hydrocarbon groups represented by $R^1$, $R^2$, and $R^3$ in Structure (3) has the same definition as each of the hydrocarbon groups represented by $R^1$, $R^2$, and $R^3$ in Structure (1), and the preferable range thereof is also the same.

In Structure (3), * represents a binding position.

Structure (4)

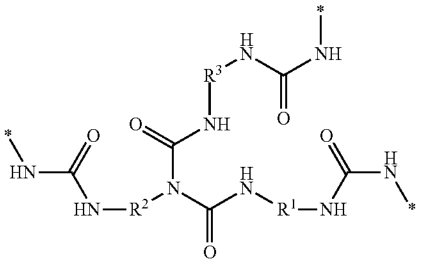

In Structure (4), $R^1$, $R^2$, and $R^3$ each independently represent a hydrocarbon group having 5 to 15 carbon atoms which may contain a cyclic structure.

Each of the hydrocarbon groups represented by $R^1$, $R^2$, and $R^3$ in Structure (4) has the same definition as each of the hydrocarbon groups represented by $R^1$, $R^2$, and $R^3$ in Structure (1), and the preferable range thereof is also the same.

In Structure (4), * represents a binding position.

Specific examples of Structure (1) to Structure (4) include structures shown in Table 2.

TABLE 2

| Structure (1) | | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |

TABLE 2-continued

| Structure (1) | | | | | | | Corresponding |
|---|---|---|---|---|---|---|---|
| X | $R^1$ | $R^2$ | $R^3$ | p | n | m | structure |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the microcapsule is preferably a product formed by allowing a reaction between a tri- or higher functional isocyanate compound and water.

For example, Structure (2) can be formed by using a trifunctional isocyanate compound in which each of the urea bonds at the three terminals of Structure (2) is replaced with an isocyanate group, as the above-described tri- or higher functional isocyanate compound.

This trifunctional isocyanate compound is one kind of trifunctional isocyanate compounds of an adduct type to be described later.

In addition, Structure (3) can be formed by using a trifunctional isocyanate compound in which each of the urea bonds at the three terminals of Structure (3) is replaced with an isocyanate group, as the above-described tri- or higher functional isocyanate compound. This trifunctional isocyanate compound is one kind of trifunctional isocyanate compounds of an isocyanurate type to be described later.

In addition, Structure (4) can be formed by using a trifunctional isocyanate compound in which each of the urea bonds at the three terminals of Structure (4) is replaced with an isocyanate group, as the above-described tri- or higher functional isocyanate compound. This trifunctional isocyanate compound is one kind of trifunctional isocyanate compounds of a biuret type to be described later.

(Tri- or Higher Functional Isocyanate Compound)

The tri- or higher functional isocyanate compound is a compound having three or more isocyanate groups in a molecule. As this compound, it is possible to use a compound synthesized by a method which will be described later and a known compound. Examples of the tri- or higher functional isocyanate compound include a tri- or higher functional aromatic isocyanate compound, a tri- or higher functional aliphatic isocyanate compound, and the like.

Examples of the compounds known as such a compound include the compounds described in "Polyurethane Resin Handbook" (edited by Keiji Iwata, published from NIKKAN KOGYO SHIMBUN, LTD. (1987)).

As the tri- or higher functional isocyanate compound, a tri- or higher functional isocyanate compound described in paragraphs 0033 to 0069 of WO2016/052053A can be used.

As the isocyanate compound having three or more functional groups, for example, an isocyanate compound (an adduct-type tri- or higher functional isocyanate compound) caused to have three or more functional groups as an adduct product (adduct) of a difunctional isocyanate compound (a compound having two isocyanate groups in a molecule) and a compound having three or more active hydrogen groups in a molecule such as polyol, polyamine, or polythiol having three or more functional groups, a trimer of a difunctional isocyanate compound (a biuret-type or an isocyanurate-type tri- or higher functional isocyanate compound), and a compound having three or more isocyanate groups in a molecule such as a formalin condensate of benzene isocyanate are also preferable.

These tri- or higher functional isocyanate compounds may be a mixture in which a plurality of compounds are contained, or may contain other components.

—Adduct-Type Tri- or Higher Functional Isocyanate Compound—

In regard to the adduct-type tri- or higher functional isocyanate compound, descriptions in paragraphs 0039 to 0063 of WO2016/052053A can be referred to.

The adduct-type tri- or higher functional isocyanate compound can be synthesized by allowing a reaction between a compound, which will be described later, having three or more active hydrogen groups in a molecule with a difunctional isocyanate compound which will be described later. The active hydrogen group means a hydroxyl group, a primary amino group, a secondary amino group, and a mercapto group.

The adduct-type tri- or higher functional isocyanate compound can be obtained by, for example, heating (50° C. to 100° C.) a compound having three or more active hydrogen groups in a molecule and a difunctional isocyanate compound in an organic solvent while stirring, or by stirring the above compounds at a low temperature (0° C. to 70° C.) while adding a catalyst such as stannous octanoate thereto.

Generally, in regard to the number of moles (number of molecules) of the difunctional isocyanate compound reacted with the compound having three or more active hydrogen groups in a molecule, a difunctional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the difunctional isocyanate compound is preferably 60% to 500%, more preferably 60% to 300%, and even more preferably 80% to 200% of the number of moles of the active hydrogen groups.

Furthermore, the adduct-type tri- or higher functional isocyanate compound can also be obtained by synthesizing an adduct (a prepolymer) of a compound having two active hydrogen groups in a molecule and a difunctional isocyanate compound and then allowing the prepolymer to react with a compound having three or more active hydrogen groups in a molecule.

Examples of the difunctional isocyanate compound include a difunctional aromatic isocyanate compound, a difunctional aliphatic isocyanate compound, and the like.

Specific examples of the difunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, 1,3-bis(2-isocyanato-2-propyl)benzene, and the like.

As the difunctional isocyanate compound, difunctional isocyanate compounds derived from the above compounds can also be used. Examples thereof include DURANATE (registered trademark) D101, D201, A101 (manufactured by Asahi Kasei Corporation) and the like.

As the adduct-type isocyanate compound having three or more functional groups, commercially available products may also be used, and examples thereof include D-102, D-103, D-103H, D-103M2, P49-75S, D-110N, D-120N, D-140N, D-160N (manufactured by Mitsui Chemicals, Inc.), DESMODUR (registered trademark) L75, UL57SP (manufactured by Sumika Bayer Urethane Co., Ltd.), CORONATE (registered trademark) HL, HX, L (manufactured by Nippon Polyurethane Industry Co., Ltd.), P301-75E (manufactured by Asahi Kasei Corporation.), and the like.

Among these adduct-type isocyanate compounds having three or more functional groups, D-110N, D-120N, D-140N, and D-160N (manufactured by Mitsui Chemicals, Inc.) are more preferable.

—Isocyanurate-Type or Biuret-Type Tri- or Higher Functional Isocyanate Compound—

In regard to the isocyanurate-type or biuret-type tri- or higher functional isocyanate compound, descriptions in paragraphs 0064 to 0069 of WO2016/052053A can be referred to.

As the isocyanurate-type isocyanate compound having three or more functional groups, commercially available products may also be used. Examples thereof include D-127N, D-170N, D-170HN, D-172N, D-177N (manufactured by Mitsui Chemicals, Inc.), SUMIDUR N3300, DESMODUR (registered trademark) N3600, N3900, Z4470BA (manufactured by Sumika Bayer Urethane Co., Ltd.), CORONATE (registered trademark) HX, HK (manufactured by Nippon Polyurethane Industry Co., Ltd.), DURANATE (registered trademark) TPA-100, TKA-100, TSA-100, TSS-100, TLA-100, TSE-100 (manufactured by Asahi Kasei Corporation.), and the like.

As the tri- or higher functional isocyanate compound of the biuret-type, commercially available products may also be used. Examples thereof include D-165N and NP 1100 (manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation.), and the like.

Among these isocyanurate-type or biuret-type isocyanate compounds having three or more functional groups, DURANATE (registered trademark) 24A-100 (manufactured by Asahi Kasei Corporation.), D-127 (manufactured by Mitsui Chemicals, Inc.), TKA-100, and TSE-100 (manufactured by Asahi Kasei Corporation.) are more preferable.

The content (unit: mmol/g) of the isocyanate group contained in 1 g of the tri- or higher functional isocyanate compound is preferably 1 mmol/g to 10 mmol/g, more preferably 1.5 mmol/g to 8 mmol/g, and even more preferably 2 mmol/g to 6 mmol/g.

For obtaining the content of the isocyanate group, the isocyanate compound of interest is dissolved in dehydrated toluene, an excess di-n-butylamine solution is then added thereto so as to cause a reaction, and the remaining di-n- butylamine solution is subjected to back titration by using hydrochloric acid. From the titration amount at an inflection point on the titration curve, the content of the isocyanate group can be calculated.

More specifically, the content of the isocyanate group can be calculated by the method described below.

By using a potentiometric titrator (AT-510, manufactured by KYOTO ELECTRONICS MANUFACTURING CO., LTD.) and a 1 mol/L aqueous hydrochloric acid solution, neutralization titration is performed at 25° C. by the blank measurement and the sample measurement described below. From the obtained titration amounts Z1 and Z2, the content of the isocyanate group can be calculated from Equation (N).

$$\text{Content of isocyanate group (mmol/g)}=(Z1-Z2)/(W\times Y) \qquad \text{Equation (N)}$$

In Equation (N), Z1 represents the titration amount of a blank, Z2 represents the titration amount of a sample, W represents the solid content of the sample, and Y represents the mass of the sample.

~Blank Measurement~

10 mL of dehydrated toluene, 10.0 mL of a 2 mol/L di-n-butylamine solution, and 50 mL of isopropyl alcohol are put into a 100 mL beaker and mixed together, thereby preparing a mixed liquid. For the mixed liquid, neutralization titration is performed using a 1 mol/L hydrochloric acid solution. The inflection point on the titration curve is taken as the end point, and the titration amount Z1 (mL) to the end point is determined.

~Sample Measurement~

A sample (an isocyanate compound) Yg with W % by mass of solid content is collected and put into a 100 mL beaker, 20 mL of dehydrated toluene is added to the beaker, and the sample is dissolved, thereby preparing a solution. 10.0 mL of a 2 mol/L di-n-butylamine solution is added to and mixed with the solution, and then the solution is left to stand for 20 minutes or longer. 50 mL of isopropyl alcohol is added to the solution having been left to stand. Thereafter, neutralization titration is performed using a 1 mol/L hydrochloric acid solution, the inflection point on the titration curve is taken as an end point, and the titration amount Z2 (mL) to the end point is determined.

(Water or Compound Having Two or More Active Hydrogen Groups)

The shell of the microcapsule is formed by allowing a reaction between the aforementioned tri- or higher functional isocyanate compound with water or a compound having two or more active hydrogen groups.

As a compound to be reacted with the tri- or higher functional isocyanate compound, generally, water is used. By allowing the tri- or higher functional isocyanate compound to react with water, a three-dimensional cross-linked structure having a urea bond is formed.

In addition, examples of the compound to be reacted with the tri- or higher functional isocyanate compound includes, other than water, a compound having two or more active hydrogen groups. As the compound having two or more active hydrogen groups, a polyfunctional alcohol, a polyfunctional phenol, a polyfunctional amine having a hydrogen atom on a nitrogen atom, and a polyfunctional thiol may also be used.

By reacting the isocyanate compound having three or more functional groups with a polyfunctional alcohol or a polyfunctional phenol, a three-dimensional cross-linked structure having a urethane bond is formed.

By allowing the tri- or higher functional isocyanate compound to react with a polyfunctional amine having a hydrogen atom on a nitrogen atom, a three-dimensional cross-linked structure having a urea bond is formed.

Specific examples of the polyfunctional alcohol include propylene glycol, glycerin, trimethylolpropane, 4,4',4"-trihydroxytriphenylmethane, and the like.

Specific examples of the polyfunctional amine include diethylene triamine, tetraethylene pentamine, and the like.

Specific examples of the polyfunctional thiol include 1,3-propanedithiol, 1,2-ethanedithiol, and the like.

Specific examples of the polyfunctional phenol include bisphenol A and the like.

One kind of these compounds may be used alone, or two or more kinds thereof may be used in combination.

The compound having two or more active hydrogen groups also includes the aforementioned compound having three or more active hydrogen groups in the molecule.

(Hydrophilic Group Capable of being Contained in Shell)

The shell may have a hydrophilic group (preferably an anionic group or a nonionic group).

In the case where the shell has the hydrophilic group, the action of the hydrophilic group of the shell is combined with the action of the hydrophilic group of the dispersant, thereby improving the dispersion stability of the microcapsule.

A preferable aspect of the hydrophilic group capable of being contained in the shell is the same as the preferable aspect of the hydrophilic group of the dispersant.

In regard to the hydrophilic group capable of being contained in the shell and a method for introducing the hydrophilic group into the shell, descriptions in paragraphs 0109 to 0118 of WO2016/052053A can be referred to.

(Method for Introducing Polymerizable Group into Shell)

As described above, the microcapsule has the polymerizable group in at least one of the core or the shell.

The microcapsule has the polymerizable group, which makes it possible that by irradiation with active energy ray, microcapsules adjacent to each other are bonded to each other so as to form a cross-linked structure, and therefore an image having a high level of cross-linking properties and excellent film hardness can be formed.

The microcapsule may have the polymerizable group by a form in which the polymerizable group is introduced into the three-dimensional cross-linked structure of the shell or may have the polymerizable group by a form in which the polymerizable compound is contained in the core. In addition, the microcapsule may have the polymerizable group by both forms.

In a case where the polymerizable compound is not contained in the core of the microcapsule, the microcapsule has the polymerizable group in the three-dimensional cross-linked structure.

Hereinafter, a method for introducing the polymerizable group into the three-dimensional cross-linked structure of the shell will be described.

The polymerizable compound capable of being contained in the core will be described later.

Examples of the method for introducing the polymerizable group into the three-dimensional cross-linked structure of the shell include:

a method in which in a case of forming the three-dimensional cross-linked structure containing at least one bond selected from a urethane bond or a urea bond, the above-described tri- or higher functional isocyanate compound, water or the above-described compound having two or more active hydrogen groups, and the monomer for introducing the polymerizable group, are allowed to react with each other;

a method in which in a case of producing the above-described tri- or higher functional isocyanate compound, first, the above-described difunctional isocyanate compound and the monomer for introducing the polymerizable group are allowed to react with each other so as to produce an isocyanate compound into which the polymerizable group is introduced, and subsequently, the isocyanate compound into which the polymerizable group is introduced is allowed to react with water or the above-described compound having two or more active hydrogen groups;

a method in which in a case of manufacturing the microcapsule, the monomer for introducing the polymerizable group is dissolved in an oil-phase component together with the components constituting the microcapsule, and a water-phase component is added to and mixed with the oil-phase component, followed by emulsification; and the like.

Examples of the monomer for introducing a polymerizable group include a compound which has at least one active hydrogen group and has an ethylenically unsaturated bond on at least one terminal thereof.

In regard to the method for introducing the polymerizable group into the shell, and the monomer for introducing the polymerizable group (for example, a compound which has at least one active hydrogen group and has an ethylenically unsaturated bond on at least one terminal thereof), descriptions in paragraphs 0075 to 0089 of WO2016/052053A can be referred to.

As the compound which has at least one active hydrogen group and has an ethylenically unsaturated bond on at least one terminal thereof, commercially available products may also be used. Examples thereof include acrylates such as hydroxyethyl acrylate (manufactured by OSAKA ORGANIC CHEMICAL INDUSTRY LTD), 4-hydroxybutyl acrylate, 1,4-cyclohexanedimethanol monoacrylate (manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), AP-800 (n=13) (manufactured by NOF CORPORATION), and DENACOL (registered trademark) ACRYLATE DA-212, DA-250, DA-314, DA-721, DA-722, DA-911M, DA-920, DA-931 (manufactured by Nagase ChemteX Corporation), methacrylates such as 2-hydroxyethyl methacrylate (manufactured by KYOEISHA CHEMICAL Co., LTD), and BLEMMER (registered trademark) PE-90 (n=2), PE-200 (n=4.5), PE-350 (n=8), PP-1000 (n=4 to 6), PP-500 (n=9), PP-800 (n=13) (manufactured by NOF CORPORATION), acrylamide (manufactured by KJ Chemicals Corporation), A-TMM-3L (manufactured by SHIN-NAKAMURA CHEMICAL CO., LTD.), SR399E (manufactured by Sartomer Arkema Inc.), and the like.

Among these compounds which have at least one active hydrogen group and have an ethylenically unsaturated bond on at least one terminal thereof, hydroxyethyl acrylate (manufactured by OSAKA ORGANIC CHEMICAL INDUSTRY LTD), AE-400 (n=10), AP-400 (n=6) (manufactured by NOF CORPORATION), DENACOL (registered trademark) ACRYLATE DA-212 (manufactured by Nagase ChemteX Corporation), PP-500 (n=9) (manufactured by NOF CORPORATION), A-TMM-3L (manufactured by SHIN-NAKAMURA CHEMICAL CO., LTD.), or SR399E (manufactured by Sartomer Arkema Inc.) is preferable.

The introduction of the polymerizable group into the shell can be carried out by allowing a reaction between, for example, an isocyanate compound into which the polymerizable group is introduced, and the above-described compound having two or more active hydrogen groups.

At the time of manufacturing the isocyanate compound into which a polymerizable group is introduced, the polyisocyanate (that is, the isocyanate compound having three or more functional groups) and the monomer for introducing the polymerizable group are reacted with each other, such that the number of moles of the active hydrogen group of the monomer for introducing the polymerizable group preferably becomes 1% to 30% (more preferably becomes 2% to 25% and even more preferably becomes 3% to 20%) of the number of moles of the isocyanate group of the polyisocyanate.

In the isocyanate compound into which a polymerizable group is introduced, the average number of functional groups of the isocyanate group is equal to or smaller than 3 in some cases. However, even in these cases, as long as the raw materials for forming the shell contain at least one tri- or higher functional isocyanate compound, the shell having the three-dimensional cross-linked structure can be formed.

<Core of Microcapsule>

Components to be contained in the core of the microcapsule are not particularly limited.

The core may contain for example, a polymerizable compound, a photopolymerization initiator, a sensitizer, and the like. In addition, the core may contain other components of the aqueous dispersion which will be described below.

(Polymerizable Compound)

The core of the microcapsule preferably contains the polymerizable compound. According to this aspect, curing sensitivity of a film and hardness of the film are further improved.

Hereinafter, the core of the microcapsule containing the polymerizable compound will also be referred to as the microcapsule containing the polymerizable compound in the interior thereof, and the polymerizable compound contained in the core will also be referred to as "internal polymerizable compound."

As described above, the term "polymerizable compound" (internal polymerizable compound) referred herein means the polymerizable compound contained in the core. The concept of the term "polymerizable compound" (internal polymerizable compound) does not include the term "isocyanate compound into which the polymerizable group is introduced" described above which is the compound for introducing the polymerizable group into the shell.

In a case where the core contains the polymerizable compound, the polymerizable compound contained in the core (internal polymerizable compound) may be used alone, or two or more kinds thereof may be used.

In a case where the core contains the polymerizable compound, a polymerizable group of the polymerizable compound functions as a polymerizable group of the core.

In the aspect in which the core of the microcapsule contains the polymerizable compound, not only the core but also the shell has the polymerizable group.

As the polymerizable compound capable of being contained in the core of the microcapsule, a photopolymerizable compound that is polymerized and cured by irradiation with active energy rays (will also be simply referred to as "light"), or a thermally polymerizable compound that is polymerized and cured by heating or irradiation with infrared rays, is preferable. As the photopolymerizable compound, a radically polymerizable compound which is capable of radical polymerization and has an ethylenically unsaturated bond is preferable.

The description that the core of the microcapsule contains the photopolymerizable compound (for example, a radically polymerizable compound) means that the polymerizable group of the microcapsule is a photopolymerizable group (for example, a radically polymerizable group), and the core contains the photopolymerizable compound (for example, a radically polymerizable compound) as a compound having the photopolymerizable group (for example, a radically polymerizable group).

In addition, the description that the core of the microcapsule contains the thermally polymerizable compound means that the polymerizable group of the microcapsule is the thermally polymerizable group, and the core contains the thermally polymerizable compound as the compound having the thermally polymerizable group.

The polymerizable compound capable of being contained in the core of the microcapsule may be any one of a polymerizable monomer, a polymerizable oligomer, or a polymerizable polymer, but is preferably a polymerizable monomer from the viewpoints of improving the curing sensitivity of a film and hardness of the film. Among these, more preferable polymerizable compound is a polymerizable monomer having photocuring properties (photopolymerizable monomer), and a polymerizable monomer having thermosetting properties (thermally polymerizable monomer).

The content of the polymerizable compound (total content in a case of containing two or more kinds thereof) capable of being contained in the core of the microcapsule (preferably a polymerizable monomer, hereinafter, the same shall be applied) is preferably 10% by mass to 70% by mass, more preferably 20% by mass to 60% by mass, and even more preferably 30% by mass to 55% by mass, with respect to the total solid content of the microcapsule, from the viewpoint of improving curing sensitivity of a film and hardness of the film.

In a case where the core of the microcapsule contains the polymerizable compound, the core may contain only one kind of the polymerizable compound or may contain two or more kinds thereof.

The core of the microcapsule preferably contains a di- or lower functional radically polymerizable compound (preferably a di- or lower functional radically polymerizable monomer, hereinafter, the same shall be applied) and a tri- or higher functional radically polymerizable compound (preferably a tri- or higher functional radically polymerizable monomer, hereinafter, the same shall be applied). According to the aspect in which the core of the microcapsule contains a di- or lower functional radically polymerizable compound and a tri- or higher functional radically polymerizable compound, a film having excellent hardness and having excellent adhesiveness to a substrate can be formed. In the above aspect, it is considered that the di- or lower functional radically polymerizable compound contributes to the adhesiveness of the film to the substrate, and the tri- or higher functional radically polymerizable compound contributes to the hardness of the film.

In the case where the core contains the di- or lower functional radically polymerizable compound and the tri- or higher functional radically polymerizable compound, a ratio of the tri- or higher functional radically polymerizable compound is preferably 10% by mass to 90% by mass, more preferably 20% by mass to 70% by mass, and even more preferably 30% by mass to 55% by mass, with respect to a total mass of the di- or lower functional radically polymerizable compound and the tri- or higher functional radically polymerizable compound.

As the polymerizable compound capable of being contained in the core (for example, a radically polymerizable compound), from the viewpoint of further improving the dispersion stability of inks and the adhesiveness between the film and the substrate, a radically polymerizable compound that contains one or more cyclic structures and two or more (meth)acryloyl groups in one molecule is also preferable (hereinafter, referred to as "di- or higher functional polymerizable cyclic compound").

Examples of the di- or higher functional polymerizable cyclic compound include tricyclodecane dimethanol di(meth)acrylate, bisphenol A ethylene oxide (EO) adduct di(meth)acrylate, bisphenol A propylene oxide (PO) adduct di(meth)acrylate, ethoxylated bisphenol A di(meth)acrylate, alkoxylated dimethylol tricyclodecane di(meth)acrylate, alkoxylated cyclohexanone dimethanol di(meth)acrylate, cyclohexanone dimethanol di(meth)acrylate, and the like.

In a case where the core contains the di- or higher functional polymerizable cyclic compound, a percentage of the di- or higher functional polymerizable cyclic compound preferably accounts for 10% by mass to 100% by mass, more preferably from 30% by mass to 100% by mass, and particularly preferably from 40% by mass to 100% by mass of this entire polymerizable compound.

The molecular weight of the polymerizable compound is, in terms of a weight-average molecular weight, preferably 100 to 100,000, more preferably 100 to 30,000, even more preferably 100 to 10,000, still more preferably 100 to 4,000, yet more preferably 100 to 2,000, much more preferably 100 to 1,000, far more preferably 100 to 900, far more preferably 100 to 800, and particularly preferably 150 to 750.

The weight-average molecular weight of the polymerizable compound is a value measured by gel permeation chromatography (GPC). A measure method is as described above.

—Polymerizable Monomer—

Examples of the polymerizable monomer capable of being contained in the core of the microcapsule include a photopolymerizable monomer that is polymerized and cured by irradiation with light, or a thermally polymerizable monomer that is polymerized and cured by heating or irradiation with infrared rays.

In a case of containing the photopolymerizable monomer as the polymerizable compound, an aspect in which a photopolymerization initiator to be described later is contained is preferable. In addition, in a case of containing the thermally polymerizable monomer as the polymerizable compound, the photothermal conversion agent, the thermal curing accelerator, or an aspect in which the photothermal conversion agent and the thermal curing accelerator are contained, which will be described later is preferable.

<Photopolymerizable Monomer>

The photopolymerizable monomer can be selected from a polymerizable monomer having a radically polymerizable ethylenically unsaturated bond (that is, a radically polymerizable monomer) and a polymerizable monomer having a cationic polymerizable group that can be cationically polymerized (that is, a cationic polymerizable monomer).

Examples of the radically polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

As the radically polymerizable monomer, a compound having an ethylenic unsaturated group and an ethylenically unsaturated group is preferable.

In a case where the core of the microcapsule contains the radically polymerizable monomer, the core may contain only one or two or more radically polymerizable monomers.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxyethylhydrophthalic acid, ethoxydiethylene glycol acrylate, methoxydiethyleneglycol acrylate, methoxypolyethylene glycol acrylate, methoxypropylene glycol acrylate, 2-hydroxy-3-phenoxypropyl acrylate, vinyl ether acrylate, 2-acryloyloxyethyl succinic acid, 2-acryloyloxy phthalic acid, 2-acryloxyethyl-2-hydroxyethyl phthalic acid, lactone modified acrylate, acryloyl morpholine, acrylamide, and substituted acrylamides (for example, N-methylol acrylamide and diacetone acrylamide);

difunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate;

tri- or higher functional acrylate compounds such as trimethylolpropane triacrylate, pentaerythritol triacrylate, dipentaerythritol tetraacrylate, ethoxylated isocyanuric acid triacrylate, e-caprolactone modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate; and the like.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate;

difunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate; and the like.

Examples of the styrene compound include styrene, p-methylstyrene, p-methoxystyrene, β-methylstyrene, p-methyl-β-methyl styrene, α-methyl styrene, p-methoxy-β-methylstyrene, and the like.

Examples of the vinylnaphthalene compound include 1-vinylnaphthalene, methyl-1-vinylnaphthalene, β-methyl-1-vinylnaphthalene, 4-methyl-1-vinylnaphthalene, 4-methoxy-1-vinylnaphthalene, and the like.

Examples of the N-vinyl heterocyclic compound include N-vinylcarbazole, N-vinylpyrrolidone, N-vinyl ethylacetamide, N-vinylpyrrole, N-vinylphenothiazine, N-vinylacetanilide, N-vinyl succinic acid imide, N-vinylphthalimide, N-vinylcaprolactam, N-vinylimidazole, and the like.

Examples of other radically polymerizable monomers include N-vinyl amides such as allyl glycidyl ether, diallyl phthalate, triallyl trimellitate, and N-vinylformamide, and the like.

Among these radically polymerizable monomer, as the di- or lower functional radically polymerizable monomer, at least one kind selected from 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate, is preferable.

In addition, as the tri- or higher functional radically polymerizable monomer, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate, is preferable.

As a combination of the di- or lower functional radically polymerizable monomer and the tri- or higher functional radically polymerizable monomer, a combination of a di- or lower functional acrylate compound and a tri- or higher functional acrylate compound is preferable, a combination of a difunctional acrylate compound and a tri- or higher functional acrylate compound is even more preferable, a combination of a difunctional acrylate compound and a tri- to octa-acrylate compound is still more preferable, and a combination of a difunctional acrylate compound and a tri- to hexa-acrylate compound is yet more preferable.

Furthermore, the most preferable combination thereof is a combination of, as a difunctional acrylate compound, at least one kind selected from 1,6-hexanediol diacrylate (HDDA), 1,9-nonanediol diacrylate (NDDA), 1,10-decanediol diacrylate (DDDA), 3-methylpentadiol diacrylate (3 MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, and polypropylene glycol diacrylate, and, as a tri- to hexa-acrylate compound, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

In addition to the radically polymerizable monomers exemplified above, it is possible to use the commercially available products described in "Cross-linking Agent Handbook" edited by Shinzo Yamashita (1981, TAISEI-SHUPPAN CO., LTD.); "UV•EB Curing Handbook (raw materials)" edited by Kiyomi Kato (1985, Kobunshi Kankokai); "Application and Market of UV•EB Curing Technology" edited by RadTech Japan, p. 79, (1989, CMC); "Polyester Resin Handbook" written by Eichiro Takiyama, (1988, NIKKAN KOGYO SHIMBUN, LTD.) and to use radically polymerizable and cross-linkable monomers known in the technical field.

Examples of the cationic polymerizable monomer include an epoxy compound, a vinyl ether compound, and an oxetane compound.

As the cationic polymerizable monomer, a compound having at least one olefin, thioether, acetal, thioxane, thietane, aziridine, N-heterocyclic ring, O-heterocyclic ring, S-heterocyclic ring, P-heterocyclic ring, aldehyde, lactam, or a cyclic ester group is preferable.

As the cationic polymerizable monomer, it is possible to use the compounds described in "Advances in Polymer Science" by J. V. Crivello et al., 62, pages 1 to 47 (1984), "Handbook of Epoxy Resins" by Lee et al., McGraw Hill Book Company, New York (1967), and "Epoxy Resin Technology" by P. F. Bruins et al. (1968).

In addition, as the photopolymerizable monomer, for example, the photocurable polymerizable monomers used in photopolymerizable compositions described in JP1995-159983A (JP-H07-159983A), JP1995-031399B (JP-H07-031399B), JP1996-224982A (JP-H08-224982A), JP1998-000863A (JP-H10-000863A), JP1997-134011A (JP-H09-134011A), JP2004-514014A, and the like are known. These monomers can also be suitably applied as the polymerizable monomer capable of being contained in the core of the microcapsule.

As the photopolymerizable monomer, a commercially available product on the market may be used.

Examples of the commercially available product of the photopolymerizable monomer include AH-600 (difunctional), AT-600 (difunctional), UA-306H (hexafunctional), UA-306T (hexafunctional), UA-306I (hexafunctional), UA-510H (decafunctional), UF-8001G (difunctional), DAUA-167 (difunctional), LIGHT ACRYLATE NPA (difunctional), and LIGHT ACRYLATE 3EG-A (difunctional) (all of which are manufactured by KYOEISHA CHEMICAL Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (all of which are manufactured by Sartomer Arkema Inc.), A-NOD-N(NDDA, difunctional), A-DOD-N (DDDA, difunctional), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (all of which are manufactured by Shin-Nakamura Chemical Co., Ltd.), UV-7510B (trifunctional) (manufactured by Nippon Synthetic Chemical Industry Co., Ltd.), KAYARAD DPCA-30 (hexafunctional) and KAYARAD DPEA-12 (hexafunctional) (all of which are manufactured by Nippon Kayaku Co., Ltd.), and the like.

In addition, as the polymerizable monomer, it is possible to suitably use the commercially available products such as neopentyl glycol propylene oxide adduct diacrylate (NPGPODA), SR531, SR285, and SR256 (all of which are manufactured by Sartomer Arkema Inc.), A-DHP (dipentaerythritol hexaacrylate, SHIN-NAKAMURA CHEMICAL CO., LTD.), ARONIX (registered trademark) M-156 (manufactured by TOAGOSEI CO., LTD.), V-CAP (manufactured by BASF SE), VISCOAT #192 (manufactured by OSAKA ORGANIC CHEMICAL INDUSTRY LTD), and the like.

Among these commercially available products, SR506, SR833S, A-9300, or A-9300-CL, which are the photopolymerizable monomers having a cyclic structure, is preferable, and SR833S is particularly preferable.

<Thermally Polymerizable Monomer>

The thermally polymerizable monomer can be selected from the group of the polymerizable monomers capable of polymerization by heating or irradiation with infrared rays. Examples of thermally polymerizable monomer include compounds such as epoxy, oxetane, aziridine, azetidine, ketone, aldehyde, or blocked isocyanate.

Among the above examples, examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, and alicyclic diepoxide;

tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene; and the like.

Examples of the oxetane compound include 3-ethyl-3-hydroxymethyl-1-oxetane, 1,4-bis[3-ethyl-3-oxetanyl-methoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, 3,3-dimethyl-2-(p-methoxyphenyl)-oxetane, and the like.

Examples of the blocked isocyanate compound include a compound obtained by inactivating an isocyanate compound with a blocking agent (active hydrogen-containing compound).

As the isocyanate compound, for example, commercially available isocyanates such as hexamethylene diisocyanate, isophorone diisocyanate, toluyl diisocyanate, xylylene diisocyanate, hexamethylene diisocyanate trimer, trimethylhexylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and Bayhydur (registered trademark; Bayer AG), or a di- or higher functional isocyanate obtained by combination thereof is preferable.

Examples of the blocking agent include lactam [for example, e-caprolactam, 6-valerolactam, γ-butyrolactam, and the like], oxime [for example, acetoxime, methyl ethyl ketoxime (MEK oxime), methyl isobutyl ketoxime (MIBK oxime), cyclohexanone oxime, and the like], amines [for example, aliphatic amines (dimethylamine, diisopropylamine, di-n-propylamine, diisobutylamine, and the like), alicyclic amines (methylhexylamine, dicyclohexylamine, and the like), aromatic amines (aniline, diphenylamine, and the like)], aliphatic alcohols [for example, methanol, ethanol, 2-propanol, n-butanol, and the like], phenol and alkylphenol [for example, phenol, cresol, ethylphenol, n-propylphenol, isopropylphenol, n-butylphenol, octylphenol, nonylphenol, xylenol, diisopropylphenol, di-t-butylphenol, and the like], imidazole [for example, imidazole, 2-methylimidazole, and the like], pyrazole [for example, pyrazole, 3-methylpyrazole, 3,5-dimethylpyrazole, and the like], imine [for example, ethyleneimine, polyethyleneimine, and the like], active methylene [for example, dimethyl malonate, diethyl malonate, diisopropyl malonate, acetylacetone, methyl acetoacetate, ethyl acetoacetate, and the like], blocking agents disclosed in JP2002-309217A and JP2008-239890A, and a mixture of two or more kinds thereof. Among these, as the blocking agent, oxime, lactam, pyrazole, active methylene, and amine are preferable.

As the blocked isocyanate compound, commercially available products on the market may be used, and for example, Trixene™ BI7982, BI7641, BI7642, BI7950, BI7960, BI7991, and the like (Baxenden Chemicals ltd), and Bayhydur (registered trademark; Bayer AG) are suitably used. In addition, the group of compounds described in paragraph 0064 of WO2015/158654A is suitably used.

In a case of manufacturing the microcapsule, the polymerizable monomer is dissolved as an oil-phase component together with the components constituting the microcapsule, and a water-phase component is added to and mixed with the oil-phase component, followed by emulsification, and therefore the polymerizable monomer can be incorporated into the core of the microcapsule.

The molecular weight of the polymerizable monomer is, in terms of a weight-average molecular weight, preferably 100 to 4,000, more preferably 100 to 2,000, even more preferably 100 to 1,000, still more preferably 100 to 900, yet more preferably 100 to 800, and particularly preferably 150 to 750.

The weight-average molecular weight of the polymerizable monomer is a value measured by gel permeation chromatography (GPC). A measure method is as described above.

—Polymerizable Oligomer and Polymerizable Polymer—

An aspect in which the polymerizable compound is a polymerizable oligomer or a polymerizable polymer is advantageous in that cure shrinkage of a film is decreased and a deterioration in adhesiveness of the film to a substrate is suppressed. In a case of containing the polymerizable oligomer or polymerizable polymer, which have photocuring properties, as the polymerizable compound, an aspect in which a photopolymerization initiator to be described later is contained is preferable. In addition, in a case of containing the polymerizable oligomer or polymerizable polymer, which have thermosetting properties, as the polymerizable compound, the photothermal conversion agent, the thermal curing accelerator, or an aspect in which the photothermal conversion agent and the thermal curing accelerator are contained, which will be described later is preferable.

Examples of the polymerizable oligomer or the polymerizable polymer include oligomers or polymers such as an acrylic resin, a urethane resin, polyester, polyether, polycarbonate, an epoxy resin, and polybutadiene.

In addition, as the polymerizable oligomer or the polymerizable polymer, resins such as epoxy acrylate, aliphatic urethane acrylate, aromatic urethane acrylate, and polyester acrylate may be used.

Among these, as the polymerizable oligomer or the polymerizable polymer, from the viewpoint of decreasing cure shrinkage, a resin which has a hard segment and a soft segment in combination and is capable of stress relaxation in a case of curing is preferable, and particularly, at least one oligomer or polymer selected from the group consisting of a urethane resin, a polyester resin, and an epoxy resin is more preferable.

As the polymerizable group having the polymerizable oligomer or the polymerizable polymer, an ethylenically unsaturated group such as a (meth)acrylic group, a vinyl group, an allyl group, and a styryl group, an epoxy group, and the like are preferable, and from the viewpoint of polymerization reactivity, at least one group selected from the group consisting of a (meth)acrylic group, a vinyl group, and a styryl group is more preferable, and a (meth)acrylic group is particularly preferable.

In a case where the core of the microcapsule contains the polymerizable oligomer or the polymerizable polymer as the polymerizable compound, the polymerizable oligomer or the polymerizable polymer may have only one or two or more polymerizable groups.

These polymerizable groups can be introduced into polymers or oligomers by polymer reaction or copolymerization.

For example, by using a reaction between a polymer or an oligomer having a carboxy group on a side chain, and glycidyl methacrylate, or a reaction between a polymer or an oligomer having an epoxy group, and an ethylenically unsaturated group-containing carboxylic acid such as a methacrylic acid, the polymerizable groups can be introduced into polymers or oligomers.

As the polymerizable oligomer and the polymerizable polymer, a commercially available product on the market may be used.

Examples of the commercially available product of the polymerizable oligomer and the polymerizable polymer include acrylic resins such as (ACA) Z200M, (ACA) Z230AA, (ACA) Z251, and (ACA) Z254F (all of which are manufactured by DAICEL-ALLNEX LTD.), and HA7975D (Hitachi Chemical Co., Ltd.);

urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, and KRM 8528 (all of which are manufactured by DAICEL-ALLNEX LTD.), CN964, CN9012, CN968, CN996, CN975, and CN9782 (all of which are manufactured by Sartomer Arkema Inc.), UV-6300B, UV-7600B, UV-7605B, UV-7620EA, and UV-7630B (all of which are manufactured by Nippon Synthetic Chemical Industry Co., Ltd.), U-6HA, U-15HA, U-108A, U-200PA, and UA-4200 (all of which are manufactured by Shin-Nakamura Chemical Co., Ltd.), TL2300, HA4863, TL2328, TL2350, and HA7902-1 (all of which are manufactured by Hitachi Chemical Co., Ltd.), and 8UA-017, 8UA-239, 8UA-239H, 8UA-140, 8UA-585H, 8UA-347H, and 8UX-015A (all of which are manufactured by TAISEI FINE CHEMICAL CO, LTD.);

polyester resins such as CN294, CN2254, CN2260, CN2271E, CN2300, CN2301, CN2302, CN2303, and CN2304 (all of which are manufactured by Sartomer Arkema Inc.), and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are manufactured by DAICEL-ALLNEX LTD.);

polyether resins such as BLEMMER (registered trademark) ADE-400A and BLEMMER (registered trademark) ADP-400 (all of which are manufactured by NOF CORPORATION);

polycarbonate resins such as polycarbonate diol diacrylate (UBE INDUSTRIES, LTD.);

epoxy resins such as EBECRYL (registered trademark) 3708 (DAICEL-ALLNEX LTD.), CN120, CN120B60, CN120B80, and CN120E50 (all of which are manufactured by Sartomer Arkema Inc.), HA7851 (Hitachi Chemical Co., Ltd.), and EPICLON (registered trademark) 840 (DIC CORPORATION); and polybutadiene resins such as CN301, CN303, and CN307 (all of which are manufactured by Sartomer Arkema Inc.).

(Photopolymerization Initiator)

The core of the microcapsule may contain at least one photopolymerization initiator. That is, the microcapsule may contain at least one photopolymerization initiator in the interior thereof.

In a case where the polymerizable group of the microcapsule is a photopolymerizable group (preferably a radically polymerizable group) (particularly, in a case where the core contains a photopolymerizable compound (more preferably a radically polymerizable compound)), the core of the microcapsule preferable contains at least one photopolymerization initiator.

In the case where the core of the microcapsule contains the photopolymerization initiator, sensitivity with respect to active energy rays increases, thereby by obtaining a film (for example, an image) in which hardness is excellent and adhesiveness to a substrate is also excellent.

In more detail, the microcapsule in the aqueous dispersion of the present disclosure has the polymerizable group in at least one of the shell or the core. In the case where the core of the microcapsule contains the photopolymerization initiator, one microcapsule has both the polymerizable group and the photopolymerization initiator. Therefore, a distance between the polymerizable group and the photopolymerization initiator becomes closer, and thus curing sensitivity (hereinafter, will also be simply referred to as "sensitivity") of the film is improved compared to the case of using the photocurable composition of the related art. As a result, a film having excellent hardness, and excellent adhesiveness to a substrate is formed.

In addition, in the case where the core of the microcapsule contains the photopolymerization initiator, it is possible to use a photopolymerization initiator which is highly sensitive but was difficult to use in the related art due to low dispersibility or low solubility in water (for example, a photopolymerization initiator exhibiting solubility equal to or lower than 1.0% by mass in water at 25° C.). As a result, a range of choice of the photopolymerization initiator to be used broadens, and hence a range of choice of the light source to be used also broadens. Accordingly, the curing sensitivity can be further improved compared to the related art.

Specific examples of the above-described photopolymerization initiator which is highly sensitive but was difficult to use due to low dispersibility or low solubility in water, include a carbonyl compound and an acylphosphine oxide compound to be described later, and the acylphosphine oxide compound is preferable.

As above, in the aqueous dispersion of the present disclosure, the substance which exhibits low solubility in water can be contained in the aqueous dispersion which is an aqueous composition by being contained in the core of the microcapsule. This is one of the advantageous of the aqueous dispersion of the present disclosure.

In addition, in the aqueous dispersion of the aspect in which the core of the microcapsule contains the photopolymerization initiator, storage stability is excellent compared to the photocurable composition of the related art. It is considered that the reason thereof is because the photopolymerization initiator being contained in the core of the microcapsule suppresses the aggregation or precipitation of the photopolymerization initiator. Furthermore, it is considered that the core containing the photopolymerization initiator is covered by the shell, which suppresses bleeding out of the photopolymerization initiator, and therefore the dispersion stability of the microcapsule is improved.

As the photopolymerization initiator capable of being contained in the interior of the core of the microcapsule (hereinafter, referred to as an internal photopolymerization initiator as well), known photopolymerization initiators can be appropriately selected so as to be used.

The internal photopolymerization initiator is a compound generating a radical, which is a polymerization initiating species, by absorbing light (that is, active energy rays).

Known compounds can be used as the internal photopolymerization initiator. Examples of preferable internal photopolymerization initiators include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

As the internal photopolymerization initiator, one kind of the compounds (a) to (m) may be used singly, or two or more kinds thereof may be used in combination.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77-117, and the like.

More preferable examples of the compounds include the α-thiobenzophenone compound described in JP1972-006416B (JP-S47-006416B), the benzoin ether compound described in JP1972-003981B (JP-S47-003981B), the α-substituted benzoin compound described in JP1972-022326B (JP-S47-022326B), the benzoin derivative described in JP1972-023664B (JP-S47-023664B), the aryolphosphonic acid ester described in JP1982-030704A (JP-S57-030704A), the dialkoxybenzophenone described in JP1985-026483B (JP-S60-026483B), the benzoin ethers described in JP1985-026403B (JP-S60-026403B) and JP1987-081345A (JP-S62-081345A), the α-aminobenzophenones described in JP1989-034242B (JP-H01-034242B), U.S. Pat. No. 4,318,791A, and EP0284561A1, the p-di(dimethylaminobenzoyl)benzene described in JP1990-211452A (JP-H02-211452A), the thio-substituted aromatic ketone described in JP1986-194062A (JP-S61-194062A), the acylphosphine sulfide described in JP1990-009597B (JP-H02-009597B), the acylphosphine described in JP1990-009596B (JP-H02-009596B), the thioxanthones described in JP1988-061950B (JP-S63-061950B), the coumarins described in JP1984-042864B (JP-S59-042864B), and the like.

Furthermore, the polymerization initiator described in JP2008-105379A or JP2009-114290A is also preferable.

Examples of the commercially available product of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO [all of which are manufactured by BASF SE], ESACURE (registered trademark) KTO37, KTO46, KIP 150, and EDB [all of which are manufactured by Lamberti S.p.A.], H-Nu (registered trademark) 470 and 470X [all of which are manufactured by Spectra Group Limited, Inc.], Omnipol TX and 9210 [all of which are manufactured by IGM Resins B. V.], SPEEDCURE 7005, 7010, and 7040 [all of which are manufactured by Lambson Limited], and the like.

Among these internal photopolymerization initiators, (a) carbonyl compound or (b) acylphosphine oxide compound is more preferable. Specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2,4,6-trimethylbenzoyl-diphenyl-phosphine oxide (for example, DAROCUR (registered trademark) TPO, LUCIRIN (registered trademark) TPO (all manufactured by BASF SE)), and the like.

Among these, from the viewpoint of improving sensitivity and from the viewpoint of suitability for LED light, as the internal photopolymerization initiator, (b) acylphosphine oxide compound is preferable, and a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide) is more preferable.

The wavelength of the LED light is preferably 355 nm, 365 nm, 385 nm, 395 nm, or 405 nm.

In addition, as the internal photopolymerization initiator, a polymer-type photopolymerization initiator is preferable from the viewpoint of suppressing the migration. Examples of the polymer-type photopolymerization initiator include Omnipol TX, 9210; SPEEDCURE 7005, 7010, and 7040 described above.

In a case of manufacturing the microcapsule, the internal photopolymerization initiator is dissolved as an oil-phase component together with the components constituting the microcapsule, a water-phase component is added to and mixed with the oil-phase component, followed by emulsification, and therefore the internal photopolymerization initiator can be incorporated into the core of the microcapsule.

The content of the internal photopolymerization initiator with respect to the total solid content of the microcapsule and the total amount of the dispersant is preferably 0.1% by mass to 25% by mass, more preferably 0.5% by mass to 20% by mass, and even more preferably 1% by mass to 15% by mass.

—Internal Content Rate—

In the aqueous dispersion of the present disclosure, from the viewpoint of the curing sensitivity of a film, an internal content rate (% by mass) of the photopolymerization initiator is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass.

In a case where the aqueous dispersion contains two or more kinds of photopolymerization initiators, it is preferable that the internal content rate of at least one kind of photopolymerization initiator is within the aforementioned preferable range.

The internal content rate (% by mass) of the photopolymerization initiator means the amount of the photopolymerization initiator contained in the core of the microcapsule (that is, the polymerizable compound contained in the interior of the microcapsule) with respect to the total amount of the photopolymerization initiator in the aqueous dispersion in a case where the aqueous dispersion is prepared, and refers to a value obtained as below.

—Method for Measuring Internal Content Rate (% by Mass) of Photopolymerization Initiator—

The operation described below is performed under the condition of a liquid temperature of 25° C.

In a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment is removed.

First, from the aqueous dispersion, two samples (hereinafter, referred to as "sample 1" and "sample 2") of the same mass are collected.

Tetrahydrofuran (THF) having a mass 500 times the mass of the total solid content in the sample 1 is added to and mixed with the sample 1, thereby preparing a diluted solution. The obtained diluted solution is subjected to centrifugation under the condition of 80,000 rpm and 40 minutes. The supernatant (hereinafter, referred to as "supernatant 1") generated by the centrifugation is collected. It is considered that by this operation, all of the photopolymerization initiators contained in the sample 1 is extracted into the supernatant 1. The mass of the photopolymerization initiator contained in the collected supernatant 1 is measured by liquid chromatography (for example, a liquid chromatography device manufactured by Waters Corporation). The obtained mass of the photopolymerization initiator is taken as "total amount of photopolymerization initiator."

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the photopolymerization initiator that was not contained in the interior of the microcapsule in the sample 2 (that is, the free photopolymerization initiator) is extracted into the supernatant 2. The mass of the photopolymerization initiator contained in the collected supernatant 2 is measured by liquid chromatography (for example, a liquid chromatography device manufactured by Waters Corporation). The obtained mass of the photopolymerization initiator is taken as "amount of the free photopolymerization initiator."

Based on "total amount of photopolymerization initiator" and "amount of free photopolymerization initiator" described above, the internal content rate (% by mass) of the photopolymerization initiator is calculated according to the equation shown below.

Internal content rate (% by mass) of photopolymerization initiator=((total amount of photopolymerization initiator−amount of free photopolymerization initiator)/total amount of photopolymerization initiator)×100

In a case where the aqueous dispersion contains two or more kinds of photopolymerization initiators, by using the total amount of the two or more kinds of photopolymerization initiators as "total amount of photopolymerization initiators" and using the total amount of the two or more kinds of free photopolymerization initiators as "amount of free photopolymerization initiators", the total internal content rate of the two or more kinds of photopolymerization initiators may be determined. Alternatively, by using the amount of one kind of photopolymerization initiator as "total amount of photopolymerization initiator" and using the amount of the other one kind of free photopolymerization initiator as "amount of free photopolymerization initiator", the internal content rate of any one kind of photopolymerization initiator may be determined.

Whether or not the components (for example, the above-described polymerizable compound) other than the photopolymerization initiator are contained in the interior of the microcapsule (that is, whether the components are contained in the core of the microcapsule) can be checked by the same method as the method for investigating whether or not the photopolymerization initiator is contained in the interior of the microcapsule.

For a compound having a molecular weight equal to or more than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

The measurement conditions by GPC in the present specification are as described above.

In the present specification, the mass of a compound is measured by the gel permeation chromatography (GPC), by using HLC (registered trademark)-8020 GPC (manufactured by Tosoh Corporation) as a measurement device, three columns of TSKgel (registered trademark) Super Multipore HZ-H (4.6 mm ID×15 cm, manufactured by Tosoh Corporation) as columns, and tetrahydrofuran (THF) as an eluent. Furthermore, GPC is performed using an RI detector under the measurement conditions of a sample concentration of 0.45% by mass, a flow rate of 0.35 ml/min, a sample injection amount of 10 μl, and a measurement temperature of 40° C.

A calibration curve is prepared from 8 samples of "Standard Sample TSK standard, polystyrene" manufactured by Tosoh Corporation: "F-40," "F-20," "F-4," "F-1," "A-5000," "A-2500," "A-1000," and "n-propylbenzene."

(Sensitizer)

The core of the microcapsule may contain at least one sensitizer.

In a case where the core contains at least one photopolymerization initiator, the core preferably contains at least one sensitizer.

In a case where the core of the microcapsule contains the sensitizer, the decomposition of the photopolymerization initiator by the irradiation with active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acylcoumarin derivative, terphenyl, styryl ketone, 3-(aroylmethylene)thiazolyl, camphorquinone, eosin, rhodamine, erythrosine, and the like.

Furthermore, as the sensitizer, the compound represented by General Formula (i) described in JP2010-024276A or the compound represented by General Formula (I) described in JP1994-107718A (JP-H06-107718A) can also be suitably used.

Among the above compounds, as the sensitizer, from the viewpoint of the suitability for LED light and the reactivity with the photopolymerization initiator, at least one kind of compound selected from thioxanthone, isopropylthioxanthone, and benzophenone is preferable, at least one kind of compound selected from thioxanthone and isopropylthioxanthone is more preferable, and isopropylthioxanthone is even more preferable.

In a case where the core of the microcapsule includes the sensitizer, the core may include one kind of the sensitizer or may include two or more kinds thereof.

In a case where the core of the microcapsule contains the sensitizer, a content of the sensitizer is preferably 0.1% by mass to 20% by mass, more preferably 0.2% by mass to 15% by mass, and even more preferably 0.3% by mass to 10% by mass, with respect to the total solid content of the microcapsule and the total amount of the dispersant.

(Photothermal Conversion Agent)

In the case where the core of the microcapsule contains the thermally polymerizable compound as a polymerizable compound (preferably a thermally polymerizable monomer), the core may contain at least one photothermal conversion agent.

The photothermal conversion agent is a compound which absorbs light such as infrared rays (that is, active energy rays) and generates heat so as to polymerize and cure the thermally polymerizable compound. As the photothermal conversion agent, a known compound can be used.

As the photothermal conversion agent, an infrared ray absorbent is preferable. Examples of the infrared ray absorbent include polymethylindolium, indocyanine green, a polymethine coloring agent, a croconium coloring agent, a cyanine coloring agent, a merocyanine coloring agent, a squarilium coloring agent, a chalcogenopyrylo arylidene coloring agent, a metal thiolate complex coloring agent, a bis(chalcogenopyrylo)polymethine coloring agent, an oxyindolizine coloring agent, a bisaminoallyl polymethine coloring agent, an indolizine coloring agent, a pyrylium coloring agent, a quinoid coloring agent, a quinone coloring agent, a phthalocyanine coloring agent, a naphthalocyanine coloring agent, an azo coloring agent, an azomethine coloring agent, carbon black, and the like.

In a case of manufacturing the microcapsule, the photothermal conversion agent is dissolved as an oil-phase component together with the components constituting the microcapsule, a water-phase component is added to and mixed with the oil-phase component so as to emulsify the obtained mixture, and therefore the photothermal conversion agent can be incorporated into the core of the microcapsule.

The photothermal conversion agent may be used alone or two or more kinds thereof may be used in combination.

The content of the photothermal conversion agent is preferably 0.1% by mass to 25% by mass, more preferably 0.5% by mass to 20% by mass, and even more preferably 1% by mass to 15% by mass, with respect to the total solid content of the microcapsule.

An internal content rate (% by mass) of the photothermal conversion agent and a method for measuring an internal content rate are based on an internal content rate of the photopolymerization initiator and a method for measuring an internal content rate.

(Thermal Curing Accelerator)

In the case where the core of the microcapsule contains the thermally polymerizable compound as a polymerizable compound (preferably a thermally polymerizable monomer), the core may contain at least one thermal curing accelerator.

The thermal curing accelerator is a compound that catalytically promotes the thermal curing reaction of the thermally polymerizable compound (preferably a thermally polymerizable monomer).

As the thermal curing accelerator, a known compound can be used. As the thermal curing accelerator, an acid or a base, and a compound that generates an acid or a base by heating are preferable, and examples thereof include a carboxylic acid, a sulfonic acid, a phosphoric acid, an aliphatic alcohol, phenol, aliphatic amine, aromatic amine, imidazole (for example, 2-methylimidazole and phenylimidazole), pyrazole, and the like.

In a case of manufacturing the microcapsule, the thermal curing accelerator is mixed with the components constituting the microcapsule and dissolved as an oil-phase, a water-phase is added to and mixed with the oil-phase so as to emulsify the obtained mixture, and therefore the thermal curing accelerator can be incorporated into the core of the microcapsule.

The thermal curing accelerator may be used alone, or two or more kinds thereof may be used in combination.

The content of the thermal curing accelerator is preferably 0.1% by mass to 25% by mass, more preferably 0.5% by mass to 20% by mass, and even more preferably 1% by mass to 15% by mass, with respect to the total solid content of the microcapsule.

An internal content rate (% by mass) of the thermal curing accelerator and a method for measuring an internal content rate are based on an internal content rate of the photopolymerization initiator and a method for measuring an internal content rate.

<Water>

The aqueous dispersion of the present disclosure contains water as a dispersion medium.

The content of water in the aqueous dispersion of the present disclosure is not particularly limited. However, the content of water with respect to the total amount of the aqueous dispersion is preferably 10% by mass to 99% by mass, more preferably 20% by mass to 95% by mass, even more preferably 30% by mass to 90% by mass, and particularly preferably 50% by mass to 90% by mass.

<Coloring Material>

The aqueous dispersion of the present disclosure may contain at least one kind of coloring material.

In a case where the aqueous dispersion contains a coloring material, it is preferable that the aqueous dispersion contains the colorant in the exterior of the microcapsule.

The coloring material is not particularly limited and can be used by being arbitrarily selected from known coloring materials such as a pigment, a water-soluble dye, and a dispersed dye. It is more preferable that the aqueous dispersion contains a pigment among the above colorants, because the pigment has high weather fastness and excellent color reproducibility.

The pigment is not particularly limited and can be appropriately selected according to the purpose. Examples thereof include known organic pigments and inorganic pigments, resin particles stained with a dye, commercially available pigment dispersions, and surface-treated pigments (for example, those obtained by dispersing a pigment in water, a liquid compound, an insoluble resin, or the like as a dispersion medium and pigments of which the surface is treated with a resin, a pigment derivative, or the like).

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In regard to the coloring material capable of being contained in the aqueous dispersion, descriptions in paragraphs 0122 to 0129 of WO2015/074794A can be appropriately referred to.

<Other Components>

If necessary, the aqueous dispersion of the present disclosure may contain other components in addition to the components described above.

The other components may be contained in the interior of the microcapsule or may be contained in the exterior of the microcapsule.

(Organic Solvent)

The aqueous dispersion of the present disclosure may contain an organic solvent.

In a case where the aqueous dispersion of the present disclosure contains an organic solvent, the adhesiveness between the film and the substrate can be further improved.

In a case where the aqueous dispersion of the present disclosure contains the organic solvent, a content of the organic solvent is preferably 0.1% by mass to 10% by mass and more preferably 0.1% by mass to 5% by mass with respect to the total amount of the aqueous dispersion.

Specific examples of the organic solvent are as below.

Alcohols (for example, methanol, ethanol, propanol, isopropanol, butanol, isobutanol, sec-butanol, tert-butanol, pentanol, hexanol, cyclohexanol, benzyl alcohol, and the like)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methylpropanediol, and the like)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like)

Amines (for example, ethanolamine, diethanolamine, triethanolamine, N-methyldiethanolamine, N-ethyldiethanolamine, morpholine, N-ethylmorpholine, ethylenediamine, diethylenedi amine, triethylenetetramine, tetraethylenepentamine, polyethyleneimine, pentamethyldiethylenetriamine, tetramethylpropylenediamine, and the like)

Amides (for example, formamide, N,N-dimethylformamide, N,N-dimethylacetamide, and the like)

Heterocyclic rings (for example, 2-pyrrolidone, N-methyl-2-pyrrolidone, cyclohexyl pyrrolidone, 2-oxazolidone, 1,3-dimethyl-2-imidazolidinone, γ-butyrolactone, and the like)

Sulfoxides (for example, dimethyl sulfoxide, and the like)

Sulfones (for example, sulfolane, and the like)

Others (urea, acetonitrile, acetone, and the like)

(Surfactant)

The aqueous dispersion of the present disclosure may contain at least one surfactant.

In a case where the aqueous dispersion of the present disclosure contains the surfactant, wettability of the aqueous dispersion to a substrate is improved.

The surfactant referred herein means a surfactant other than the "dispersant having at least one bond selected from a urethane bond and a urea bond and a hydrophilic group" described above.

Examples of the surfactant include a higher fatty acid salt, alkyl sulfate, alkyl ester sulfate, alkyl sulfonate, alkylbenzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, amine oxide, and the like.

Among these, as a surfactant, at least one kind of surfactant selected from alkyl sulfate, alkyl sulfonate, and alkylbenzene sulfonate is preferable, and alkyl sulfate is particularly preferable.

From the viewpoint of the dispersibility of the microcapsule, the surfactant is preferably alkyl sulfate having an alkyl chain length of 8 to 18, more preferably at least one kind of surfactant selected from sodium dodecyl sulfate (SDS, alkyl chain length: 12) and sodium cetyl sulfate (SCS, alkyl chain length: 16), and even more preferably sodium cetyl sulfate (SCS).

In addition, examples of surfactants other than the above-described surfactant include those described in JP1987-173463A (JP-S62-173463A) and JP1987-183457A (JP-S62-183457A). Examples of other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

In addition, examples of the surfactant include an organic fluoro compound.

The organic fluoro compound is preferably hydrophobic. Examples of the organic fluoro compound include a fluorine-based surfactant, an oil-like fluorine-based compound (for example, fluorine oil), a solid-like fluorine compound resin (for example tetrafluoroethylene resin), and those described in JP1982-009053B (JP-S57-009053B) (the eighth column to the seventeenth column) and JP1987-135826A (JP-S62-135826A).

The aqueous dispersion of the present disclosure contains the "dispersant having at least one bond selected from a urethane bond and a urea bond and a hydrophilic group" described above, and thus is capable of substantially not to contain the anionic surfactant (that is, an anionic surfactant other than the "dispersant having at least one bond selected from a urethane bond and a urea bond and a hydrophilic group").

The phrase "substantially not to contain" means that the content of the anionic surfactant is less than 1% by mass (preferably less than 0.1% by mass) with respect to the total amount of the aqueous dispersion.

The aspect in which the aqueous dispersion substantially does not contain the anionic surfactant is advantageous in that foaming of the aqueous dispersion can be suppressed, that that the water resistance of the coated film can be improved, that the whitening due to bleeding out after the coated film is formed can be suppressed, and the like. In addition, a case where a pigment dispersion having an anionic dispersing group is combined with the microcapsule dispersion liquid, is particularly advantageous in that an increase in an ion concentration in a system due to the anionic surfactant, leading to a decrease in a degree of ionization of the anionic pigment dispersant and thus a decrease in the dispersibility of the pigment, can be suppressed.

(Polymerization Inhibitor)

The aqueous dispersion of the present disclosure may contain a polymerization inhibitor.

In a case where the aqueous dispersion of the present disclosure contains a polymerization inhibitor, the storage stability of the aqueous dispersion can be further improved.

Examples of the polymerization inhibitor include p-methoxyphenol, quinones (for example, hydroquinone, benzoquinone, methoxybenzoquinone, and the like), phenothiazine, catechols, alkyl phenols (for example, dibutylhydroxytoluene (BHT) and the like), alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidin-1-oxyl (TEMPO), 2,2,6,6-tetramethyl-4-hydroxypiperidin-1-oxyl (TEMPOL), cupferron Al, a tris(N-nitroso-N-phenylhydroxylamine)aluminum salt, and the like.

Among these, at least one kind of compound selected from p-methoxyphenol, catechols, quinones, alkyl phenols, TEMPO, TEMPOL, cupferron Al, and a tris(N-nitroso-N-phenylhydroxylamine)aluminum salt is preferable, and at least one kind of compound selected from p-methoxyphenol, hydroquinone, benzoquinone, BHT, TEMPO, TEMPOL, cupferron Al, and a tris(N-nitroso-N-phenylhydroxylamine) aluminum salt is more preferable.

(Ultraviolet Absorber)

The aqueous dispersion of the present disclosure may contain an ultraviolet absorber.

In a case where the aqueous dispersion of the present disclosure contains an ultraviolet absorber, the weather fastness of the film can be further improved.

Examples of the ultraviolet absorber include known ultraviolet absorbers such as a benzotriazole-based compound, a benzophenone-based compound, a triazine-based compound, a benzoxazole-based compound, and the like.

In addition, the aqueous dispersion of the present disclosure may contain, in the exterior of the microcapsule, a photopolymerization initiator, a polymerizable compound, a water-soluble resin, a water-dispersible resin, or the like as necessary, from the viewpoint of controlling film properties, adhesiveness, and jetting properties.

It is preferable that these components are water-soluble or water-dispersible.

The term "water-soluble" herein refers to a property in which in a case where the resin is dried for 2 hours at 105° C., the amount of the resin dissolving in 100 g of distilled water having a temperature of 25° C. exceeds 1 g.

Furthermore, the term "water-dispersible" refers to a property in which the resin is water-insoluble but is dispersed in water. Herein, "water-insoluble" refers to a property in which in a case where the resin is dried for 2 hours at 105° C., the amount of the resin dissolving in 100 g of distilled water with a temperature of 25° C. is equal to or smaller than 1 g.

In addition, the phrase "aqueous dispersion contains a photopolymerization initiator in the exterior of the microcapsule" means that the aqueous dispersion contains a photopolymerization initiator that is not contained in the interior of the microcapsule. The same applied to a case in which a polymerizable compound, a water-soluble resin, a water-dispersible resin, or the like is contained in the exterior of the microcapsule.

In regard to the photopolymerization initiator, polymerizable compound, and resin which are capable of being contained in the exterior of the microcapsule, descriptions in paragraphs 0139 to 0157 of WO2015/074794A can be appropriately referred to.

<Preferable Physical Properties of Aqueous Dispersion>

In a case where the temperature of the aqueous dispersion of the present disclosure is within a range of 25° C. to 50° C., the viscosity of the aqueous dispersion is preferably 3 mPa·s to 15 mPa·s, and more preferably 3 mPa·s to 13 mPa·s. Particularly, in a case where the temperature of the aqueous dispersion of the present disclosure is 25° C., the viscosity of the aqueous dispersion is preferably equal to or lower than 50 mPa·s. In a case where the viscosity of the aqueous dispersion is within the above range, and in a case of using the aqueous dispersion as an ink, higher jetting properties can be realized.

The viscosity of the aqueous dispersion is a value measured using a viscometer (VISCOMETER TV-22, manufactured by TOKI SANGYO CO., LTD).

[Method for Manufacturing Aqueous Dispersion]

The above-described method for manufacturing an aqueous dispersion of the present disclosure is not particularly limited, and as shown below, the method for manufacturing an aqueous dispersion of the present disclosure is suitable.

That is, the method for manufacturing the aqueous dispersion of the present disclosure (hereinafter, referred to as "the manufacture method of the present disclosure") includes mixing an oil-phase component containing an organic solvent, the above-described dispersant (that is, the dispersant having at least one bond selected from a urethane bond and a urea bond and a hydrophilic group), a tri- or higher functional isocyanate compound, and at least one of an isocyanate compound into which a polymerizable group is introduced or a polymerizable compound, with a water-phase component containing water, followed by emulsification, so as to form the above-described microcapsule (hereinafter referred to as "microcapsule-forming step").

The oil-phase component used in the microcapsule-forming step contains an organic solvent, the dispersant, a tri- or higher functional isocyanate compound, and at least one of an isocyanate compound into which a polymerizable group is introduced or a polymerizable compound.

As described above, the polymerizable compound is a compound having the polymerizable group (excluding an isocyanate compound into which the polymerizable group is introduced).

All of the polymerizable group in the isocyanate compound into which the polymerizable group is introduced, and the polymerizable group in the polymerizable compound may be the photopolymerizable groups (for example, radically polymerizable groups), or may be the thermally polymerizable groups.

The oil-phase component preferably contains at least one of the isocyanate compound into which the photopolymerizable group (for example, the radically polymerizable group) is introduced, or the photopolymerizable compound (for example, the radically polymerizable compound), or contains at least one of the isocyanate compound into which the thermally polymerizable group is introduced, or the thermally polymerizable compound.

In the case where the oil-phase component preferably contains at least one of the isocyanate compound into which the photopolymerizable group (for example, the radically polymerizable group) is introduced, or the photopolymerizable compound (for example, the radically polymerizable compound), the oil-phase component preferably further contains the photopolymerization initiator.

The water-phase component used in the microcapsule-forming step contains water.

In the microcapsule-forming step, the oil-phase component is mixed with the water-phase component, the obtained mixture is emulsified, and therefore the microcapsule in which the shell having the three-dimensional cross-linked structure is formed is formed so as to surround the core. Therefore, the microcapsule containing the shell and the core is formed. The formed microcapsule functions as a dispersoid in the manufactured aqueous dispersion.

Water in the water-phase component functions as a dispersion medium in the aqueous dispersion.

The dispersant in the oil-phase component interacts with the shell of the formed microcapsule, thereby contributing to the dispersion of the microcapsules (dispersoid) to water (dispersion medium).

In more detail regarding the formation of the shell, the shell having the three-dimensional cross-linked structure containing a urea bond is formed by a reaction between a tri- or higher functional isocyanate compound and water.

A case in which the tri- or higher functional isocyanate compound has a urethane bond means that a urethane bond is also contained in the three-dimensional cross-linked structure of the shell.

In addition, in a case where at least one of the oil-phase component or the water-phase component contains the above-described compound having two or more active hydrogen groups, the shell having the three-dimensional cross-linked structure containing a urethane bond is formed by a reaction between a tri- or higher functional isocyanate compound and the compound having two or more active hydrogen groups.

Furthermore, in a case where the oil-phase component contains the isocyanate compound into which the polymerizable group is introduced, the isocyanate compound into which the polymerizable group is introduced also relates to the reaction for forming the shell, and therefore the polymerizable group is introduced into the shell (that is, the shell having the polymerizable group is formed).

Furthermore, the case where the oil-phase component contains the polymerizable compound, means that the polymerizable compound is contained in the core.

Examples of the organic solvent contained in the oil-phase component include ethyl acetate, methyl ethyl ketone, and the like.

It is preferable that at least some of the organic solvent is removed during the formation process of the microcapsule or after the formation of the microcapsule.

Preferable aspects of each component of the dispersant, the tri- or higher functional isocyanate compound, and the like contained in the oil-phase component are as described in the above section of the "Aqueous Dispersion."

The components contained in the oil-phase component need to be simply mixed together. All of the components may be mixed together at the same time, or the components may be mixed together by being divided into several groups.

The oil-phase component may contain each component described in the section of the "Aqueous Dispersion."

For examples, the oil-phase component may contain the photopolymerization initiator. Therefore, the photopolymerization initiator can be contained in the core of the microcapsule.

In addition, the oil-phase component may contain the sensitizer. Therefore, the sensitizer can be contained in the core of the microcapsule.

Furthermore, the oil-phase component may contain the above-described compound having the hydrophilic group (preferably, the above-described isocyanate compound into which the hydrophilic group is introduced). Therefore, the hydrophilic group can be introduced into the shell of the microcapsule.

The water-phase component is not particularly limited as long as water is contained therein and may be only water.

The water-phase component may contain alkali metal hydroxides (for example, sodium hydroxides, potassium hydroxides, and the like), and organic amines (for example, triethylamine and the like) as a neutralizer for the dispersant.

In addition, the water-phase component may contain the surfactant. The term "surfactant" referred herein does not include the above-described dispersant.

Examples of the surfactant include a surfactant having a relatively long-chain hydrophobic group.

For example, as the surfactant, the surfactants described in "Surfactant Handbook" (Ichiro Nishi et al., published from Sangyo Tosho Publishing Co., Ltd. (1980)), specifically, an alkali metal salt such as alkyl sulfate, alkyl sulfonate, or alkyl benzene sulfonic acid is preferable, and an alkyl sulfate salt is more preferable. From the viewpoint of the dispersion stability, the alkyl chain length of the alkyl sulfuric acid ester salt is preferably equal to or greater than 12, and more preferably equal to or greater than 16.

The dispersant contained in the present disclosure, and therefore an aspect in which the water-phase component substantially does not contain the surfactant may be adopted.

The phrase "water-phase component substantially does not contain the surfactant" means that the content of the surfactant is less than 1% by mass (preferably less than 0.1% by mass) with respect to the total amount of the water-phase component.

The advantage of the aspect in which the water-phase component substantially does not contain the surfactant is the same as the advantage of the above-described aspect in which the aqueous dispersion substantially does not contain the anionic surfactant.

In addition, in the manufacture method of the present disclosure, a total amount obtained by subtracting an amount of the organic solvent and the water from an amount of the oil-phase component and the water-phase component, corresponds to a total solid content of the microcapsule and the total amount of the dispersant in the manufactured aqueous dispersion.

In regard to a preferable range of an amount used of each component of the tri- or higher functional isocyanate compound and the like, which are used in the manufacture method of the present embodiment, it is possible to refer to the section of "Aqueous Dispersion" described above. In a case of referring to this section, the term "content" and the term "total solid content of the microcapsule and the total amount of the dispersant" in the section of "Aqueous Dispersion" described above are replaceable with the term "amount used" and the term "total amount obtained by subtracting an amount of the organic solvent and the water from an amount of the oil-phase component and the water-phase component", respectively.

For example, the description that "the content of the internal photopolymerization initiator with respect to the total solid content of the microcapsule and the total amount of the dispersant is preferably 0.1% by mass to 25% by mass, more preferably 0.5% by mass to 20% by mass, and even more preferably 1% by mass to 15% by mass." in the section of "Aqueous Dispersion" described above, is replaceable with, in the manufacturing method of the present disclosure, the description that "an amount used of the internal photopolymerization initiator is preferably 0.1% by mass to 25% by mass, more preferably 0.5% by mass to 20% by mass, and even more preferably 1% by mass to 15% by mass with respect to the total amount obtained by subtracting an amount of the organic solvent and the water from an amount of the oil-phase component and the water-phase component."

The components contained in the oil-phase component need to be simply mixed together. All of the components may be mixed together at the same time, or the components may be mixed together by being divided into several groups.

In the microcapsule-forming step, a method for mixing the oil-phase component with the water-phase component is not particularly limited, and examples thereof include mixing by stirring.

In the microcapsule-forming step, a method for emulsifying is not particularly limited, and examples thereof include emulsification by an emulsification device (for example, a disperser) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

The emulsification during the microcapsule-forming step may be carried out while heating.

By carrying out the emulsification while heating, the reaction for forming the microcapsule by the emulsification can further effectively proceed.

In addition, by carrying out the emulsification while heating, at least some of the organic solvent in the oil-phase component can be easily removed from the mixture.

The heating temperature in the case of carrying out the emulsification while heating is preferably 35° C. to 70° C. and more preferably 40° C. to 60° C.

In addition, the microcapsule-forming step may have an emulsification stage of emulsifying a mixture (at a temperature of lower than 35° C., for example), and a heating stage of heating the emulsion obtained in the emulsification stage (at a temperature of 35° C. or higher, for example).

In the aspect of including the emulsification stage and the heating stage, particularly in the heating stage, the reaction for forming the microcapsule can further effectively proceed.

In addition, in the aspect of including the emulsification stage and the heating stage, particularly in the heating stage, at least some of the organic solvent in the oil-phase component can be easily removed from the mixture.

The heating temperature in the heating stage is preferably 35° C. to 70° C. and more preferably 40° C. to 60° C.

The heating time in the heating step is preferably 6 hours to 50 hours, more preferably 12 hours to 40 hours, and even more preferably 15 hours to 35 hours.

In addition, the manufacture method of the present disclosure may include steps other than the microcapsule-forming step as necessary.

Examples of those other steps include a step of adding other components (pigment and the like) to the aqueous dispersion in the microcapsule-forming step.

Those other components (pigment and the like) to be added are as described above as other components that can be contained in the aqueous dispersion.

[Image Forming Method]

The image forming method of the present disclosure includes applying the aqueous dispersion of the present disclosure described above onto a recording medium (hereinafter referred to as "application step"), and curing the aqueous dispersion applied onto the recording medium (hereinafter referred to as "curing step").

If necessary, the image forming method of the present disclosure may include other steps.

According to the image forming method of the present disclosure, an image having excellent hardness is formed on the recording medium. The image also exhibits excellent adhesiveness with respect to a recording medium.

In addition, in the image forming method of the present disclosure, the jetting properties of the aqueous dispersion from an ink jet head is excellent, and the storage stability of the aqueous dispersion is excellent.

(Application Step)

The application step is a step of applying the aqueous dispersion of the present disclosure onto a recording medium.

As the aspect in which the aqueous dispersion is applied onto the recording medium, an aspect is particularly preferable in which the aqueous dispersion (that is, an ink jet ink) is applied onto the recording medium by an ink jet method by using the aqueous dispersion as the ink jet ink.

As the recording medium, it is possible to use the substrate exemplified above as "substrate for forming a film by using the aqueous dispersion of the present disclosure."

The application of the aqueous dispersion by an ink jet method can be performed using a known ink jet recording device.

The ink jet recording device is not particularly limited, and a known ink jet recording device that can achieve intended resolution can be appropriately selected and used. That is, any of known ink jet recording devices including commercially available products can jet the aqueous dispersion onto a recording medium in the image forming method.

Examples of the ink jet recording device include a device including an ink supply system, a temperature sensor, and heating means.

The ink supply system includes, for example, a base tank containing the ink jet ink as the aqueous dispersion of the present disclosure, supply piping, an ink supply tank disposed immediately before an ink jet head, a filter, and a piezo-type ink jet head. The piezo-type ink jet head can be driven such that it can jet multi-sized dots preferably having a size of 1 pl to 100 pl and more preferably having a size of 8 pl to 30 pl, preferably at a resolution of 320 dots per inch (dpi)×320 dpi to 4,000 dpi×4,000 dots per inch (dpi), more preferably at a resolution of 400 dpi×400 dpi to 1,600 dpi×1,600 dpi, and even more preferably at a resolution of 720 dpi×720 dpi. dpi represents the number of dots per 2.54 cm (1 inch).

(Curing Step)

The curing step is a step of curing the aqueous dispersion applied onto the recording medium.

By the curing step, the cross-linking reaction between the microcapsules in the aqueous dispersion proceeds, the image is fixed, and hence the film hardness of the image and the like can be improved.

As the curing step, an irradiation step of irradiating with active energy rays (light) (hereinafter, "irradiation step A") is preferable in a case where the aqueous dispersion contains the photopolymerizable compound (and preferably the photopolymerization initiator), and an irradiation step of irradiating with heat or infrared rays (hereinafter, "irradiation step B") is preferable in a case where the aqueous dispersion contains the thermally polymerizable compound as a curing component.

(Irradiation Step A)

The irradiation step A is a step of irradiating the aqueous dispersion applied onto the recording medium with active energy rays.

In the irradiation step A, by irradiating the aqueous dispersion applied onto the recording medium with active energy rays, the cross-linking reaction between the microcapsules in the aqueous dispersion proceeds, the image is fixed, and hence the film hardness of the image and the like can be improved.

Examples of the active energy rays that can be used in the irradiation step A include ultraviolet rays (UV light), visible rays, electron beams, and the like. Among these, UV light is preferable.

The peak wavelength of the active energy rays (light) is preferably 200 nm to 405 nm, more preferably 220 nm to 390 nm, and even more preferably 220 nm to 385 nm.

Furthermore, the peak wavelength is preferably 200 nm to 310 nm or 200 nm to 280 nm.

At the time of the irradiation of the active energy rays (light), the illuminance of the exposure surface is 10 $mW/cm^2$ to 2,000 $mW/cm^2$ for example, and preferably 20 $mW/cm^2$ to 1,000 $mW/cm^2$.

As the light source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting device.

Among the semiconductor ultraviolet light-emitting devices, a light emitting diode (LED) and a laser diode (LD) are expected to be good light sources because they are compact, have long service life and high efficiency, and incur low costs.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where a sensitizer and a photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having wavelength of 355 nm, 365 nm, 385 nm, 395 nm, or 405 nm is most preferable.

In the irradiation step A, the time for which the aqueous dispersion applied onto the recording medium is irradiated with the active energy rays is 0.01 seconds to 120 seconds for example, and preferably 0.1 seconds to 90 seconds.

As the irradiation conditions and the basic irradiation method, the irradiation conditions and the irradiation method disclosed in JP1985-132767A (JP-S60-132767A) can also be applied.

Specifically, as the irradiation method of the active energy rays, a method, in which a light source is provided on both sides of a head unit including an ink jet device and the head unit as well as the light source are scanned by a so-called shuttle method, or a method, in which the irradiation of the active energy rays is performed by a separate light source that is not driven, is preferable.

It is preferable that the irradiation of the active energy rays is performed at a certain time interval (for example, 0.01 seconds to 120 seconds and preferably 0.01 seconds to 60 seconds) after the aqueous dispersion lands and is dried by heating.

(Irradiation Step B)

The irradiation step B of irradiating the aqueous dispersion applied onto the recording medium with heat or infrared rays may be provided. By radiating heat or infrared rays to the aqueous dispersion applied onto the recording medium so as to thermally cure the same, the cross-linking reaction of the thermally curable group in the microcapsules in the aqueous dispersion proceeds, the image is fixed, and hence the film hardness of the image and the like can be improved.

As heating means for carrying out the heating is not particularly limited, and examples thereof include a heat drum, hot air, an infrared lamp, an infrared LED, an infrared heater, a heat oven, a heat plate, an infrared laser, an infrared dryer, and the like. Among these, from the viewpoint of being able to thermally curing the aqueous dispersion efficiently, a light emitting diode (LED) having an emission wavelength in near infrared rays to far infrared rays, which has a maximum absorption wavelength in a wavelength range of 0.8 μm to 1.5 μm or 2.0 μm to 3.5 μm, a heater radiating near infrared rays to far infrared rays, a laser having an oscillation wavelength in near infrared rays to far infrared rays, or a dryer radiating near infrared rays to far infrared rays is preferable.

The heating temperature in a case of heating is preferably 40° C. or higher, more preferably 40° C. to 200° C., and even more preferably 100° C. to 180° C. The heating temperature refers to a temperature of the aqueous dispersion on the recording medium and can be measured by a thermograph using an infrared thermographic apparatus H2640 (manufactured by Nippon Avionics Co., Ltd.).

The heating time can be appropriately set in consideration of the heating temperature, the compositions of the aqueous dispersion, a printing rate, and the like.

In addition, the irradiation step B for taking charge of thermally curing the aqueous dispersion applied onto the recording medium may have a heating and drying step in combination, which will be described below.

(Heating and Drying Step)

If necessary, the image forming method may additionally include a heating and drying step between the application step and the curing step.

In the heating and drying step, it is preferable that water and an organic solvent that is used in combination if necessary, are evaporated from the aqueous dispersion jetted onto the recording medium by using heating means, such that the image is fixed.

The heating means only needs to be able to dry water and the organic solvent which is used in combination if necessary. The heating means is not particularly limited, and examples thereof include a heat drum, hot air, an infrared lamp, a heating oven, heating by a heat plate, and the like.

The heating temperature is preferably equal to or higher than 40° C., more preferably about 40° C. to 150° C., and even more preferably about 40° C. to 80° C.

The heating time can be appropriately set in consideration of the composition of the aqueous dispersion and the printing rate.

If necessary, the aqueous dispersion fixed by heating is further optically fixed by being irradiated with the active energy rays in the irradiation step. As described above, in the irradiation step, it is preferable that the aqueous dispersion is fixed by UV light.

EXAMPLES

Hereinafter, the present disclosure will be more specifically described based on examples, but the present disclosure is not limited to the examples as long as the gist of the present invention is maintained.

Hereinafter, unless otherwise specified, "part" represents parts by mass.

In addition, hereinafter, "unit (A)," "unit (B)," and "unit (C)" respectively refer to Structural Unit A, Structural Unit B, and Structural Unit C.

[Synthesis of Dispersant]

The synthesis of the following Dispersants P-1 to P-26 which contain at least one bond selected from a urethane bond or a urea bond and anionic group was carried out.

(A), (B), and (C) in the following Dispersants P-1 to P-26 respectively indicate the unit (A), the unit (B), and the unit (C).

In addition, in the following Dispersants P-1 to P-26, *1 in (A) is a binding position with (B) or (C), *2 in (B) is a binding position with (A), and *3 in (C) is a binding position with (A).

In the following Dispersants P-1 to P-26, "C log P ($R^{C1}$)" represents C log P of the compound $HR^{C1}H$ in which a hydrogen atom is bonded to each of two binding positions of $R^{C1}$ of the unit (C).

Mw in the following Dispersants P-1 to P-26 represents a weight-average molecular weight.

In the following Dispersants P-1 to P-26, a content (% by mass) of each unit indicates a content of each of the units (A) to (C) with respect to the total amount of the dispersant.

In the following Dispersants P-1 to P-26, an anionic group value (mmol/g) is the millimolar number of the anionic group contained in 1 g of the dispersant, and in detail, is a value obtained by neutralization titration as follows.

—Measurement of Neutralization Titration of Anionic Group Value of Dispersant—

Approximately 0.5 g of the dispersant was weighed in a container and weighed value W (g) was recorded. Subsequently, a mix solution of 54 mL of tetrahydrofuran (THF) and 6 mL of distilled water was added thereto, and the weighed dispersant was diluted so as to obtain a sample for measurement of anionic group value.

Titration was performed on the obtained sample for measurement of anionic group value by using 0.1 N (=0.1 mol/L) aqueous solution of sodium hydroxide as a titrant, and a titrant volume required up to the equivalent point was recorded as F (mL). In a case where a plurality of equivalent points were obtained in the titration, a maximum value among a plurality of titrant volumes required up to a plurality of equivalent points was taken as F (mL). The product of F (mL) and the normality of the aqueous solution of sodium hydroxide (0.1 mol/L) corresponds to the millimolar number of the anionic group (for example, —COOH) contained in the dispersant.

Based on the measurement value of F1 (mL), the anionic group value (mmol/g) of the dispersant was determined according to the following equation.

$$\text{Anionic group value of dispersant (mmol/g)} = F\ \text{(mL)} \times \text{normality of aqueous solution of sodium hydroxide (0.1 mol/L)}/W\ \text{(g)}$$

| Dispersant | | | | | | | | | | | | |
|---|---|---|---|---|---|---|---|---|---|---|---|---|
| | Structure of each unit | | | Molecular weight of each unit | | | Content of each unit (% by mass) | | | | ClogP | Anionic group value (mmol/ |
| Type | (A) | (B) | (C) | (A) | (B) | (C) | (A) | (B) | (C) | Mw | (RC1) | g) |
| P-1 | 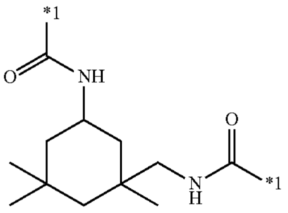 | 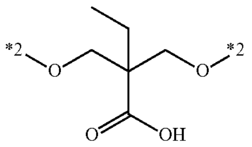 | 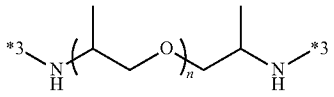 | 222 | 148 | 2000 | 26.8 | 12.5 | 60.7 | 25000 | 7.26 | 0.85 |
| P-2 | | | 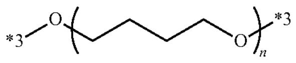 | 222 | 148 | 2000 | 26.8 | 12.5 | 60.7 | 24000 | 7.56 | 0.85 |
| P-3 | | | 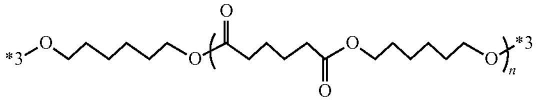 | 222 | 148 | 2000 | 26.8 | 12.5 | 60.7 | 23000 | 21.07 | 0.85 |
| P-4 | | | 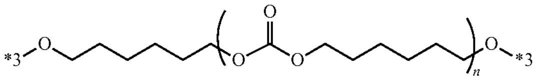 | 222 | 148 | 2000 | 26.8 | 12.5 | 60.7 | 24000 | 23.68 | 0.85 |
| P-5 | | | 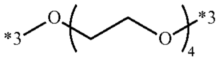 | 222 | 148 | 194 | 56.4 | 11.4 | 32.1 | 20000 | 0.60 | 0.77 |

-continued
| Dispersant | | | | | | | | | | | | |
|---|---|---|---|---|---|---|---|---|---|---|---|---|
| | Structure of each unit | | | Molecular weight of each unit | | | Content of each unit (% by mass) | | | | ClogP | Anionic group value (mmol/ |
| Type | (A) | (B) | (C) | (A) | (B) | (C) | (A) | (B) | (C) | Mw | (RC1) | g) |
| P-6 | | | 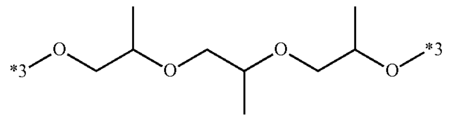 | 222 | 148 | 192 | 56.6 | 11.5 | 31.9 | 20000 | 1.88 | 0.77 |
| P-7 | | | 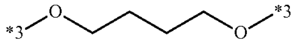 | 222 | 148 | 90 | 68.2 | 13.8 | 18.0 | 22000 | 2.81 | 0.93 |
| P-8 | 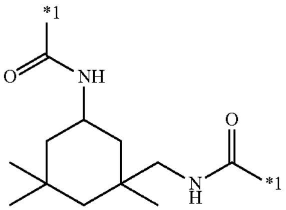 | 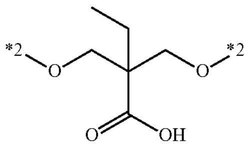 | 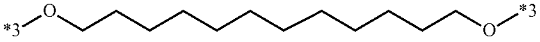 | 222 | 148 | 202 | 55.7 | 11.3 | 33.0 | 21000 | 7.04 | 0.76 |
| P-9 | | | 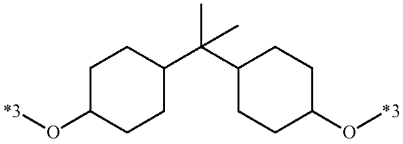 | 222 | 148 | 240 | 52.4 | 10.6 | 36.9 | 23000 | 7.32 | 0.72 |
| P-10 | | | 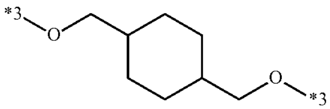 | 222 | 148 | 144 | 61.5 | 12.4 | 26.0 | 20000 | 4.39 | 0.84 |

-continued
| Type | Structure of each unit (A) | (B) | (C) | Molecular weight of each unit (A) | (B) | (C) | Content of each unit (% by mass) (A) | (B) | (C) | Mw | ClogP (RC1) | Anionic group value (mmol/g) |
|---|---|---|---|---|---|---|---|---|---|---|---|---|
| P-11 | | | 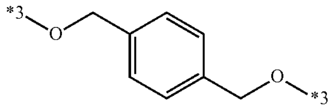 | 222 | 148 | 138 | 62.2 | 12.6 | 25.2 | 19000 | 3.14 | 0.85 |
| P-12 | | | 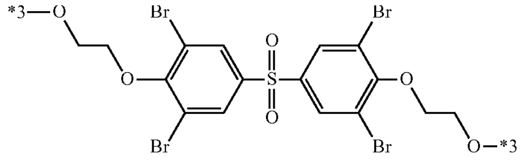 | 222 | 148 | 654 | 34.9 | 9.7 | 55.4 | 24000 | 6.50 | 0.65 |
| P-13 | | | 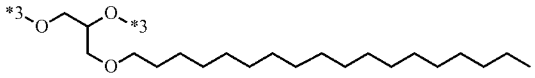 | 222 | 148 | 345 | 45.2 | 9.1 | 45.7 | 22000 | 9.86 | 0.62 |
| P-14 | | | 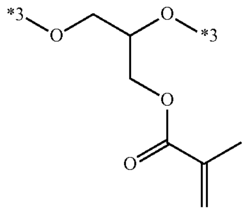 | 222 | 148 | 160 | 59.8 | 12.1 | 28.1 | 21000 | 2.16 | 0.82 |
| P-15 | 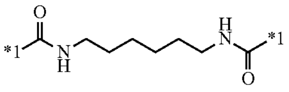 | 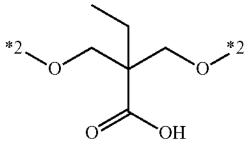 | 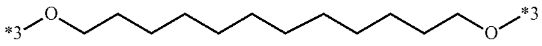 | 168 | 148 | 202 | 48.8 | 13.0 | 38.2 | 24000 | 7.04 | 0.88 |

-continued
| Dispersant | | | | | | | | | | | | | |
|---|---|---|---|---|---|---|---|---|---|---|---|---|---|
| | Structure of each unit | | | Molecular weight of each unit | | | Content of each unit (% by mass) | | | | ClogP | Anionic group value (mmol/ |
| Type | (A) | (B) | (C) | (A) | (B) | (C) | (A) | (B) | (C) | Mw | (RC1) | g) |
| P-16 | 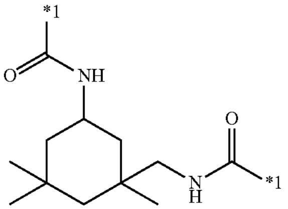 | 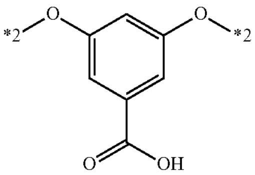 | 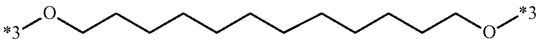 | 222 | 154 | 202 | 55.4 | 11.7 | 32.9 | 19000 | 7.04 | 0.79 |
| P-17 | 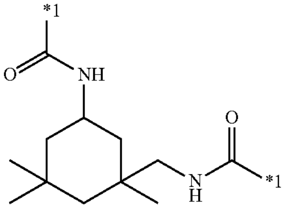 | 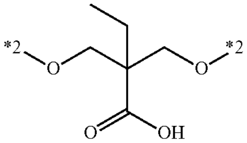 | 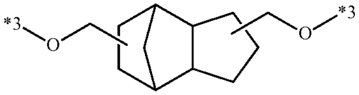 | 222 | 148 | 196 | 56.3 | 11.4 | 32.4 | 8000 | 5.54 | 0.77 |
| P-18 | | | | 222 | 148 | 196 | 56.3 | 11.4 | 32.4 | 22000 | 5.54 | 0.77 |
| P-19 | | | | 222 | 148 | 196 | 56.3 | 11.4 | 32.4 | 35000 | 5.54 | 0.77 |
| P-20 | | | | 222 | 148 | 196 | 56.3 | 11.4 | 32.4 | 60000 | 5.54 | 0.77 |
| P-21 | | | | 222 | 148 | 196 | 56.3 | 11.4 | 32.4 | 110000 | 5.54 | 0.77 |
| P-22 | | | | 222 | 148 | 196 | 55.0 | 4.1 | 41.0 | 20000 | 5.54 | 0.27 |
| P-23 | | | | 222 | 148 | 196 | 55.8 | 8.6 | 35.6 | 19000 | 5.54 | 0.58 |
| P-24 | | | | 222 | 148 | 196 | 57.2 | 17.0 | 25.8 | 21000 | 5.54 | 1.15 |
| P-25 | | | | 222 | 148 | 196 | 58.8 | 25.7 | 15.6 | 22000 | 5.54 | 1.73 |
| P-26 | | | | 222 | 148 | 196 | 59.7 | 30.8 | 9.5 | 21000 | 5.54 | 2.08 |

<Synthesis of Dispersant P-1>

In a three-neck flask, isophorone diisocyanate (hereinafter referred to as "IPDI") (26.8 g) as a compound for forming the unit (A), 2,2-bis(hydroxymethyl)butyric acid (hereinafter referred to as "DMBA") (12.5 g) as a compound for forming the unit (B), and ethyl acetate (39.3 g) were added, and the resultant mixture was heated to 70° C. 0.0786 g of NEOSTANN U-600 (inorganic bismuth catalyst manufactured by NITTO KASEI CO., LTD.; hereinafter referred to as "U-600") was added thereto and stirred at 70° C. for 4 hours. A mixed liquid of JEFFAMINE (registered trademark) D-2000 (manufactured by Huntsman Petrochemical Corporation; polyoxypropylene diamine having a number average molecular weight of 2000) (60.7 g) as a compound for forming the unit (C) and ethyl acetate (60.7 g) was added dropwise thereto over 1 hour. After the completion of the dropwise addition, 0.121 g of U-600 was further added, and the resultant mixture was stirred at 70° C. for 2 hours. Next, methanol (1.5 g) was added thereto, and the resultant mixture was further stirred at 70° C. for 5 hours. The liquid after the completion of stirring for 5 hours was allowed to cool to room temperature, and then the concentration thereof was adjusted with ethyl acetate, and therefore a 30% by mass ethyl acetate solution of Dispersant P-1 was obtained.

<Synthesis of Dispersant P-2>

To a three-neck flask, IPDI (26.8 g) as the compound for forming the unit (A), DMBA (12.5 g) as the compound for forming the unit (B), polytetramethylene glycol having a number average molecular weight of 2000 (60.7 g) as the compound for forming the unit (C), and ethyl acetate (100 g) were added, and the resultant mixture was heated to 70° C. 0.2 g of U-600 was added thereto, and the resultant mixture was stirred at 70° C. for 15 hours. Next, methanol (1.5 g) was added thereto, and the resultant mixture was further stirred at 70° C. for 5 hours. The liquid after the completion of stirring for 5 hours was allowed to cool to room temperature, and then the concentration thereof was adjusted with ethyl acetate, and therefore a 30% by mass ethyl acetate solution of Dispersant P-2 was obtained.

<Synthesis of Dispersants P-3 to P-26>

Dispersants P-3 to P-26 were respectively synthesized in the same manner as the synthesize of Dispersant P-2 except that at least one of the compound for forming unit (A), the compound for forming unit (B), or the compound for forming unit (C) was changed, and an addition amount of each compound was adjusted as necessary.

The addition amount of each compound was adjusted so that the content of each unit in Dispersants P-3 to P-26 became the value described above.

In the synthesis of Dispersant P-3, the compound for forming unit (C) was changed to polyester diol "TL Series (registered trademark) 2461" of Hitachi Chemical Co., Ltd.

In the synthesis of Dispersant P-4, the compound for forming unit (C) was changed to polycarbonate diol "DURANOL (registered trademark) T6002" of Asahi Kasei Chemicals Corporation.

In the synthesis of Dispersant P-5, the compound for forming unit (C) was changed to tetraethylene glycol.

In the synthesis of Dispersant P-6, the compound for forming unit (C) was changed to tripropylene glycol.

In the synthesis of Dispersant P-7, the compound for forming unit (C) was changed to butanediol.

In the synthesis of Dispersant P-8, the compound for forming unit (C) was changed to dodecanediol.

In the synthesis of Dispersant P-9, the compound for forming unit (C) was changed to perhydrobisphenol A.

In the synthesis of Dispersant P-10, the compound for forming unit (C) was changed to 1,4-cyclohexanedimethanol.

In the synthesis of Dispersant P-11, the compound for forming unit (C) was changed to benzenedimethanol.

In the synthesis of Dispersant P-12, the compound for forming unit (C) was changed to bis[3,5-dibromo-4-(2-hydroxyethoxy)phenyl] sulfone.

In the synthesis of Dispersant P-13, the compound for forming unit (C) was changed to batyl alcohol.

In the synthesis of Dispersant P-14, the compound for forming unit (C) was changed to glycerin monomethacrylate (GLM).

In the synthesis of Dispersant P-15, the compound for forming unit (A) was changed to hexamethylene diisocyanate (HDI), and the compound for forming unit (C) was changed to dodecanediol.

In the synthesis of Dispersant P-16, the compound for forming unit (B) was changed to 3,5-dihydroxybenzoic acid, and the compound for forming unit (C) was changed to dodecanediol.

In the synthesis of Dispersants P-17 to P-26, the compound for forming unit (C) was changed to tricyclodecanedimethanol.

Example 1

<Production of Aqueous Dispersion Having Microcapsule>

(Preparation of Oil-Phase Component)

48.5 g of an oil-phase component having a concentration of solid contents of 33% by mass was prepared by using a total solid content shown in the following "Composition of Total Solid Content of Oil-Phase Component" and ethyl acetate as an organic solvent.

The composition of the total solid content (a total of 100% by mass) of the oil-phase component is as follows.

In this oil-phase component, a mass ratio of the dispersant (hereinafter, will also be referred to as "mass ratio [dispersant/MC solid content]") was 0.667 (calculation formula: 40% by mass/60% by mass=0.667) with respect to the total solid content of the microcapsules (hereinafter, will also be referred to as "MC solid content").

—Composition of Total Solid Content of Oil-Phase Component (Total of 100% by Mass)—

| | |
|---|---|
| Dispersant P-1 (dispersant) | 40% by mass |
| Solid content of TAKENATE (registered trademark) D-120N manufactured by Mitsui Chemicals, Inc. (trifunctional isocyanate compound containing a cyclic structure; "120N" in Table 3) [raw material of shell] | 13% by mass |
| SR833S (tricyclodecanedimethanol diacrylate; difunctional radically polymerizable compound containing a cyclic structure; "SR833" in Table 3) manufactured by Sartomer Arkema Inc. [core] | 22% by mass |
| SR399E (dipentaerythritol pentaacrylate; pentafunctional radically polymerizable compound not containing a cyclic structure; "SR399" in Table 3) manufactured by Sartomer Arkema Inc. (core) | 22% by mass |
| IRGACURE (registered trademark) 819 (bis(2,4,6-trimethylbenzoyl)-phenylphosphine oxide; photopolymerization initiator) manufactured by BASF SE [core] | 3% by mass |

In Table 3, the symbol "*" written next to each of "120N," "110N," "SR833," and "CD406" means that each of these materials is a material containing a cyclic structure. In Table 4 and Table 5, the meaning of "*" written next to the material name is also the same as above.

As shown below, the solid content of TAKENATE D-120N ("120N" in Table 3) is a reaction product (that is, trifunctional isocyanate compound) which was obtained by reacting trimethylolpropane (TMP) and 1,3-bis(isocyanatomethyl)cyclohexane (HXDI) at 1:3 (molar ratio).

The TAKENATE D-120N is a 75% by mass ethyl acetate solution of the above reaction mixture.

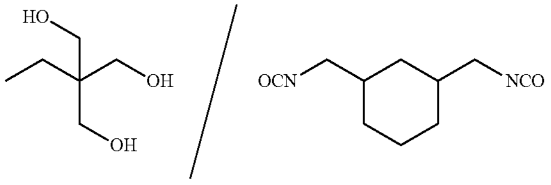

120N (Preparation of Water-Phase Component)

As the water-phase component, sodium hydroxide was added to 43 g of distilled water by an amount such that a degree of neutralization of the dispersant became 90%, and the resultant mixture was stirred for 15 minutes.

The specific amount of sodium hydroxide was determined by the following calculation formula.

Amount (g) of sodium hydroxide=total amount of oil-phase component (g)×(concentration of solid contents of oil-phase component (% by mass)/100)×(content of dispersant with respect to total solid content of oil-phase component (% by mass)/100)×anionic group value of dispersant (mmol/g)×0.9×molecular weight of sodium hydroxide (g/mol)/1000

(Microcapsule-Forming Step)

The oil-phase component was mixed with the water-phase component, the obtained mixture was emulsified at room temperature (25° C., the same applies hereinafter) for 10 minutes at 12,000 rpm by using a homogenizer, and therefore an emulsion was obtained.

The obtained emulsion was added to 15.3 g of distilled water, the liquid thus obtained was heated to 50° C. and stirred for 5 hours at 50° C. so as to distill off ethyl acetate from the liquid. The liquid in which the ethyl acetate was distilled off was further stirred at 50° C. for 24 hours, and therefore a microcapsule was formed in the liquid.

Subsequently, the liquid containing microcapsules was diluted with distilled water so that the solid content (that is, a total amount of the solid content of microcapsule and the content of dispersant) became 20% by mass, and therefore an aqueous dispersion having the microcapsule was obtained.

<Manufacture of Ink Jet Ink>

Each of the components shown in the following composition was mixed so as to prepare an ink jet ink.

The manufactured ink jet ink is also one aspect of the aqueous dispersion having the microcapsule. In the present example, the ink jet ink manufactured herein is referred to as "ink" so as to be distinguished from the aqueous dispersion having the microcapsule which was manufactured above (that is, one of the raw materials of the ink manufactured herein).

—Composition of Ink—

| | |
|---|---|
| Aqueous dispersion having the microcapsule | 82 parts |
| Pigment dispersion liquid (Pro-jet Cyan APD1000 | 13 parts |

-continued

| | |
|---|---|
| (FUJIFILM Imaging Colorants, Inc), pigment concentration: 14% by mass) | |
| Fluorine-based surfactant (manufactured by DuPont, Capstone FS-31, solid content: 25% by mass) | 0.3 parts |
| 2-Methylpropanediol | 4.7 parts |

<Evaluation>

The following evaluation was carried out using the ink obtained above.

The results are shown in Table 3.

(Pencil Hardness of Cured Film)

By applying the above-described ink which was stored at room temperature within a day after having been prepared onto a substrate, a coated film having a thickness of 12 μm was formed on the substrate. A polystyrene (PS) sheet ("falcon hi impact polystyrene" manufactured by Robert Home Company) (hereinafter referred to as "PS substrate") was used as the substrate.

In addition, a No. 2 bar of K HAND COATER manufactured by RK PrintCoat Instruments Ltd was for the application.

Subsequently, the obtained coated film was dried at 60° C. for 3 minutes.

Subsequently, the coated film after the drying was irradiated with ultraviolet rays (UV) so as to cure the coated film, and therefore a cured film was obtained.

For the irradiation with ultraviolet rays (UV), as an exposure light source, an experimental UV mini conveyor device CSOT (manufactured by Yuasa Power Supply Ltd.) was used which was equipped with an ozoneless metal halide lamp MAN 250 L and in which a conveyor speed was set to be 35 m/min and an exposure intensity was set to be 2.0 W/$cm^2$.

With respect to the cured film, the pencil hardness was measured based on JIS K5600-5-4 (1999).

As a pencil used for the measurement of the pencil hardness, UNI (registered trademark) manufactured by MITSUBISHI PENCIL CO., LTD was used.

The acceptable range of the pencil hardness is equal to or higher than HB, and it is preferable that the pencil hardness is equal to or higher than H. The cured film having a pencil hardness of equal to or lower than B is not preferable, because in a case of being handled, there is a possibility that scratches are generated.

(Jetting Properties of Ink)

The above-described ink which was stored at room temperature within a day after having been prepared was jetted from a head of an ink jet printer (SP-300V, manufactured by Roland DG Corporation) for 30 minutes, and then the jetting was stopped.

10 minutes after the jetting was stopped, the ink was jetted again from the aforementioned head onto the aforementioned substrate, thereby forming a 5 cm×5 cm solid image.

By visually observing the image, whether or not dead pixels occurred due to defective nozzles and the like was checked, and the jetting properties of the ink were evaluated according to the evaluation standards described below.

In the following evaluation standards, "A" shows that the jetting properties of the ink are most excellent.

—Evaluation Standard of Jetting Properties—

A: The dead pixels occurring due to defective nozzles and the like were not observed, and an excellent image was obtained.

B: Although a small number of dead pixels occurring due to defective nozzles and the like were observed, the dead pixels were unproblematic for practical use.

C: Dead pixels occurred due to defective nozzles and the like, and the image was inappropriate for practical use.

D: The ink could not be jetted from the head.

(Storage Stability of Ink)

1 g of sample was collected from the above-described ink which was stored at room temperature within a day after having been prepared, and the viscosity of the collected sample (hereinafter referred to as "viscosity before time elapsed") was measured.

Next, the sample of which the viscosity before time elapsed had been measured was sealed in a container, and 3 weeks elapsed at 60° C.

The viscosity of the sample after three weeks elapsed (hereinafter referred to as "viscosity after three weeks elapsed") was measured.

Based on the viscosity before time elapsed and the viscosity after three weeks elapsed, the rate of increase (%) in viscosity was obtained by the following formula.

Rate of increase (%) in viscosity=((viscosity after three weeks elapsed−viscosity before time elapsed)/viscosity before time elapsed)×100

Based on the obtained rate of increase (%) in viscosity, the storage stability of the ink was evaluated according to the following evaluation standards. In the following evaluation standards, "A" shows that the storage stability of the ink is most excellent.

—Evaluation Standards of Storage Stability of Ink—

A: The rate of increase in viscosity was 0% or more and less than 15%.

B: The rate of increase in viscosity was 15% or more and less than 20%.

C: The rate of increase in viscosity was 20% or more and less than 25%.

D: The rate of increase in viscosity was 25% or more.

(Adhesiveness of Cured Film (PS Substrate))

A cured film was formed in the same manner as the cured film in the evaluation of the pencil hardness.

The obtained cured film was subjected to a crosshatch test based on ISO 2409 (2013) (cross-cut method) and evaluated according to the evaluation standards described below.

During the crosshatch test, cuts were made at an interval of 1 mm, and in this way, 25 square lattices having a size of 1 mm×1 mm were formed.

In the evaluation standards below, the proportion (%) of peeled lattices is a value obtained by the following equation. The total number of lattices in the following equation is 25.

Proportion (%) of peeled lattices=[(number of peeled lattices)/(total number of lattices)]×100

—Evaluation Standards of Adhesiveness of Cured Film—

0: The proportion (%) of peeled lattices was 0%.

1: The proportion (%) of peeled lattices was higher than 0% and equal to or lower than 5%.

2: The proportion (%) of peeled lattices was higher than 5% and equal to or lower than 15%.

3: The proportion (%) of peeled lattices was higher than 15% and equal to or lower than 35%.

4: The proportion (%) of peeled lattices was higher than 35% and equal to or lower than 65%.

5: The proportion (%) of peeled lattices was higher than 65%.

(Adhesiveness of Cured Film (Substrate: Corona PP))

The same evaluation in the same manner as the adhesiveness of the cured film (PS) was carried out except that the substrate was changed to the corona PP substrate described below.

The corona PP substrate means a corona-treated PP (polypropylene) substrate.

Specifically, as the corona PP substrate, a polypropylene film "OP U-1 #50" manufactured by Mitsui Chemicals Tohcello. Inc. was used.

The PS substrate and corona PP substrate used for evaluating the adhesiveness of the cured film are different from polyethylene terephthalate (PET) substrate and polyvinyl chloride (PVC) substrate which have a polar group on surfaces thereof, in that both PS substrate and corona PP substrate are hydrophobic substrates having no polar group on surfaces thereof. For this reason, in the image formation using an aqueous ink, the PS substrate and the corona PP substrate are substrates in which the adhesiveness between an image (cured film) and the substrate is unlikely to be obtained as compared with the PET substrate and the PVC substrate.

Accordingly, the evaluation of the adhesiveness of the cured film using the PS substrate and the corona PP substrate is an evaluation of the adhesiveness under strict conditions. Therefore, an excellent evaluation result of the adhesiveness of the cured film means that the adhesiveness of the cured film to the substrate is extremely excellent.

Examples 2 to 26

The same operation as in Example 1 was performed, except that the type of the dispersant was changed as shown in Table 3.

The results are shown in Table 3.

Examples 27 to 35

The same operation as in Example 18 was performed except that the mass ratio (dispersant/MC components) was changed as shown in Table 3 by changing the mass ratio of the dispersant to the MC solid contents, while maintaining a total mass of the dispersant and the MC solid contents (that is, raw material of the shell and core), constant.

The results are shown in Table 3.

Examples 36 and 37

The same operation as in Example 18 was performed except that the raw material of the shell was changed as shown in Table 4.

In Table 4, "110N" means a solid content of TAKENATE (registered trademark) D-110N manufactured by Mitsui Chemicals, Inc., and "160N" means a solid content of TAKENATE (registered trademark) D-160N manufactured by Mitsui Chemicals, Inc. In Table 4, the symbol "*" written next to "110N" means that this material is a material containing a cyclic structure.

As shown below, the solid content of TAKENATE D-110N ("110N" in Table 4) is a reaction product (that is, trifunctional isocyanate compound) which was obtained by reacting trimethylolpropane (TMP) and m-xylylene diisocyanate (XDI) at 1:3 (molar ratio). TAKENATE D-110N is a 75% by mass ethyl acetate solution of the above reaction product.

As shown below, the solid content of TAKENATE D-160N ("160N" in Table 4) is a reaction product (that is, trifunctional isocyanate compound) which was obtained by reacting trimethylolpropane (TMP) and hexamethylene diisocyanate (HDI) at 1:3 (molar ratio). TAKENATE D-160N is a 75% by mass ethyl acetate solution of the above reaction product.

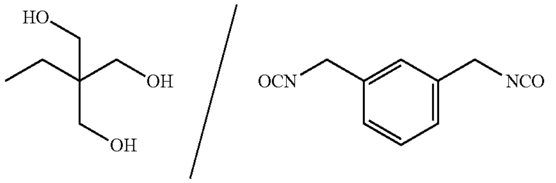

110N

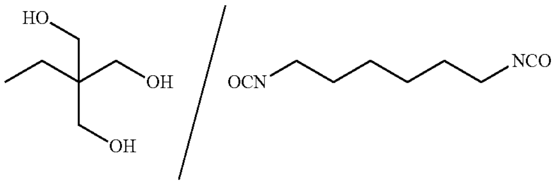

160N

Example 38

The same operation as in Example 18 was performed except that a part of the radically polymerizable compounds (SR833S and SR399E) was replaced with a sensitizer (ITX: 2-isopropylthioxanthone) while maintaining a mass ratio of SR833S and SR399E, which are the radically polymerizable compounds, constant.

The results are shown in Table 4.

In Example 38, the content of the sensitizer with respect to the total solid content of the oil-phase component was adjusted to be 0.6% by mass.

Examples 39 to 43

The same operation as in Example 18 was performed except that the type of each radically polymerizable compound was changed as shown in Table 4 while maintaining the total amount of the radically polymerizable compound constant.

The results are shown in Table 4.

Details of the radically polymerizable compounds in Tables 3 and 4 are as follows.

SR833 is SR833S manufactured by Sartomer Arkema Inc. The compound name is tricyclodecanedimethanol diacrylate. This compound is a difunctional radically polymerizable compound (radically polymerizable monomer) containing a cyclic structure.

SR399 is SR399E manufactured by Sartomer Arkema Inc. The compound name is dipentaerythritol pentaacrylate. This compound is a pentafunctional radically polymerizable compound (radically polymerizable monomer) not containing a cyclic structure.

SR306 is SR306H manufactured by Sartomer Arkema Inc. The compound name is tripropylene glycol diacrylate. This compound is a difunctional radically polymerizable compound (radically polymerizable monomer) not containing a cyclic structure.

CD406 is CD406 manufacture by Sartomer Arkema Inc. The compound name is cyclohexanedimethanol diacrylate. This compound is a difunctional radically polymerizable compound (radically polymerizable monomer) containing a cyclic structure.

A-TMPT is A-TMPT manufacture by Shin-Nakamura Chemical Co., Ltd. The compound name is trimethylolpropane triacrylate. This compound is a trifunctional radically polymerizable compound (radically polymerizable monomer) not containing a cyclic structure.

Comparative Examples 1 to 3

The same operation as in Example 1 was performed, except that Dispersant P-1 was changed to the dispersant of the same mass, which is shown in Table 4.

The results are shown in Table 4.

Dispersant "F1" in Comparative Example 1 is a comparative dispersant, and specifically, is sodium polyacrylate (YS100 manufactured by NIPPON SHOKUBAI CO., LTD.).

Dispersant "F2" in Comparative Example 2 is a comparative dispersant, and specifically, is phthalated gelatin (#801 manufactured by Nitta Gelatin Inc.).

Dispersant "F3" in Comparative Example 3 is a comparative dispersant, and specifically, is PVA (polyvinyl alcohol) (PVA-102, manufactured by KURARAY CO., LTD.).

TABLE 3

| | MC solid content | | | | | | Dispersant | | | | |
|---|---|---|---|---|---|---|---|---|---|---|---|
| | Shell raw material | | Core | | | | | | Content (% by mass) | | |
| | Tri- or higher functional NCO compound | Shell Bond (U) | Radically polymerizable compound Di- or lower functional | Radically polymerizable compound Tri- or higher functional | Initiator | Sensitizer | Type | Bond (U) | Unit (A) | Unit (B) | Unit (C) |
| Example 1 | 120N * | Y | SR833 * | SR399 | Y | — | P-1 | Y | 26.8 | 12.5 | 60.7 |
| Example 2 | 120N * | Y | SR833 * | SR399 | Y | — | P-2 | Y | 26.8 | 12.5 | 60.7 |
| Example 3 | 120N * | Y | SR833 * | SR399 | Y | — | P-3 | Y | 26.8 | 12.5 | 60.7 |
| Example 4 | 120N * | Y | SR833 * | SR399 | Y | — | P-4 | Y | 26.8 | 12.5 | 60.7 |
| Example 5 | 120N * | Y | SR833 * | SR399 | Y | — | P-5 | Y | 56.4 | 11.4 | 32.1 |
| Example 6 | 120N * | Y | SR833 * | SR399 | Y | — | P-6 | Y | 56.6 | 11.5 | 31.9 |
| Example 7 | 120N * | Y | SR833 * | SR399 | Y | — | P-7 | Y | 68.2 | 13.8 | 18.0 |
| Example 8 | 120N * | Y | SR833 * | SR399 | Y | — | P-8 | Y | 55.7 | 11.3 | 33.0 |
| Example 9 | 120N * | Y | SR833 * | SR399 | Y | — | P-9 | Y | 52.4 | 10.6 | 36.9 |
| Example 10 | 120N * | Y | SR833 * | SR399 | Y | — | P-10 | Y | 61.5 | 12.4 | 26.0 |

TABLE 3-continued

| | | | | | | | | | | | |
|---|---|---|---|---|---|---|---|---|---|---|---|
| Example 11 | 120N * | Y | SR833 * | SR399 | Y | — | P-11 | Y | 62.2 | 12.6 | 25.2 |
| Example 12 | 120N * | Y | SR833 * | SR399 | Y | — | P-12 | Y | 34.9 | 9.7 | 55.4 |
| Example 13 | 120N * | Y | SR833 * | SR399 | Y | — | P-13 | Y | 45.2 | 9.1 | 45.7 |
| Example 14 | 120N * | Y | SR833 * | SR399 | Y | — | P-14 | Y | 59.8 | 12.1 | 28.1 |
| Example 15 | 120N * | Y | SR833 * | SR399 | Y | — | P-15 | Y | 48.8 | 13.0 | 38.2 |
| Example 16 | 120N * | Y | SR833 * | SR399 | Y | — | P-16 | Y | 55.4 | 11.7 | 32.9 |
| Example 17 | 120N * | Y | SR833 * | SR399 | Y | — | P-17 | Y | 56.3 | 11.4 | 32.4 |
| Example 18 | 120N * | Y | SR833 * | SR399 | Y | — | P-18 | Y | 56.3 | 11.4 | 32.4 |
| Example 19 | 120N * | Y | SR833 * | SR399 | Y | — | P-19 | Y | 56.3 | 11.4 | 32.4 |
| Example 20 | 120N * | Y | SR833 * | SR399 | Y | — | P-20 | Y | 56.3 | 11.4 | 32.4 |
| Example 21 | 120N * | Y | SR833 * | SR399 | Y | — | P-21 | Y | 56.3 | 11.4 | 32.4 |
| Example 22 | 120N * | Y | SR833 * | SR399 | Y | — | P-22 | Y | 55.0 | 4.1 | 41.0 |
| Example 23 | 120N * | Y | SR833 * | SR399 | Y | — | P-23 | Y | 55.8 | 8.6 | 35.6 |
| Example 24 | 120N * | Y | SR833 * | SR399 | Y | — | P-24 | Y | 57.2 | 17.0 | 25.8 |
| Example 25 | 120N * | Y | SR833 * | SR399 | Y | — | P-25 | Y | 58.8 | 25.7 | 15.6 |
| Example 26 | 120N * | Y | SR833 * | SR399 | Y | — | P-26 | Y | 59.7 | 30.8 | 9.5 |
| Example 27 | 120N * | Y | SR833 * | SR399 | Y | — | P-18 | Y | 56.3 | 11.4 | 32.4 |
| Example 28 | 120N * | Y | SR833 * | SR399 | Y | — | P-18 | Y | 56.3 | 11.4 | 32.4 |
| Example 29 | 120N * | Y | SR833 * | SR399 | Y | — | P-18 | Y | 56.3 | 11.4 | 32.4 |
| Example 30 | 120N * | Y | SR833 * | SR399 | Y | — | P-18 | Y | 56.3 | 11.4 | 32.4 |
| Example 31 | 120N * | Y | SR833 * | SR399 | Y | — | P-18 | Y | 56.3 | 11.4 | 32.4 |
| Example 32 | 120N * | Y | SR833 * | SR399 | Y | — | P-18 | Y | 56.3 | 11.4 | 32.4 |
| Example 33 | 120N * | Y | SR833 * | SR399 | Y | — | P-18 | Y | 56.3 | 11.4 | 32.4 |
| Example 34 | 120N * | Y | SR833 * | SR399 | Y | — | P-18 | Y | 56.3 | 11.4 | 32.4 |
| Example 35 | 120N * | Y | SR833 * | SR399 | Y | — | P-18 | Y | 56.3 | 11.4 | 32.4 |

| | Dispersant | | | | | Mass ratio | Evaluation result | | | | |
|---|---|---|---|---|---|---|---|---|---|---|---|
| | Unit (A) | Unit (C) | | | Anionic | [dispersant/ | | | | Adhesiveness | |
| | Cyclic structure in RA1 | Cyclic structure in RC1 | ClogP (RC1) | Mw | group value (mmol/g) | MC solid content] | Pencil hardness | Jetting properties | Storage Stability | PS | Corona PP |
| Example 1 | Y | — | 7.26 | 25000 | 0.85 | 0.667 | H | A | A | 1 | 1 |
| Example 2 | Y | — | 7.56 | 24000 | 0.85 | 0.667 | H | A | A | 1 | 1 |
| Example 3 | Y | — | 21.07 | 23000 | 0.85 | 0.667 | H | A | A | 1 | 1 |
| Example 4 | Y | — | 23.68 | 24000 | 0.85 | 0.667 | H | A | A | 1 | 1 |
| Example 5 | Y | — | 0.60 | 20000 | 0.77 | 0.667 | H | B | B | 1 | 1 |
| Example 6 | Y | — | 1.88 | 20000 | 0.77 | 0.667 | H | A | B | 1 | 1 |
| Example 7 | Y | — | 2.81 | 22000 | 0.93 | 0.667 | H | A | B | 1 | 1 |
| Example 8 | Y | — | 7.04 | 21000 | 0.76 | 0.667 | H | A | A | 1 | 1 |
| Example 9 | Y | Y | 7.32 | 23000 | 0.72 | 0.667 | H | A | A | 0 | 0 |
| Example 10 | Y | Y | 4.39 | 20000 | 0.84 | 0.667 | H | A | A | 0 | 0 |
| Example 11 | Y | Y | 3.14 | 19000 | 0.85 | 0.667 | H | A | A | 0 | 1 |
| Example 12 | Y | Y | 6.50 | 24000 | 0.65 | 0.667 | H | A | A | 0 | 1 |
| Example 13 | Y | — | 9.86 | 22000 | 0.62 | 0.667 | H | A | A | 1 | 1 |
| Example 14 | Y | — | 2.16 | 21000 | 0.82 | 0.667 | H | A | B | 1 | 1 |
| Example 15 | — | — | 7.04 | 24000 | 0.88 | 0.667 | H | A | A | 2 | 2 |
| Example 16 | Y | — | 7.04 | 19000 | 0.79 | 0.667 | H | A | B | 1 | 1 |
| Example 17 | Y | Y | 5.54 | 8000 | 0.77 | 0.667 | H | A | B | 0 | 0 |
| Example 18 | Y | Y | 5.54 | 22000 | 0.77 | 0.667 | H | A | A | 0 | 0 |
| Example 19 | Y | Y | 5.54 | 35000 | 0.77 | 0.667 | H | A | A | 0 | 0 |
| Example 20 | Y | Y | 5.54 | 60000 | 0.77 | 0.667 | H | A | A | 0 | 0 |
| Example 21 | Y | Y | 5.54 | 110000 | 0.77 | 0.667 | H | A | B | 0 | 0 |
| Example 22 | Y | Y | 5.54 | 20000 | 0.27 | 0.667 | H | A | B | 0 | 1 |
| Example 23 | Y | Y | 5.54 | 19000 | 0.58 | 0.667 | H | A | A | 0 | 0 |
| Example 24 | Y | Y | 5.54 | 21000 | 1.15 | 0.667 | H | A | A | 0 | 0 |
| Example 25 | Y | Y | 5.54 | 22000 | 1.73 | 0.667 | H | A | B | 0 | 1 |
| Example 26 | Y | Y | 5.54 | 21000 | 2.08 | 0.667 | H | A | B | 0 | 1 |
| Example 27 | Y | Y | 5.54 | 22000 | 0.77 | 0.111 | H | A | B | 0 | 0 |
| Example 28 | Y | Y | 5.54 | 22000 | 0.77 | 0.250 | H | A | A | 0 | 0 |
| Example 29 | Y | Y | 5.54 | 22000 | 0.77 | 0.429 | H | A | A | 0 | 0 |
| Example 30 | Y | Y | 5.54 | 22000 | 0.77 | 0.818 | H | A | A | 0 | 0 |
| Example 31 | Y | Y | 5.54 | 22000 | 0.77 | 1.000 | H | A | A | 0 | 0 |
| Example 32 | Y | Y | 5.54 | 22000 | 0.77 | 1.222 | H | A | A | 0 | 0 |
| Example 33 | Y | Y | 5.54 | 22000 | 0.77 | 1.500 | H | A | A | 0 | 0 |
| Example 34 | Y | Y | 5.54 | 22000 | 0.77 | 2.333 | F | A | A | 0 | 0 |
| Example 35 | Y | Y | 5.54 | 22000 | 0.77 | 4.000 | F | A | A | 0 | 0 |

TABLE 4

| | MC solid content | | | | | | | | | | |
|---|---|---|---|---|---|---|---|---|---|---|---|
| | Shell raw material | | Core | | | | Dispersant | | | | |
| | Tri- or higher functional NCO compound | Shell Bond (U) | Radically polymerizable compound: Di- or lower functional | Radically polymerizable compound: Tri- or higher functional | Initiator | Sensitizer | Type | Bond (U) | Content (% by mass) Unit (A) | Content (% by mass) Unit (B) | Content (% by mass) Unit (C) |
| Example 36 | 110N * | Y | SR833 * | SR399 | Y | — | P-18 | Y | 56.3 | 11.4 | 32.4 |
| Example 37 | 160N | Y | SR833 * | SR399 | Y | — | P-18 | Y | 56.3 | 11.4 | 32.4 |
| Example 38 | 120N * | Y | SR833 * | SR399 | Y | Y | P-18 | Y | 56.3 | 11.4 | 32.4 |
| Example 39 | 120N * | Y | SR833 * | — | Y | — | P-18 | Y | 56.3 | 11.4 | 32.4 |
| Example 40 | 120N * | Y | SR306 | — | Y | — | P-18 | Y | 56.3 | 11.4 | 32.4 |
| Example 41 | 120N * | Y | CD406 * | — | Y | — | P-18 | Y | 56.3 | 11.4 | 32.4 |
| Example 42 | 120N * | Y | — | A-TMPT | Y | — | P-18 | Y | 56.3 | 11.4 | 32.4 |
| Example 43 | 120N * | Y | — | SR399 | Y | — | P-18 | Y | 56.3 | 11.4 | 32.4 |
| Comparative Example 1 | 120N * | Y | SR833 * | SR399 | Y | — | F1 | — | — | — | — |
| Comparative Example 2 | 120N * | Y | SR833 * | SR399 | Y | — | F2 | — | — | — | — |
| Comparative Example 3 | 120N * | Y | SR833 * | SR399 | Y | — | F3 | — | — | — | — |

| | Dispersant | | | | | Mass ratio | Evaluation result | | | | |
|---|---|---|---|---|---|---|---|---|---|---|---|
| | Unit (A) Cyclic structure in RA1 | Unit (C) Cyclic structure in RC1 | ClogP (RC1) | Mw | Anionic group value (mmol/g) | [dispersant/ MC solid content] | Pencil hardness | Jetting properties | Storage Stability | Adhesiveness PS | Adhesiveness Corona PP |
| Example 36 | Y | Y | 5.54 | 22000 | 0.77 | 0.667 | H | A | A | 0 | 1 |
| Example 37 | Y | Y | 5.54 | 22000 | 0.77 | 0.667 | H | A | A | 1 | 1 |
| Example 38 | Y | Y | 5.54 | 22000 | 0.77 | 0.667 | 2H | A | A | 0 | 0 |
| Example 39 | Y | Y | 5.54 | 22000 | 0.77 | 0.667 | F | A | A | 0 | 0 |
| Example 40 | Y | Y | 5.54 | 22000 | 0.77 | 0.667 | F | A | A | 1 | 1 |
| Example 41 | Y | Y | 5.54 | 22000 | 0.77 | 0.667 | F | A | A | 0 | 0 |
| Example 42 | Y | Y | 5.54 | 22000 | 0.77 | 0.667 | H | A | A | 1 | 1 |
| Example 43 | Y | Y | 5.54 | 22000 | 0.77 | 0.667 | H | A | A | 1 | 1 |
| Comparative Example 1 | — | — | N.D. | 3500 | N.D. | 0.100 | 3B | D | D | 5 | 5 |
| Comparative Example 2 | — | — | N.D. | N.D. | N.D. | 0.100 | 3B | D | D | 5 | 5 |
| Comparative Example 3 | — | — | N.D. | 8800 | 0.00 | 0.100 | 3B | D | D | 5 | 5 |

—Explanation of Table 3 and Table 4 (and Table 5 to be Described Later)—

The terms in Table 3 and Table 4 (and Table 5 to be described later) are as follows.

- "MC solid content" indicates a total solid content of the microcapsule.
- "NCO compound" indicates an isocyanate compound.
- "Initiator" indicates a photopolymerization initiator.
- In the column of "initiator" and the column of "sensitizer," "Y" means that an initiator or a sensitizer is contained, and "-" means that an initiator or a sensitizer is not contained.
- "Y" in the "Bond (U)" column in the "shell" column indicates that the shell contains at least one of a urethane bond or a urea bond, and "-" in this column indicates that the shell contains neither of a urethane bond nor a urea bond.
- "Y" in the "Bond (U)" column in the "dispersant" column indicates that the dispersant contains at least one of a urethane bond or a urea bond, and "-" in this column indicates that dispersant contains neither of a urethane bond nor a urea bond.
- "Y" in the "cyclic structure in RA1" column indicates that $R^{A1}$ in the unit (A) contains a cyclic structure, and "-" in this column indicates that $R^{A1}$ in the unit (A) does not contain a cyclic structure.
- "Y" in the "cyclic structure in $R^{C1}$" column indicates that $R^{C1}$ in the unit (C) contains a cyclic structure, and "-" in this column indicates that $R^{C1}$ in the unit (C) does not contain a cyclic structure.
- "C log P ($R^{C1}$)" indicates C log P of the compound $HR^{C1}H$ in which a hydrogen atom is bonded to each of two binding positions of $R^{C1}$ of the unit (C).
- "Anionic group value (mmol/g)" indicates a value obtained by the above-described neutralization titration.
- The symbol "*" written next to each of "120N," "110N," "SR833," and "CD406" indicates that each of these materials is a material containing a cyclic structure.

As shown in Table 3 and Table 4, in Examples 1 to 43 which used the ink (that is, aqueous dispersion), the pencil hardness of the cured film was excellent, and the dispersion stability (that is, jetting properties and storage stability) of the ink was excellent, the ink containing:

the microcapsule containing the shell containing at least one bond selected from a urethane bond or a urea bond (bond (U)), and the core;

the dispersant in which at least one bond selected from a urethane bond or a urea bond (bond (U)), and the anionic group (anionic group in the unit (B)) are contained, the weight-average molecular weight (Mw) is 5000 or more, and the anionic group value is from 0.10 mmol/g to 2.50 mmol/g; and water.

Furthermore, in Examples 1 to 43, the adhesiveness between the cured film and the substrate (PS substrate or corona PP substrate) was also excellent.

On the other hand, in Comparative Examples 1 to 3 which used Dispersants F1 to F3 having neither a urethane bond nor a urea bond, the dispersion stability (that is, jetting properties and storage stability) of the ink deteriorated.

Furthermore, in Comparative Examples 1 to 3, the pencil hardness of the cured film and the adhesiveness of the cured film to the substrate (PS substrate or corona PP substrate) also deteriorated. In Comparative Examples 1 to 3, it is considered that the reason of the deterioration of the adhesiveness of the cured film to the substrate is because the hydrophilicity of the dispersants (F1 to F3) was excessively high, and thus the interaction with the hydrophobic substrate (PS substrate or corona PP substrate) became weak.

In addition, based on the comparison between the jetting properties of Example 5 and the jetting properties of Example 6, in the case where C log P ($R^{C1}$) (that is, C log P of the compound $HR^{C1}H$) is 1.00 or more, the dispersion stability of the microcapsules was found to be more improved.

Furthermore, based on the comparison between the storage stability of Example 7 and the storage stability of Example 11, in the case where C log P ($R^{C1}$) (that is, C log P of the compound $HR^{C1}H$) is 3.00 or more, the dispersion stability of the microcapsules was found to be even more improved.

Furthermore, based on the results of the adhesiveness (PS) of Examples 1 to 16, the adhesiveness between the cured film and the substrate was found to be improved in the case where $R^{A1}$ in the unit (A) contains a cyclic structure (Examples 1 to 14 and 16) as compared with the case in which neither $R^{A1}$ in the unit (A) nor $R^{C1}$ in the unit (C) contained a cyclic structure (Example 15). In particular, in the case where $R^{C1}$ in the unit (C) contains a cyclic structure (Examples 9 to 12), the adhesiveness between the cured film and the substrate was found to be further improved.

Furthermore, based on the results of the storage stability of Examples 17 to 21, in the case where the weight-average molecular weight (Mw) of the dispersant is from 10000 to 100000, the dispersion stability of the microcapsules was found to be further improved.

Furthermore, based on the results of the storage stability of Examples 22 to 26, in the case where the anionic group value of the dispersant is from 0.30 mmol/g to 1.50 mmol/g, the dispersion stability of the microcapsules was found to be further improved.

Furthermore, based on the results of the adhesiveness of Examples 18, 36, and 37, in the case where the shell of the microcapsule has a cyclic structure (particularly, alicyclic structure), the adhesiveness between the cured film and the substrate was found to be further improved.

Furthermore, based on the results of the pencil hardness and adhesiveness of Examples 18 and 39 to 43, in the case where the core of the microcapsule contains the di- or lower functional radically polymerizable compound and the tri- or higher functional radically polymerizable compound, the hardness of the cured film and the adhesiveness of the cured film to the substrate were found to be compatible at a higher level.

Furthermore, based on the results of Examples 18 and 39 to 43, in the case where the core of the microcapsule contains a radically polymerizable compound containing a cyclic structure, the adhesiveness of the cured film to the substrate was found to be further improved.

Furthermore, based on the results of Examples 27 to 35, in the case where the mass ratio [dispersant/MC solid content] is 0.200 to 1.500, the hardness of the cured film and the adhesiveness of the cured film to the substrate were found to be compatible at a higher level.

<Checking Relating to Aqueous Dispersion Having Microcapsule>

With respect to each of the aqueous dispersions having the microcapsules of Examples 1 to 43, the following checking was performed.

(Volume Average Dispersing Particle Diameter of Microcapsule)

With respect to each of the aqueous dispersions having the microcapsules of Examples 1 to 43, the volume average dispersing particle diameter of the microcapsules was measured by a light scattering method. As a result, the volume average dispersing particle diameter of the microcapsule was within a range of 0.1 μm to 0.3 μm.

The measurement of the volume average dispersing particle diameter by the light scattering method was carried out by using a wet-type particle size distribution measurement apparatus, LA-960 (manufactured by HORIBA, Ltd.).

(Checking Whether Shell of Microcapsule has Three-Dimensional Cross-Linked Structure)

With respect to each of the aqueous dispersions having the microcapsules of Examples 1 to 43, whether the shell of the microcapsule actually has the three-dimensional cross-linked structure was checked. The operation described below was performed under the condition of a liquid temperature of 25° C.

From the aqueous dispersion having the microcapsule obtained as above, a sample was collected. Tetrahydrofuran (THF) having a mass 100 times the mass of the total solid content in the sample was added to and mixed with the collected sample, thereby preparing a diluted solution. The obtained diluted solution was subjected to centrifugation (80,000 rpm, 40 minutes). After centrifugation, the presence of the residue was checked by visual observation. In a case where the residue was present, water was added to the residue, and the resultant was stirred for 1 hour by using a stirrer. The residue was redispersed in water, and therefore a redispersion liquid was obtained. For the obtained redispersion liquid, by using a wet-type particle size distribution measurement apparatus (LA-960, manufactured by HORIBA, Ltd.), the particle size distribution was measured by the light scattering method. In a case where the particle size distribution could be checked by the operation described above, it was determined that the shell of the microcapsule had the three-dimensional cross-linked structure.

As the result, it was checked that the shell of the microcapsule had the three-dimensional cross-linked structure in the aqueous dispersions having the microcapsules in Examples 1 to 43.

In addition, based on the above result and the result of the Fourier transform infrared spectroscopy (FT-IR), the microcapsule had the polymerizable group in the aqueous dispersions having the microcapsules in Examples 1 to 43.

(Checking Whether Core of Microcapsule Contains Photopolymerization Initiator)

In the aqueous dispersions having the microcapsules in Examples 1 to 43, whether the core of the microcapsule actually contained the photopolymerization initiator was checked by measuring an internal content rate (%) of the photopolymerization initiator. The details thereof are as described below. The operation described below was performed under the condition of a liquid temperature of 25° C.

From the aqueous dispersions having the microcapsules, two samples (hereinafter, will be referred to as "sample 1A" and "sample 2A") having the same mass were collected.

Tetrahydrofuran (THF) having a mass 100 times the mass of the total solid content in the sample 1A was added to and mixed with the sample 1A, thereby preparing a diluted solution. The obtained diluted solution was subjected to centrifugation under the conditions of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator."

Furthermore, the sample 2A was subjected to centrifugation under the same conditions as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator."

Based on the "total amount of photopolymerization initiator" and the "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

As the results, all of the internal content rates of the three photopolymerization initiators in the aqueous dispersions having the microcapsules in Examples 1 to 43 were 99% or more, and it was confirmed that the cores of the microcapsules actually contained the photopolymerization initiators.

(Checking Whether Core of Microcapsule Contains Polymerizable Compound)

In the aqueous dispersion having the microcapsule, whether the core of the microcapsule actually contained the polymerizable compound therein was checked by measuring an internal content rate (%) of the polymerizable compound.

The internal content rate of the polymerizable monomer was measured by the same method as that of the internal content rate of the photopolymerization initiator.

As the results, the internal content rate of the polymerizable compound in any of the aqueous dispersions having the microcapsules in Examples 1 to 43 was 99% or more, and it was confirmed that the core of the microcapsule actually contained the polymerizable compound therein.

For Examples 1 to 38 in which two kinds of the polymerizable compounds were used, an internal content rate of each of the two kinds of the polymerizable compounds was measured. As the results, the internal content rate of the two kinds of the polymerizable compound in any of Examples 1 to 38 was 99% or more, and it was confirmed that the core of the microcapsule actually contained the two kinds of the polymerizable compound therein.

Example 101

An ink of Example 101 was prepared in the same manner as in Example 18 except that in "Manufacture of aqueous dispersion having microcapsule" and "Manufacture of ink jet ink" of Example 18, SR833S and SR399E were changed to Trixene™ BI 7982 (thermally polymerizable compound (thermally polymerizable monomer); blocked isocyanate; Baxenden Chemicals Ltd) in which propylene glycol monomethyl ether was distilled off under reduced pressure at 2.67 kPa (20 torr) at 60° C. and that IRGACURE 819 was not used.

A mass of Trixene™ BI 7982 in which propylene glycol monomethyl ether was distilled off under reduced pressure at 2.67 kPa (20 torr) at 60° C. was the mass same as a total mass of SR833S and SR399E in Example 18.

Hereinafter, "Trixene™ BI 7982 in which propylene glycol monomethyl ether was distilled off under reduced pressure at 2.67 kPa (20 torr) at 60° C." will also be referred to as "BI 7982."

Using the ink of Example 101, the evaluation of Example 101 was carried out in the same manner as the evaluation of Example 18 excepting the following conditions.

In the evaluation of Example 101, the operation in which "the coated film after drying was irradiated with UV" in the evaluation of Example 18, was changed to the operation in which the coated film after drying was heated for 5 minutes in an oven at 160° C., so as to cure the coated film after drying.

The results are shown in Table 5.

Example 102

An ink of Example 102 was produced in the same manner as in Example 18 except that in "Manufacture of aqueous dispersion having microcapsule" and "Manufacture of ink jet ink" of Example 18, SR833S and SR399E were changed to EPICLON™ 840 (thermally polymerizable compound having an epoxy group (thermally polymerizable oligomer), DIC CORPORATION; hereinafter, will also be referred to as "EP840"), and that IRGACURE 819 was changed to 2-methylimidazole (thermal curing accelerator) having the same mass thereof.

A mass of EP840 used herein was the same mass as the total mass of SR833S and SR399E of Example 18.

Using the ink of Example 102, the evaluation same as that of Example 101 was carried out.

The results are shown in Table 5.

Comparative Example 101

An ink of Comparative Example 101 was prepared in the same manner as in Comparative Example 1 except that in "Manufacture of Aqueous Dispersion Having Microcapsule" and "Manufacture of Ink Jet Ink" of Comparative Example 1, SR833S and SR399E were changed to BI 7982 and that IRGACURE 819 was not used.

A mass of BI 7982 used herein was the same mass as the total mass of SR833S and SR399E of Comparative Example 1.

Using the ink of Comparative Example 101, the evaluation same as that of Example 101 was carried out.

The results are shown in Table 5.

TABLE 5

| | MC solid content: Shell raw material Tri- or higher functional NCO compound | MC solid content: Shell Bond (U) | MC solid content: Core Thermally polymerizable compound | MC solid content: Core Thermal curing accelerator | Dispersant Type | Dispersant Bond (U) | Dispersant Content (% by mass) Unit (A) | Dispersant Content (% by mass) Unit (B) | Dispersant Content (% by mass) Unit (C) |
|---|---|---|---|---|---|---|---|---|---|
| Example 101 | 120N * | Y | BI7982 | — | P-18 | Y | 56.3 | 11.4 | 32.4 |
| Example 102 | 120N * | Y | EP840 | Y | P-18 | Y | 56.3 | 11.4 | 32.4 |
| Comparative Example 101 | 120N * | Y | BI7982 | — | F1 | — | — | — | — |

| | Dispersant Unit (A) Cyclic structure in RA1 | Dispersant Unit (C) Cyclic structure in RC1 | Dispersant Unit (C) ClogP (RC1) | Dispersant Mw | Dispersant Anionic group value (mmol/g) | Mass ratio [dispersant/MC solid content] | Evaluation result Pencil hardness | Evaluation result Jetting properties | Evaluation result Storage Stability | Evaluation result Adhesiveness PS | Evaluation result Adhesiveness Corona PP |
|---|---|---|---|---|---|---|---|---|---|---|---|
| Example 101 | Y | Y | 5.54 | 22000 | 0.77 | 0.667 | H | A | A | 0 | 0 |
| Example 102 | Y | Y | 5.54 | 22000 | 0.77 | 0.667 | H | A | A | 0 | 0 |
| Comparative Example 101 | — | — | N.D. | 3500 | N.D. | 0.100 | 3B | D | D | 5 | 5 |

As shown in Table 5, even in Examples 101 and 102 in which the thermally polymerizable compound was used instead of the radically polymerizable compound, the same effect was confirmed as in Example 18 in which the radically polymerizable compound was used.

The entire content of JP2016-173951A filed on Sep. 6, 2016 is incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. An aqueous dispersion comprising:

a microcapsule that includes a shell having a three-dimensional cross-linked structure containing at least one bond selected from a urethane bond or a urea bond, and includes a core, in which at least one of the shell or the core has a polymerizable group;

a dispersant in which at least one bond selected from a urethane bond or a urea bond, and an anionic group are contained, a weight-average molecular weight is 5000 or more, and an anionic group value, which is the number of millimoles of the anionic group contained in 1 g of the dispersant, is from 0.10 mmol/g to 2.50 mmol/g; and water.

2. The aqueous dispersion according to claim 1, wherein the dispersant contains Structural Unit (C),

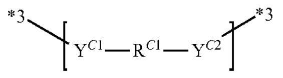

(C)

in Structural Unit (C), $R^{C1}$ represents a divalent organic group, and in a case of assuming a compound $HR^{C1}H$ in which a hydrogen atom is bonded to each of two binding positions of the divalent organic group, $R^{C1}$ represents the divalent organic group which allows C log P of the compound $HR^{C1}H$ to be 1.00 or more, $Y^{C1}$ represents O, S, NH, or $NZ^{C1}$, $Y^{C2}$ represents O, S, NH, or $NZ^{C2}$; $Z^{C1}$ and $Z^{C2}$ each independently represent a hydrocarbon group having 1 to 10 carbon atoms, and two *3's each represent a binding position with a structural unit other than Structural Unit (C).

3. The aqueous dispersion according to claim 2, wherein the dispersant further contains Structural Unit (A) and Structural Unit (B),

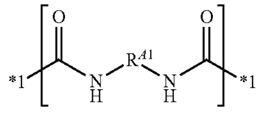
(A)

in Structural Unit (A), $R^{A1}$ represents a divalent hydrocarbon group having 1 to 20 carbon atoms, and two *1's each represent a binding position with a structural unit other than Structural Unit (A), and

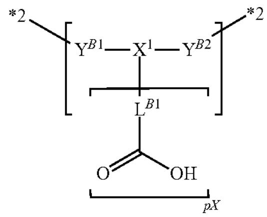
(B)

in Structural Unit (B), $X^1$ represents a (pX+2)-valent organic group, pX represents an integer of 1 or more, $Y^{B1}$ represents O, S, NH, or $NZ^{B1}$, $Y^{B2}$ represents O, S, NH, or $NZ^{B2}$, $Z^{B1}$ and $Z^{B2}$ each independently represent a hydrocarbon group having 1 to 10 carbon atoms, $L^{B1}$ represents a single bond or a divalent linking group, and two *2's each represent a binding position with a structural unit other than Structural Unit (B), and a carboxy group in Structural Unit (B) may be neutralized.

4. The aqueous dispersion according to claim 3, wherein the divalent hydrocarbon group represented by $R^{A1}$ in Structural Unit (A) contains a cyclic structure.

5. The aqueous dispersion according to claim 2, wherein C log P of the compound $HR^{C1}H$ is 3.00 or more.

6. The aqueous dispersion according to claim 2, wherein $R^{C1}$ in Structural Unit (C) is a divalent polyalkyleneoxy group in which two hydroxy groups are removed from polyalkylene glycol, a divalent polycarbonate group in which two hydroxy groups are removed from polycarbonate diol, a divalent polyester group in which two hydroxy groups are removed from polyester diol, a divalent organic group in which two hydroxy groups are removed from a diol compound having 2 to 50 carbon atoms other than polyalkylene glycol, polycarbonate diol, and polyester diol, or a divalent organic group in which two amino groups are removed from a diamine compound having 2 to 50 carbon atoms.

7. The aqueous dispersion according to claim 2, wherein the divalent organic group represented by $R^{C1}$ in Structural Unit (C) contains a cyclic structure.

8. The aqueous dispersion according to claim 1, wherein the weight-average molecular weight of the dispersant is from 10000 to 100000.

9. The aqueous dispersion according to claim 1, wherein the anionic group value of the dispersant is from 0.30 mmol/g to 1.50 mmol/g.

10. The aqueous dispersion according to claim 1, wherein the shell contains a cyclic structure.

11. The aqueous dispersion according to claim 1, wherein the polymerizable group is a radically polymerizable group, and the core contains a radically polymerizable compound as a compound having the radically polymerizable group.

12. The aqueous dispersion according to claim 11, wherein the core contains a di- or lower functional radically polymerizable compound and a tri- or higher functional radically polymerizable compound as compounds having the radically polymerizable group.

13. The aqueous dispersion according to claim 1, wherein the core contains a photopolymerization initiator.

14. The aqueous dispersion according to claim 1, wherein the polymerizable group is a thermally polymerizable group, and the core contains a thermally polymerizable compound as a compound having the thermally polymerizable group.

15. The aqueous dispersion according to claim 1, wherein a total amount of a total solid content of the microcapsule and the dispersant is 50% by mass or more with respect to a total solid content of the aqueous dispersion.

16. The aqueous dispersion according to claim 1, which is used as an ink jet ink.

17. A method for manufacturing the aqueous dispersion according to claim 1, the method comprising:

mixing an oil-phase component containing an organic solvent, the dispersant, a tri- or higher functional isocyanate compound, and at least one of an isocyanate compound into which a polymerizable group is introduced or a polymerizable compound, with a water-phase component containing water, and emulsifying the obtained mixture so as to form the microcapsule.

18. An image forming method comprising:

applying the aqueous dispersion according to claim 1 onto a recording medium; and curing the aqueous dispersion applied onto the recording medium.

* * * * *